United States Patent [19]
Yokoi et al.

[11] Patent Number: 5,732,062
[45] Date of Patent: Mar. 24, 1998

[54] INFORMATION RECORDING APPARATUS, METHOD AND COMPUTER PROGRAM PRODUCT

[75] Inventors: Kenya Yokoi, Kawasaki; Ikuo Aoki, Yokohama, both of Japan

[73] Assignee: Ricoh Company, Ltd., Tokyo, Japan

[21] Appl. No.: 733,029

[22] Filed: Oct. 16, 1996

[30] Foreign Application Priority Data

Oct. 16, 1995 [JP] Japan ................................. 7-266652
Nov. 8, 1995 [JP] Japan ................................. 7-289680
Mar. 12, 1996 [JP] Japan ................................. 8-054877

[51] Int. Cl.$^6$ ........................................ G11B 7/00
[52] U.S. Cl. .................... 369/116; 369/54; 369/275.2; 369/59
[58] Field of Search ........................ 369/54, 59, 116, 369/275.4; 420/576; 428/624

[56] References Cited

U.S. PATENT DOCUMENTS

| | | | |
|---|---|---|---|
| 5,156,693 | 10/1992 | Ide et al. | 420/576 |
| 5,608,710 | 3/1997 | Minemura et al. | 369/116 |
| 5,636,194 | 6/1997 | Furumiya et al. | 369/116 |
| 5,648,952 | 7/1997 | Maegawa et al. | 369/116 |

FOREIGN PATENT DOCUMENTS

| | | |
|---|---|---|
| 62-11412 | 3/1987 | Japan. |
| 63-266633 | 11/1988 | Japan. |
| 5-32811 | 5/1993 | Japan. |

*Primary Examiner*—David C. Nelms
*Assistant Examiner*—Kim-Kwok Chu
*Attorney, Agent, or Firm*—Dickstein Shapiro Morin & Oshinsky LLP

[57] ABSTRACT

In an information recording system, information is recorded, through light from a light source, in a recording medium comprising a recording layer which has a phase reversibly changeable between a crystal phase and an amorphous phase. The light source emits, for forming a record mark in the recording layer, multi-pulse light which includes a head heating pulse, a head cooling pulse and following rear heating pulse and rear cooling pulse in the stated order. The head heating pulse includes a front division and a rear division. The difference in light-emission power between the head heating pulse and an immediately following cooling pulse is larger than the difference in light-emission power between another heating pulse and an immediately following cooling pulse.

67 Claims, 28 Drawing Sheets

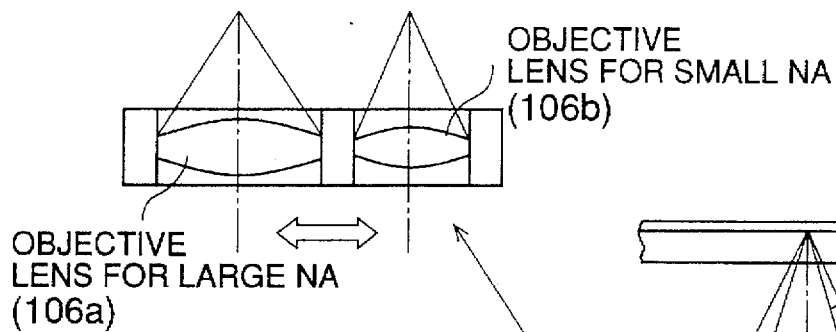
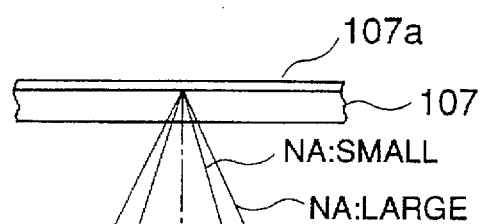
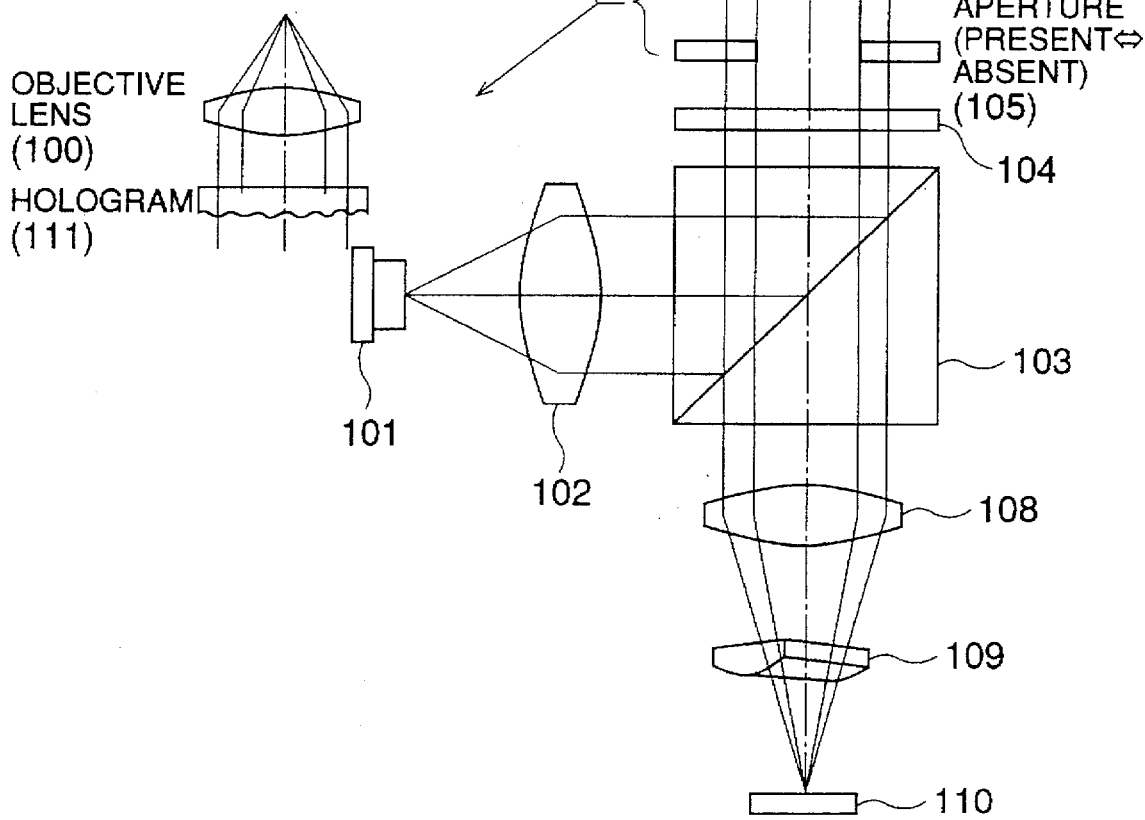

(ABOVE ALL ARE IDEAL LIGHT-EMISSION WAVEFORMS WITHOUT CONSIDERATION OF POSSIBLE WAVEFORM DISTORTION)

INFORMATION RECORDING APPARATUS, METHOD AND COMPUTER PROGRAM PRODUCT

BACKGROUND OF THE INVENTION

1. Field of the Invention

The present invention relates to information recording in which information is recorded in a recording medium (such as an optical disc or the like), which has a recording layer reversibly changing between a crystal phase and amorphous phase, by means of a laser light emitted by a light source. In particular, the present invention relates to an information recording apparatus such as re-writable optical disc drive apparatus.

2. Description of the Related Art

As multimedia is coming into wide use, special-reproduction-purpose media (recording media) such as music CD, CD-ROM and so forth and information reproduction apparatus therefor are being utilized. Recently, in addition to WORM (Write Once Read Many) optical discs using coloring matter and re-writable MO (Magneto Optical) discs using MO media, phase-change media is receiving attention. The phase-change media are such that the phase of the recording material of a medium is reversibly changed between a crystal phase and an amorphous phase, and information is recorded in the medium. Different from the MO media or the like, the phase-change media do not need an external magnetic field, but information recording and reproducing can be performed only by means of a laser light from a light source which comprises a semiconductor laser. Further, overwriting recording can be performed in which information recording and erasing are performed at once by the laser light.

A common recording waveform for recording information to such a phase-change medium is a single-pulse semiconductor-laser light-emission waveform, which is produced based on an EFM (Eight Fourteen Modulation) code, such as that shown in FIG. 1. However, by means of such a simple rectangular single-pulse recording waveform, record marks which have advantageously low reflectance to laser light cannot been obtained in the phase-change medium. This is because, by means of such a recording waveform, a resulting record mark has a distortion, and has a tear shape, due to accumulated heat, so that an amorphous shape is not sufficiently formed due to insufficient cooling speed.

In order to solve such problems, in a information recording method of phase-change media information recording in the related art, multi-pulse waveform laser light, such as that shown in FIG. 2, is produced based on an EFM code by use of multi-level recording power, and is used for forming record marks in a phase-change media. A mark forming portion of the multi-pulse waveform includes a head heating pulse "A" for preliminarily heating the recording layer of the phase-change media sufficiently to have a temperature equal to or above the melting point, a plurality of following successive heating pulses "B", and cooling pulses "C" between the pulses "A" and "B". The head heating pulse "A" has a light-emission power of PWA, each of the following heating pulses "B" has a light-emission power of PWB and each of the cooling pulses "C" has a light-emission power of PWC. Further, a reading power, which is the light emission power used when thus-formed record marks are read, is PR. Those powers are set so that $PWB \geq PWA > PWC \approx PR$, as shown in FIG. 2.

An erasing portion of the multi-pulse waveform for erasing previously formed record marks has an erasing pulse "D" having a light-emission power of PED, where $PWA > PED > PWC$, as shown in FIG. 2. By using such a multi-pulse recording waveform, a sharp cooling condition of heating→cooling (by the heating pulses "A" and "B", and cooling pulses "C") forms an amorphous phase as a record mark, and a gradual cooling condition of relatively-low-temperature heating (by the erasing pulse D) forms a crystal phase a space which is present between two adjacent record marks, in the phase-change medium. Sufficient reflectance difference is obtained between the amorphous phase and the crystal phase, and proper data reading can be performed on the thus-produced record marks and spaces.

There are two information recording methods: a PPM (Pit Position Modulation) recording method and a PWM (Pit Width Modulation) recording method. Recently, the PWM recording method, which is more suitable for high-density information recording, is being used. In a case where the PWM recording method is used when information is recorded in a phase-change medium, it is essential that sufficient heating and sharp cooling by means of the mark forming portion are performed on the phase-change media so that front and rear edges (right and left edges in FIG. 2, for example) of each resulting record mark be sharply formed. For this purpose, as a result of considering accidental tilting of a phase-change media and unexpected variation of a semiconductor-laser light-emission power, the recording powers (such as the powers PWA and PWB) are set at high-side levels. Recently, as high-density information recording is performed, a very small record mark is formed in a medium by use of a small light beam spot through a narrow wavelength laser and/or a high NA (Numeric Aperture) objective lens. However, in a case where a diameter w of a light beam spot approximates a shortest record mark length (where a record mark length is a horizontal length shown in FIG. 2, for example), it is likely that the shortest record mark is formed to be longer at the rear edge of the record mark. In order to shorten the rear edge of the record mark, the erasing power is set to be higher.

Japanese Laid-Open Patent Application No. 63-266633 discloses an optical information recording method. In this method, when data is recorded to an optical disc, light emission periods and/or light emission powers are controlled so that light-emission energies at a front end mark portion and a rear end mark portion is larger than an intermediate mark portion. Japanese Patent Publication No. 5-32811 (Japanese Laid-Open Patent Application No. 63-113938) discloses an optical information recording method. In this method, when data is recorded to a phase-change optical disc, after a laser light power level is increased from a phase-change recording-layer crystallization power up to recording-layer-melting recording power, the power is instantaneously reduced to a power lower than the crystallization power.

In the above-described information recording methods in the related art, as a result of considering accidental tilting of a phase-change media and unexpected variation of a semiconductor-laser (laser diode) light-emission power, the recording powers (such as the powers PWA and PWB) are set at high-side levels. Accordingly, it is likely that a recording layer of a phase-change medium is will be substantially deteriorated. This also cause substantial degradation of overwriting performance. Heat accumulation conditions in the phase-change medium are different for different record mark lengths, and undesired mark edge shifts increase. As a result, jitter in a reproduced signal may increase. By setting the recording laser powers at high-side levels, the life of the semiconductor laser may be shortened.

By setting the erasing power to be higher in order to shorten the rear edge of the record mark, as mentioned above, the overall recording power increases.

If the recording layer heating power is lowered, it is likely that insufficient heating will now permit an amorphous phase to be properly formed. If the erasing power is lowered, erasing of previous record marks may not be completely performed, thereby, jitter may increase, and proper overwriting may not be performed. As shown in FIG. 3, the possible number of overwriting operations, that is, how many proper overwriting operations can be performed on a phase-change medium clearly depends on recording power, that is, a semiconductor-laser laser-diode (LD) output power (erasing power and heating power). For those reasons, it is demanded that appropriate LD output powers be used for phase-change medium information recording.

When information is recorded in a phase-change medium in the PWM method, each of a heating pulse and a cooling pulse used has a pulse span of 0.5T as shown in FIG. 2 as 'B' and 'C' of 'LIGHT EMISSION POWER', where 'T' represents each period of the recording channel clock pulses (shown in FIG. 2 as 'CHANNEL CLOCK PULSES').

Specifically, in order to increase the mark length of a record mark by a length corresponding to the time 1T, heating pulse and cooling pulse pair are added to a multi-pulse light-emission power. FIG. 4 shows typical recording light-emission waveforms according to this format. In use such multi-pulse light-emission waveforms, a heating and cooling condition is fixed for providing various lengths of record marks in a phase-change medium. Thereby, undesired mark edge shifts depending on the record mark lengths can be reduced. Further, when high-speed recording is performed using such recording waveforms, the same recording waveforms can be used together with the recording channel clock pulses which have a a higher frequency, such 2×, 4×, etc. As the frequency of the recording channel clock pulses increases, the frequency of the pulses of the recording waveforms increases accordingly while the original waveforms are maintained substantially identical but the actual pulse spans narrow accordingly. The increasing rate of the frequency of the recording channel clock pulses is the same as an increasing rate of a recording line velocity (a line velocity of a recording head with respect to a recording medium).

Japanese Patent Publication No. 62-11412 discloses an optical information recording apparatus in which rise or decay of a recording signal waveform is delayed by a predetermined duration, and, thereby, a variation in a duty ratio in a detection signal obtained during reproducing is canceled. Japanese Patent Publication No. 5-32811 discloses an optical information recording method in which, when data is recorded in a phase-change optical disc, after a laser light power level is increased from a phase-change recording-layer crystallization power up to recording-layer-melting recording power, the power is instantaneously reduced into a power lower than the crystallization power.

In a case where information is recorded in a phase-change medium in the PWM method (which may be referred to as a 'mark edge method', hereinafter), it is important that light-sufficient heating and sharp cooling is performed on a recording mark forming portion so that front and rear mark edges are sharply formed. However, in the case where the frequency of a recording channel clock pulses is increased twice, four times, . . . at the same rate as an increasing rate of a recording line velocity, the pulse spans of heating and cooling pulses of a recording waveform narrow accordingly.

Accordingly, it may be difficult to increase a recording layer temperature enough and to cool the recording layer so sharply as to properly change the phase. As a result, mark forming cannot be adequately performed and a precise mark length cannot be obtained.

Where high-speed recording is performed, the rising time and decaying time in a recording light-emission waveform of a semiconductor laser drive circuit is long with respect to each period of the recording channel clock pulses. When a 9T mark is formed, as shown in FIG. 5A, a bluntness actually occurs in heating and cooling pulses of a recording light-emission power waveform. That is, rise and decay of the light-emission power level is performed so slowly that each of the corners in the waveform of the heating and cooling pulses becomes rounded as shown in the figure. Because of this effect, sufficient heating and cooling of the recording layer of a phase-change medium may not be performed, and, as a result, a resulting record mark has a undesired substantially shorter mark length. FIG. 5B shows an eye pattern of an RF signal which is obtained as a result of reproducing such substantially shortened recording marks. In FIG. 5B (eye pattern), waveforms obtained from recording marks for various recording data lengths (3T, 4T, 5T, . . . ) are indicated in a manner in which those waveforms are superimposed. In the eye pattern, as a reading head is located at a record mark of the phase-change medium, the RF signal level is higher to the +V (mark) side. As the reading head is located at a space of the phase-change medium, the RF signal level is lower to the −V (space) side. In a case where each record mark is formed without such substantial shortening of mark lengths, as a recording data length is longer, a longer duration causes at which the RF signal from the record mark for the recording data length is maintained at a high level at the +V side. However, in the example of FIG. 5B, although a recording data length is longer, the RF signal from the record mark for the recording data length cannot be maintained at such a higher level but gradually decays, as shown in the figure, due to the problem of such a mark length being substantially shortened. In order to prevent such a problem from occurring, it is necessary to prepare a semiconductor laser drive circuit having a high response performance when high-speed recording is performed. For this purpose, the circuit will be of a large scale and/or is of high manufacturing costs.

SUMMARY OF THE PRESENT INVENTION

A first object of the present invention is to provide information recording in which overall recording power can be reduced while record mark edges can be sharply formed, thereby increasing the life of a light source, overwriting performance of a phase-change medium being improved, undesired edge shifts due to accumulated heat based on mark lengths being prevented, and jitter being reduced.

A second object of the present invention is to provide information recording in which sufficient heating time and cooling time can be achieved, and, thereby, record marks of a given mark lengths can be obtained when high-speed recording is performed without requiring light source drive means having a high response performance.

In the present invention, the head heating pulse includes a front division and a rear division, the difference in light-emission power between the rear division of the heat heating pulse and an immediately following cooling pulse being larger than the difference in light-emission power between another heating pulse and an immediately following cooling pulse. Thereby, it is possible to sharply form the front edge of a record mark, and it is possible to reduce jitter between record marks.

In another aspect of the present invention, the light-emission power of the cooling pulse immediately following the head heating pulse is lower than the light-emission power of a following cooling pulse. Thereby, it is possible to sharply form the front edge of a record mark, and it is possible to reduce jitter between record marks. Furthermore, it is possible to reduce the average light-emission power and, improve overwriting performance of a recording medium.

In another aspect of the present invention, the difference in light-emission power between the tail heating pulse of the rear heating pulse and an immediately following cooling pulse is larger than the difference in light-emission power between another heating pulse and an immediately following cooling pulse. Thereby, it is possible to sharply form the rear edge of a record mark, and it is possible to reduce jitter between record marks.

Further, it may also be preferable that the light-emission power of the tail cooling pulse which immediately follows the tail heating pulse of the rear heating pulse is lower than another cooling pulse. It is possible to sharply form the rear edge of a record mark, and, thereby, it is possible to reduce jitter appearing between record marks. Furthermore, it is possible to reduce the average light-emission power and, thereby, overwriting performance of a recording medium can be improved.

In another aspect of the present invention, the head heating pulse includes a front division and rear division, each of the difference in light-emission power between the rear division of the head heading pulse and the immediately following cooling pulse and the difference between the tail heating pulse of the rear heating pulse and the immediately following cooling pulse being larger than the difference in light-emission power between another heating pulse and the immediately following cooling pulse. Thereby, it is possible to sharply forming the front and rear edge of a record mark, and it is possible to reduce jitter between record marks.

In another aspect of the present invention, the head heating pulse includes a front division and rear division, the light-emission power of the rear division of the head heating pulse is higher than another heating pulse, the light-emission power of the head cooling pulse immediately following the head heating pulse is lower than the light-emission power of another cooling pulse, the light-emission power of the tail heating pulse of the rear heating pulse is approximately equal to the light-emission power of the rear division of the head heating pulse, the light-emission power of the tail cooling pulse which immediately follows the tail heating pulse of the rear heating pulse is lower than the light-emission power of another cooling pulse. Thereby, it is possible to sharply form the front and rear edge of a record mark, and it is possible to reduce jitter between record marks. Furthermore, it is possible to reduce the average light-emission power and overwriting performance of a recording medium can be improved.

In another aspect of the present invention, when the shortest-length xT mark is formed, where T represents each period of reference clock pulses and x represents a predetermined natural number, the multi-pulse light includes the head heating pulse and the immediately following tail cooling pulse. When another longer length yT mark is formed, n times of a predetermined light emission is performed between the head heating pulse and the tail cooling pulse, the predetermined light emission including the rear heating pulse and rear cooling pulse, where n=y−x. Thereby, it is possible to set the total length (span) from the head cooling pulse to the tail cooling pulse sufficiently shorter than the shortest-length mark length, to make the sum of a recording spot diameter and the total length be an appropriate length, and to set a low erasing power. The average recording power can be reduced, and the overwriting performance of a recording medium can be improved while the life of a light source is increased.

In another aspect of the present invention, the recording layer recording material comprises $Ag_a In_b Sb_c Te_d$, where the subscripts 'a', 'b', 'c', 'd' represent positive real numbers, respectively. When data is recorded in a recording media, amorphous phase formation strongly depends on a sharp cooling condition from heating→cooling. Therefore, jitter characteristics depend on a difference in light-emission power levels between a heating pulse and an immediately following cooling pulse for each of front and rear edge of a record mark. It is possible to make front and rear edges of a record mark sharper in recording the record mark in a recording medium. As a result, the above-mentioned jitter reduction is remarkably effective. By applying this recording layer, the actual length of the resulting record mark tends to be in proportion to the total length, and the relationship tends to appear to be approximately a straight line. The application of this recording layer enables easy control of actual mark lengths. Further, by combining the recording layer of this recording material together with the former aspect of the present invention, the overwriting performance of a recording medium can be improved.

In another aspect of the present invention, depending on a semiconductor laser (LD) light spot diameter, a shortest-length mark length, and a space length, the total length (span) of a recording waveform, pulse spans, partial light-emission power are controlled. Thereby, mark edge portions can be precisely defined so as to form a precise length of a record mark. That is, undesired edge shifts due to mark length deviation can be prevented. Further, necessary increase/decrease of recording power and erasing power can be maintained at a minimum amount, and wide density recording from high-density recording to low-density recording can be performed. Further, the life of a semiconductor laser can be elongated, the overwriting performance of a recording medium can be improved, and jitter degradation due to insufficient erasing can be prevented.

Further, as described above, by using recording material of $Ag_a In_b Sb_c Te_d$, the overwriting performance improvement and jitter reduction can be effectively performed.

By using an optical pickup having a single or a plurality of optical systems, it is possible to perform recording in different recording modulation systems or different recording line densities. Thereby, it is possible to provide a compatible information recording and reproducing apparatus which can conform to various standards.

In an aspect of the present invention, the total span from the head heating pulse to the tail cooling pulse is changed depending on a shortest-length record mark size and an effective spot diameter of the light on the recording medium. A record mark having an ideal length can be formed while maintaining heating power and erasing power at not so high a level. Thereby, a recording layer will not be degraded, different line density recordings can be performed, and degradation of the overwriting performance of a recording medium can be prevented.

In another aspect of the present invention, when the effective spot diameter is approximately smaller than the shortest-length xT record mark for forming a yT length record mark, n sets of the rear cooling and rear heating pulses occur between the head heating pulse and the tail cooling pulse, where n=y−x+1. When the effective spot diameter is approximately larger than the shortest-length xT record mark for forming a yT length record mark, n sets of the rear cooling pulse and rear heating pulses occur between the head heating pulse and the tail cooling pulse, where n=y−x. An ideal length of a record mark can be formed while it is possible to maintain heating power and erasing power at not so high a level. Thereby, a recording layer will not be degraded, different line density recording can be performed, and degradation of the overwriting performance of a recording medium can be prevented.

In another aspect of the present invention, the pulse span of the head cooling pulse of the tail cooling pulse is changed depending on a shortest-length record mark size and an effective spot diameter of the light on the recording medium. Thereby, it is possible to more finely control the total length (span) of the recording waveform. Even if an optical pickup having a different effective LD spot diameter is used or a different line density recording is performed, it is possible to prevent degradation of the overwriting performance and jitter characteristics.

In another aspect of the present invention, the head heating pulse is divided into a front division and a rear division, at least one of the difference in light-emission power between the rear division of the head heating power and the immediately following cooling pulse and the difference in light-emission power between the tail heating pulse of the rear heating and the immediately following cooling pulse is changed from the difference between another heating pulse and the immediately following cooling pulse, depending on the shortest-length record mark size and an effective spot diameter of the light on the recording medium. Thereby, it is possible to reduce jitter between recording marks, and as the average recording power can be reduced, the overwriting performance can be improved.

Further, when the effective spot diameter of the light on the recording medium is approximately smaller than the shortest-length record mark, at least one of the difference in light-emission power between the rear division of the head heating power and the immediately following cooling pulse and the difference in light-emission power between the tail heating pulse of the rear heating and the immediately following cooling pulse is larger than the difference between another heating pulse and the immediately following cooling pulse. Satisfactory sharp cooling condition can be provided for front and rear edge portions of the mark. Thereby, jitter between record marks can be reduced, and, as the average recording power can be reduced, the overwriting performance can be improved.

Otherwise, when the effective spot diameter of the light on the recording medium is approximately larger than the shortest-length record mark, at least one of the differences in light-emission power between the rear division of the head heating power and the immediately following cooling pulse and the difference in light-emission power between the tail heating pulse of the rear heating and the immediately following cooling pulse is smaller than the difference between another heating pulse and the immediately following cooling pulse. In this way, as cooling time is maintained, the front and rear edges of a record mark are cause to be shortened. Thereby, undesired edge shifts can be prevented, and jitter characteristics can be improved.

Further, as discussed above, the recording layer recording material comprises $Ag_a In_b Sb_c Te_d$, wherer the subscripts 'a', 'b', 'c', 'd' represent positive real numbers, respectively. The jitter characteristics are strongly depending on a difference in light-emission power between a heating pulse and a cooling pulse for each of front and rear edges of a record mark. The jitter reduction effect in the above-discussed aspects of the present invention is remarkable. The relationship between the total length from the head cooling pulse to the tail cooling pulse is approximately linear and mark lengths can be easily controlled.

Another aspect of the present invention comprises an optical pickup including one or a plurality of optical systems, using a semiconductor laser light-source having a single or a plurality of effective spot diameters, for performing information recording in a plurality of recording line densities. Accordingly, without substantially changing heating power and/or erasing power, satisfactory jitter characteristics and overwriting performance can be offered for recording in all line densities.

In another aspect of the present invention, when recording data of a mark length of one of an even-number of T and an odd-number of T, where T represents each period of reference clock pulses, the pulse span of each of the rear cooling pulse and rear heating pulse is approximately equal to the period T. Thereby, sufficient heating time and cooling time can be provided without needing to make a light-source drive unit be of high speed, a predetermined length of mark can be precisely provided, even when high speed recording is performed.

The pulse spans of the rear cooling pulse and rear heating pulse are set so that the difference between the total span of all the cooling pulses and the total span of all the heating pulses in light-emission of the rear cooling pulse, rear heating pulse and tail cooling pulse is approximately equal between the even-number of T length recording data and the odd-number of T length recording data. This avoids undesired edge shifts for cases of forming the even-number of T length marks and for cases of forming odd-number of T length marks. Further, without needing to make a light-source drive unit to be of high speed, a predetermined length of mark can be precisely provided, even when high speed recording is performed.

In another aspect of the present invention, the center rear heating pulse has a pulse span of 0.5T and each of the two cooling pulses occurring immediately before and after the center rear pulse has a pulse span of 0.75T or the center rear cooling pulse has a pulse span of 0.5T and each of the two heating pulses occurring immediately before and after the center rear pulse has a pulse span of 0.75T in light emission having an alternate repetition of the rear heating pulse and rear cooling pulse. A sufficiently long pulse span is provided for each of heating pulse and cooling pulse for the front and rear edges of a record mark. Thus, sharp edge portions can be provided, and jitter in a reproduced signal can be reduced.

In another aspect of the present invention, the center rear heating pulse has a pulse span of 1.5T and each of the two cooling pulses occurring immediately before and after the center rear pulse has a pulse span of 1.25T or the center rear cooling pulse has a pulse span of 1.5T and each of the two heating pulses occurring immediately before and after the center rear pulse has a pulse span of 1.25T in light emission having an alternate repetition of the rear heating pulse and rear cooling pulse. Even in a middle portion of the mark, a width thereof is not thin because sufficient heating and cooling pulse spans are provided even for the middle portion of the mark. Therefore, jitter reduction can be effected.

Further, it is preferable that the pulse span of either heating pulse or cooling pulse of one of the rear cooling pulse, rear heating pulse and tail cooling pulse is corrected so as to make heating and cooling conditions equal between cases of forming an even-number of T length marks and cases of forming an odd-number of T length marks. Thereby, an even slight edge shift which would otherwise occur due to difference in medium heating and cooling condition between cases of forming even-number of T length marks and cases of forming an odd-number of T length marks can be completely compensated.

Further, by using recording material of $Ag_aIn_bSb_cTe_d$, the relationship between the total length from the head cooling pulse to the tail cooling pulse is approximately linear. Thereby, mark lengths can be easily controlled. An even slight edge shift which otherwise occur due to difference in medium heating and cooling condition between cases of forming even-number of T length marks and cases of forming an odd-number of T length marks can be further precisely compensated.

The above-described various aspects of the present invention can be appropriately combined. For example, light-emission power of the multi-pulse light is adjusted; the number of pulses for alternately heating and cooling the recording layer for forming and defining a record mark is adjusted; and the pulse span of at least one of the pulses for alternately heating and cooling the recording layer for forming and defining a record mark is adjusted. Numerous embodiments can be provided by appropriately combining those aspects of the present invention for obtaining desired shapes of record marks based on desired conditions/factors such as recording line density, recording medium material and structure, light-source spot diameter, and so forth.

Other objects and further features of the present invention will become more apparent from the following detailed description when read in conjunction with the accompanying drawings.

BRIEF DESCRIPTION OF THE DRAWINGS

FIGS. 30A, 30B and 30C show seventeenth, eighteenth, nineteenth, twentieth, twenty-first, twenty-second, twenty-third and twenty-fourth embodiment of the present invention, FIG. 30A showing a general configuration diagram of an optical pickup of an information recording and reproducing apparatus, FIG. 30B showing a variant embodiment where an objective lens and an aperture shown in FIG. 30A are replaced by two different objective lenses, FIG. 30C showing a variant embodiment where an objective lens and an aperture shown in FIG. 30A are replaced by two-cosue objective lens using a hologram;

DESCRIPTION OF THE PREFERRED EMBODIMENTS

Figure 6:
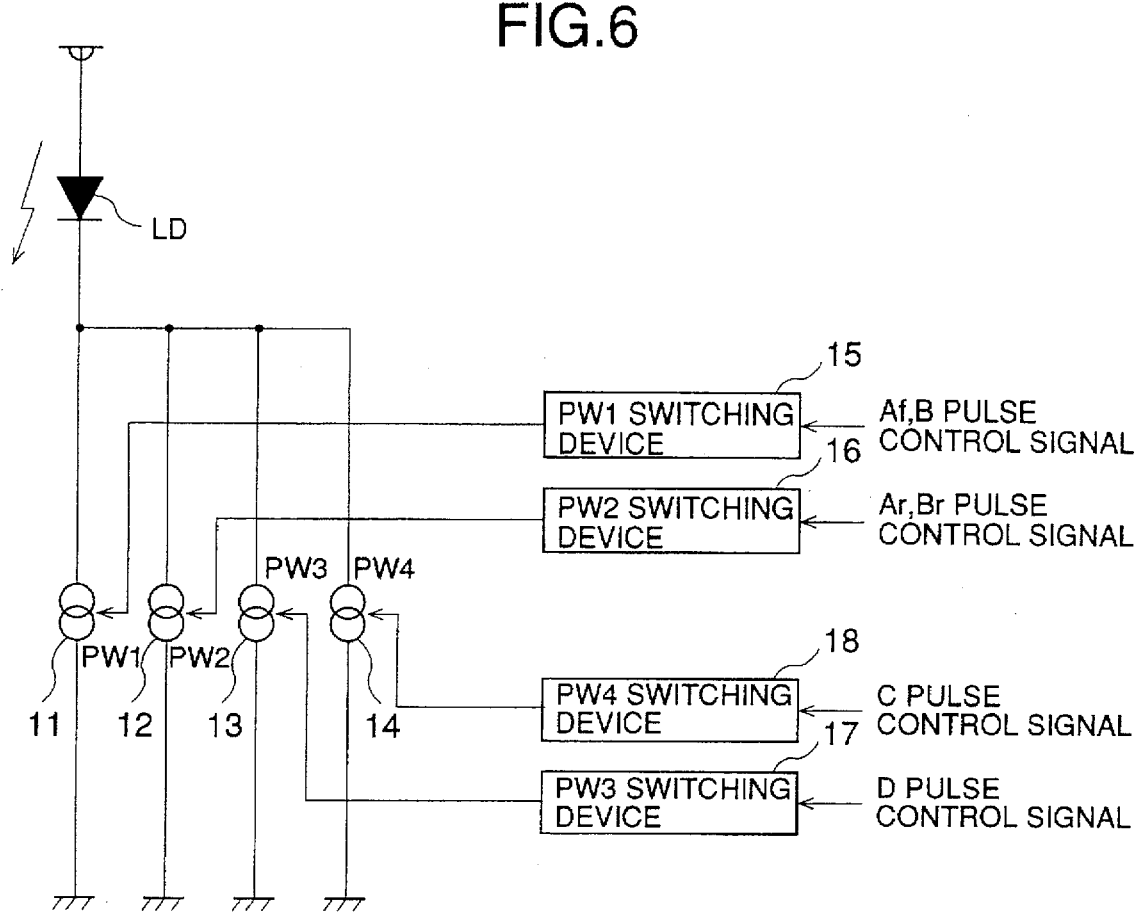
FIG. 6 shows a block diagram of part of an information recording and reproducing apparatus in a first embodiment of the present invention.
Figure 7:
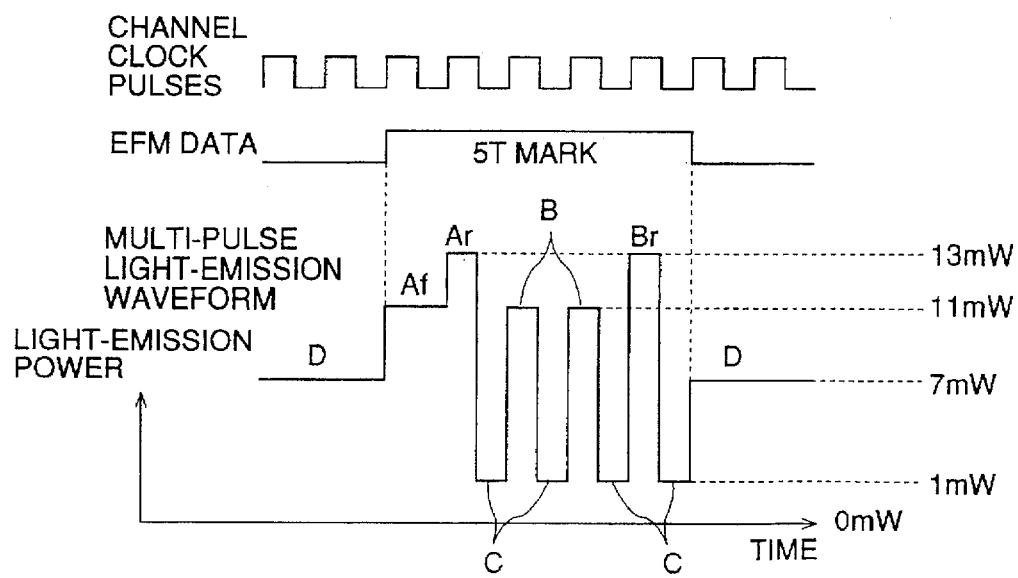
FIG. 7 shows a timing chart illustrating operation timing of the apparatus shown in FIG. 6.
Figure 8:
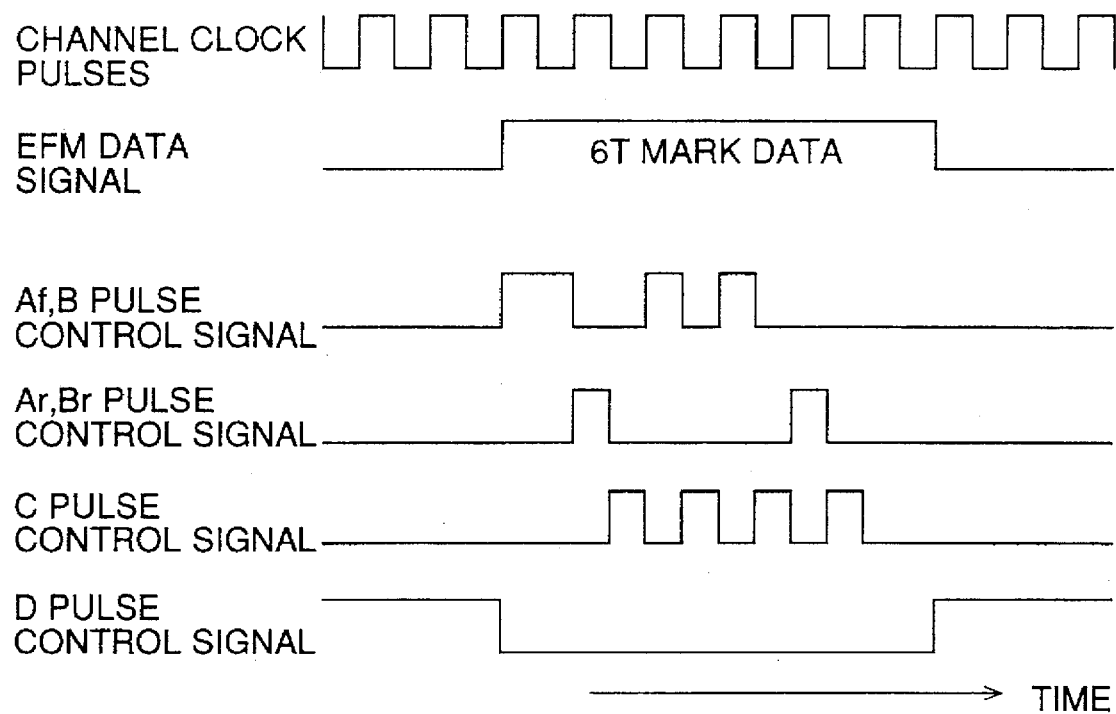
FIG. 8 shows another timing chart illustrating operation timing of the apparatus shown in FIG. 6.

FIG. 6 shows part of an information recording and reproducing apparatus in a first embodiment of the present invention. FIGS. 7 and 8 show timing charts thereof.

This information recording and reproducing apparatus is one example of an information recording and reproducing apparatus which records (overwrites) CD-ROM format code data in the phase-change medium (recording layer) of a phase-change optical disc. The data modulation method applied to this apparatus is a method using EFM code, and the above-mentioned mark edge (PWM) recording method is applied to this apparatus.

In this information recording and reproducing apparatus, when information is recorded in a phase-change optical disc, light intensity control means (not shown in the figure) produces pulse control signals based on a given EFM data. A semiconductor laser drive circuit (including devices 11, 12, 13, 14, 15, 16 and 17 shown in FIG. 6) drives a light source of a semiconductor laser LD through driving electric currents according to pulse control signals. Thus, the semiconductor laser LD emits multi-pulse light shown in FIG. 7. The phase-change optical disc (not shown in the figure) is rotated by a spindle motor (not shown in the figure), and, in an optical head (not shown in the figure), the multi-pulse light from the semiconductor laser LD is incident, through an optical system, on the phase-change medium of the phase-change optical disc. Thereby, record marks are formed in the phase-change medium and thus information is recorded. In this information recording and reproducing apparatus, when recorded information (in the form of record marks and spaces in a phase-change medium) is reproduced from such a phase-change optical disc, the semiconductor laser drive circuit drives the semiconductor laser LD, which emits light with reproduction power (reading power). In the optical head, the reproduction power light from the semiconductor laser LD is incident, through the optical system, on the phase-change medium of the phase-change optical disc. Light reflected by the phase-change medium is received by light receiving means (not shown in the figure) through the optical system. The light receiving means converts the received light into an electric signal, and a reproduced signal is obtained.

In a case where information is recorded in such a phase-change medium according to the PWM method (which type of recording may be referred to as 'PWM recording', hereinafter), for the purpose of improving the jitter characteristics of a reproduced signal, the light-emission power of heating pulses may be set to a higher level. However, conversely, in order to improve the overwriting performance of a phase-change medium, the light-emission power of heating pulses may be set to a lower level. Accordingly, in the related art, the light-emission power of heating pulses is set to a value which is a balance between the jitter characteristics of a reproduced signal and the overwriting performance of a phase-change medium. Therefore, in the related art, it is difficult to set the light-emission power of heating pulses to an optimum value with respect to both the jitter characteristics of a reproduced signal and to the overwriting performance of a phase-change medium.

The information recording and reproducing apparatus in the first embodiment of the present invention performs PWM recording so that the jitter characteristics of a reproduced signal may be improved, and the overwriting performance of a phase-change medium may be improved. In this information recording and reproducing apparatus, as shown in FIG. 7, multi-pulse light emitted from the semiconductor laser LD includes head heating pulses Af and Ar, head cooling pulses C, a following plurality of rear heating pulses B, Br and rear cooling pulses C.

The head heating pulse Af, Ar includes a front division Af and a rear division Ar. The light-emission power of the rear division Ar is set to be at a higher level than the light-emission power in the related art. Conversely, the light-emission power of the front division Af is set to be at a lower level than the light-emission power in the related art. The light-emission power of the tail heating pulse Br is set to be at a higher level similar to the light-emission power of the rear division of head heating pulse Ar. Light emitted from the semiconductor laser LD provides a mark forming portion which includes the above-described multiple pulses, and an erasing portion which includes an erasing pulse D.

The above-described light-emission power set values are as follows:

the light-emission power of the front division Af of the head heating pulse: 11 mW;

the light-emission power of the rear division Ar of the head heating pulse: 13 mW;

the light-emission power of each of the rear heating pulses B: 11 mW;

the light-emission power of the tail heating pulse Br: 13 mW;

the light-emission power of each of the cooling pulses C: 1 mW (which is approximately equal to a reading power such as that described above); and the light-emission power of the erasing pulse D (erasing power): 7 mW.

In this information recording and reproducing apparatus, by using a recording waveform such as that shown in FIG. 7, the difference in light-emission power from the heating pulse Ar to the following cooling pulse C in the multiple pulses for forming the front edge of a record mark in a phase-change medium is 12 mW. Similarly, the difference in light-emission power from the heating pulse Br to the following cooling pulse C in the multiple pulses for forming the rear edge of a record mark in a phase-change medium is 12 mW. As mentioned above, each of the heating pulses Ar and Br is set to be at a higher level than that in the related art. As a result, each of those differences in light-emission power from the heating pulses Ar and Br to the following cooling pulses C, respectively, is greater than that in the related art. It is considered that for forming the front and rear edges of a record mark in a phase-change medium, a satisfactory sharp cooling condition is obtained in the information recording and reproduction apparatus in the first embodiment of the present invention. As a result, sharper mark edges are obtained. In fact, assuming that each of the differences in light-emission power from the heating pulses to the following cooling pulses for forming the front and rear edges of a record mark, respectively, in the related art is 11 mW, it is possible to reduce a jitter σ/Tw (where 'Tw' represent a window span) allowance by approximately 2% in this embodiment in comparison to the related art. Further, the maximum number of times for overwriting under the jitter condition of σ/Tw is approximately 1.5 times in comparison to the related art. It is noted that the above-mentioned set values of the respective light-emission power are merely typical values. In practice, those values are optimized depending on recording materials, medium layer configurations/arrangements and so forth.

The above-mentioned semiconductor laser LD (which acts as an optical information reading and writing head) has constant electric currents supplied thereto by constant-current sources 11, 12, 13 and 14, respectively, as shown in FIG. 6. A constant-current source 11 supplies a constant electric current for light-emission power of the front division Af of the head heating pulse and light-emission power of the rear heating pulse B of PW1 (11 mW). A constant-current source 12 supplies a constant electric current for light-emission power of the rear division Ar of the head heating pulse and light-emission power of the tail heating pulse Br of PW2 (13 mW). A constant-current source 14 supplies a constant electric current for light-emission power of the cooling pulse C of PW4 (1 mW). A constant-current source 13 supplies a constant electric current for light-emission power of erasing power D of PW3 (7 mW).

The light intensity control means (not shown in the figure as mentioned above), based on given EFM data, produces an Ar, B pulse control signal, an Ar, Br pulse control signal, a C pulse control signal and a D pulse control signal. According to the Ar, B pulse control signal, Ar, Br pulse control signal, C pulse control signal and D pulse control signal provided by the light intensity control means, switching devices 15, 16, 17 and 18 turn On and turn Off the constant-current sources 11, 12, 13 and 14, Thus, the semiconductor laser LD is controlled to emit light with the multi-pulse light-emission waveform shown in FIG. 7.

This information recording and reproducing apparatus in the first embodiment, when recording information through light from the light source LD in a recording layer, which reversibly changes its phase between an amorphous phase and a crystal phase, a record mark is formed using multi-pulse light from the light source LD including the head heating pulse Af, Ar, head cooling pulse C, and the following plurality of read heating pulses B and read cooling pulses C, as shown in FIG. 7. The information recording and reproducing apparatus is provided with the light intensity control means and switching devices 15, 16, 17 and 18. As described above, the head heating pulse is divided into the front division Af and rear division Ar, and, the light-emission power difference between the rear division Ar and the immediately following cooling pulse C (13 (mW)−1 (mW) =12 (mW)) is larger than the light-emission power difference between each of the other rear heating pulses B and the respective immediately following cooling pulse C (11 (mW) −1 (mW)=10 (mW)). For forming a front edge of a record mark in a phase-change medium, a satisfactory sharp cooling condition is obtained in the information recording and reproduction apparatus in the first embodiment of the present invention. This enables the front edge of a a formed record mark to be sharply formed and jitter in the mark interval can be reduced.

Further, in the information recording and reproducing apparatus in the first embodiment, by the function of the light intensity control means and switching devices, as described above, the light-emission power difference between the tail heating pulse Br and the immediately following cooling pulse C (13 (mW)=1 (mW)=12 (mW)) is larger than the light-emission power difference between each of the other rear heating pulses B and the respective immediately following cooling pulse C (11 (mW)=1 (mW) =10 (mW)). For forming a rear edge of a record mark in a phase-change medium, a satisfactory sharp cooling condition is obtained in the information recording and reproduction apparatus in the first embodiment of the present invention. This enables a rear edge of a record mark to be sharply formed and jitter in the mark interval can be reduced.

Figure 9:
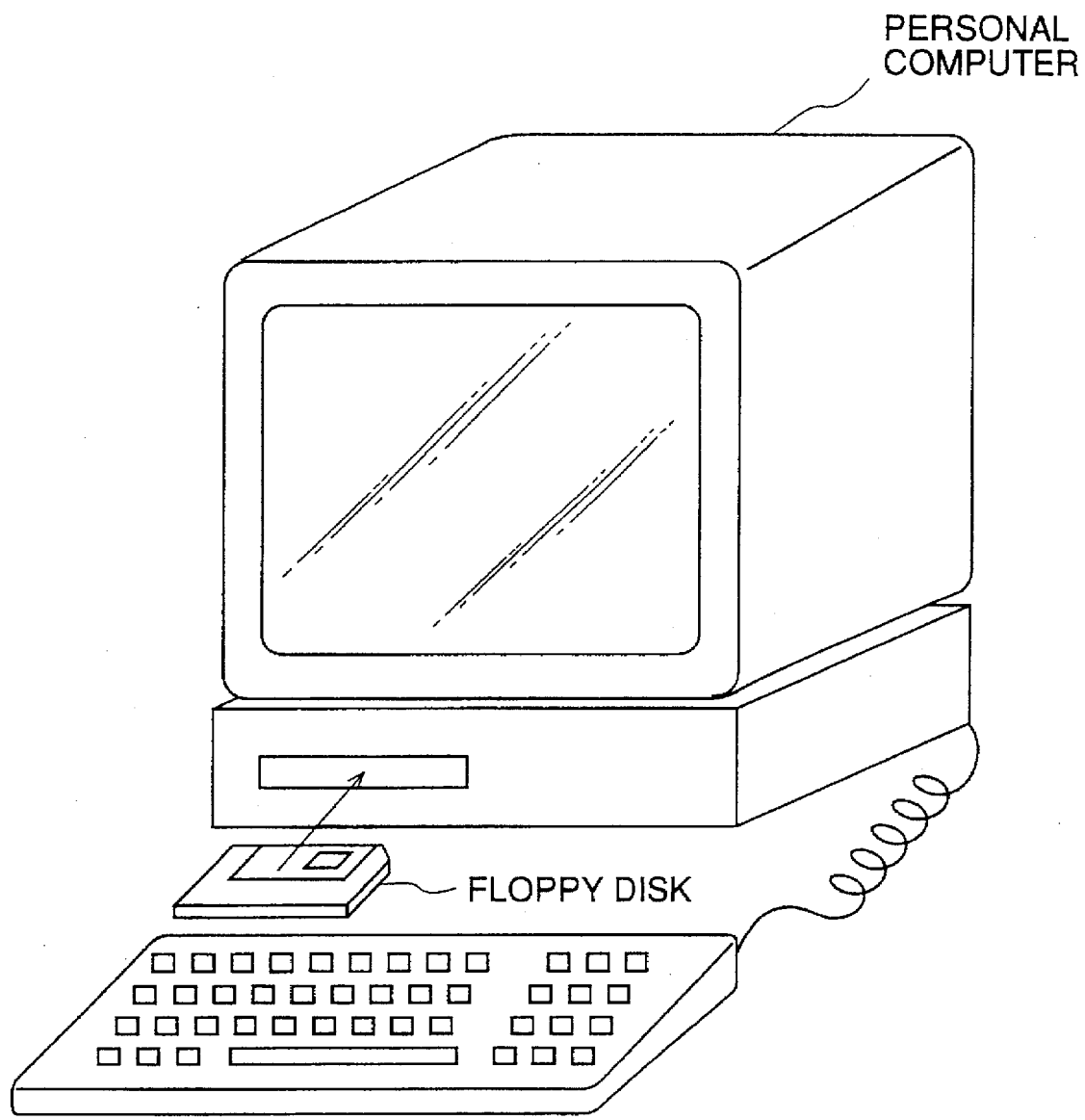
FIG. 9 shows a perspective view of a personal computer which can practice the present invention.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk.

Figure 10:
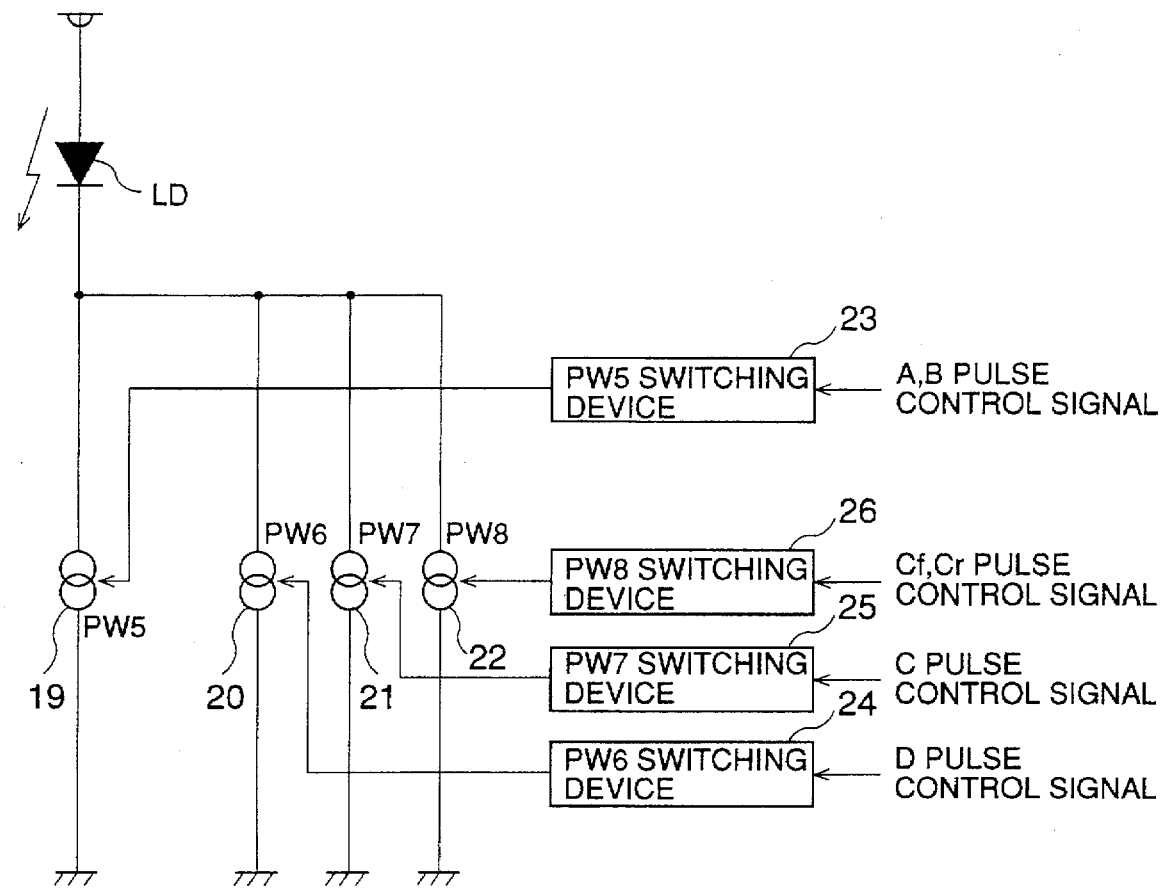
FIG. 10 shows a block diagram of part of an information recording and reproducing apparatus in a second embodiment of the present invention.
Figure 11:
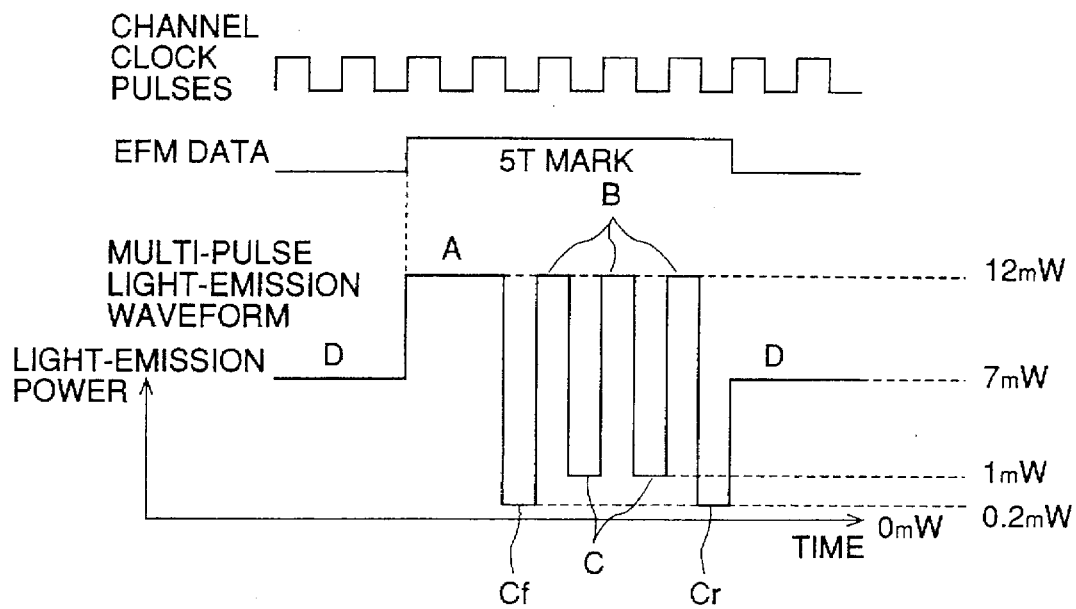
FIG. 11 shows a timing chart illustrating operation timing of the apparatus shown in FIG. 10.
Figure 12:
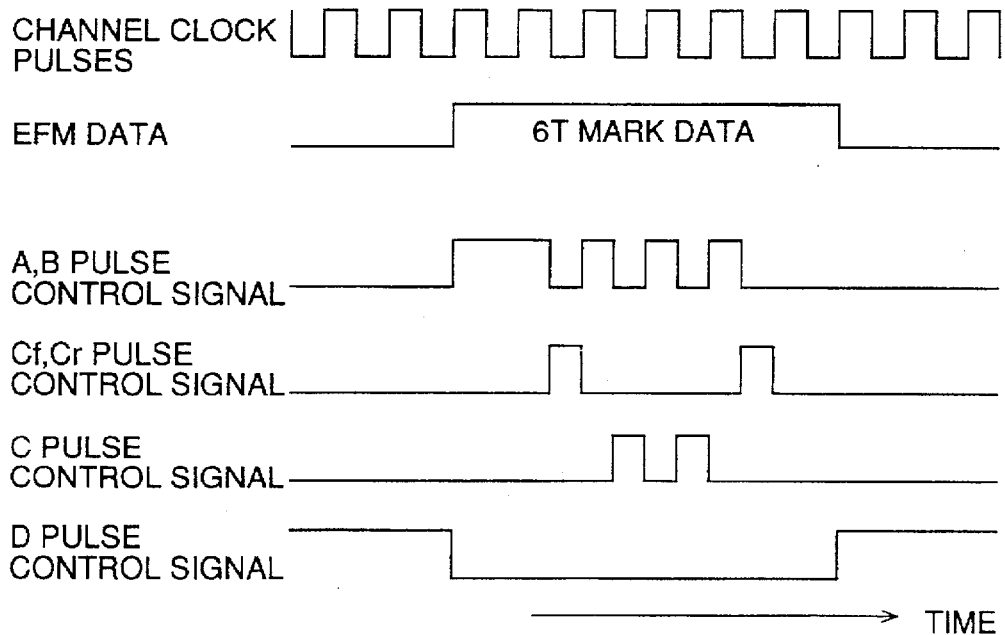
FIG. 12 shows another timing chart illustrating operation timing of the apparatus shown in FIG. 10.

FIG. 10 shows part of an information recording and reproducing apparatus in a second embodiment of the present invention. FIGS. 11 and 12 show timing charts of an operation thereof.

This information recording and reproducing apparatus in the second embodiment is also advantageous because an information recording manner is improved so that jitter characteristics in a reproduced signal from recorded information may be improved and overwriting performance of a recording medium may be improved. A basic information recording method and a basic light-emission waveform are similar to those of the above-described information recording and reproducing apparatus in the first embodiment. Different features of the information recording and reproducing apparatus in the second will now be described.

In the information recording and reproducing apparatus in the second embodiment, as shown in FIG. 11, a multi-pulse light-emission waveform of light emitted by the semiconductor laser LD includes a head cooling pulse Cf and a tail cooling pulse Cr, each of which has a light-emission power level lower than the other remaining cooling pulses C present between the head and tail cooling pulses Cf and Cr as shown in FIG. 11.

The above-described light-emission power set values are as follows:

the light-emission power (writing power) of each of the head heating pulse A and following heating pulses B: 12 mW;

the light-emission power of each of the head cooling pulse Cf and tail cooling pulses Cr: 0.2 mW;

the light-emission power of the other cooling pulses present between the head and tail cooling pulses: 1 mW (approximately equal to a reading power); and the light-emission power of the erasing pulse D (erasing power): 7 mW.

In this information recording and reproducing apparatus in the second embodiment, by using a recording waveform such as that shown in FIG. 10, the difference in light-emission power from the head heating pulse A to the immediately following head cooling pulse Cf in the multiple pulses for forming the front edge of a record mark in a phase-change medium is 11.8 mW. Similarly, the difference in light-emission power from the tail heating pulse B to the immediately following tail cooling pulse Cr in the multiple pulses for forming the rear edge of a record mark in a phase-change medium is 11.8 mW. Each of the heating head and tail cooling pulses Cf and Cr is set to be at a lower level than that in the related art. As a result, each of the differences in light-emission power from the head and tail heating pulses A, B to a respective one of the immediately following cooling pulses Cf and Cr is larger than that in the related art. For forming the front and rear edges of a record mark in a phase-change medium, a satisfactory sharp cooling condition is obtained in the information recording and reproduction apparatus in the second embodiment of the present invention. As a result, sharper mark edges are obtained. Assuming that each of the differences in light-emission power from the heating pulses to the immediately following cooling pulses for forming the front and rear edges of a record mark, respectively, in the related art is 11 mW, it is possible to reduce the allowable jitter σ/Tw by approximately 2% in this second embodiment in comparison to the related art. The maximum number of times for overwriting with a jitter condition of σ/Tw is approximately 1.3 times in comparison to the related art. It is noted that the above-mentioned set values of the respective light-emission power are merely typical values. In practice, the values are optimized depending on recording materials, medium layer configurations/arrangements and so forth.

The above-mentioned semiconductor laser LD (which acts an optical information reading and writing head as mentioned above) has constant electric currents supplied thereto by constant-current sources 19, 20, 21 and 22, respectively, as shown in FIG. 10. A constant-current source 19 supplies a constant electric current for light-emission power of the head heating pulse A and light-emission power of the rear heating pulse B of PW5 (12 mW). A constant-current source 20 supplies a constant electric current for light-emission power of erasing power D of PW6 (7 mW). A constant-current source 22 supplies a constant electric current for light-emission power of the head cooling pulse Cf and tail cooling pulse Cr of PW8 (0.2 mW). A constant-current source 21 supplies a constant electric current for light-emission power of the remaining intermediate cooling pulses C of PW7 (1 mW).

The light intensity control means (not shown in the figure), based on given EFM data, produces an A, B pulse control signal, a Cf, Cr pulse control signal, a C pulse control signal and a D pulse control signal. According to the A, B pulse control signal, Cf, Cr pulse control signal, C pulse control signal and D pulse control signal provided by the light intensity control means, switching devices 23, 24, 25 and 26 turn On and turn Off the constant-current sources 19, 20, 21 and 22. Thus, the semiconductor laser LD emits light with the multi-pulse light-emission waveform shown in FIG. 11.

The information recording and reproducing apparatus of the second embodiment, when recording information through light from the light source LD in a recording layer, which reversibly changes its phase between an amorphous phase and a crystal phase, a record mark is formed using multi-pulse light from the light source LD including the head heating pulse A, head cooling pulse Cf, and the following plurality of rear heating pulses B and rear cooling pulses C, tail heating pulse B and tail cooling pulse Cf, as shown in FIG. 11. The information recording and reproducing apparatus is provided with the light intensity control means and switching devices 23, 24, 25 and 26. The light-emission power level (0.2 mW) of head cooling pulse Cf immediately following the head heating pulse A is set to be lower than the light-emission power level (1 mW) of a further following cooling pulse C. For forming a front edge of a record mark in a phase-change medium, a satisfactory sharp cooling condition is obtained in the information recording and reproduction apparatus in the second embodiment of the present invention. A front mark edge can be sharply formed. As a result, jitter in record mark intervals can be reduced, overall recording light-emission power can be reduced and overwriting characteristics of a recording medium can be improved.

By providing the light intensity control means and switching devices 23, 24, 25 and 26, the light-emission power level (0.2 mW) of tail cooling pulse Cr immediately following the tail heating pulse B is set to be lower than the light-emission power level (1 mW) of other advancing intermediate cooling pulses C. For forming a front edge of a record mark in a phase-change medium, a satisfactory sharp cooling condition is obtained in the information recording and reproduction apparatus in the second embodiment of the present invention. A rear mark edge can be sharply formed. As a result, jitter in record mark intervals can be reduced, overall recording light-emission power can be reduced and overwriting characteristics of a recording medium can be improved.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 13:
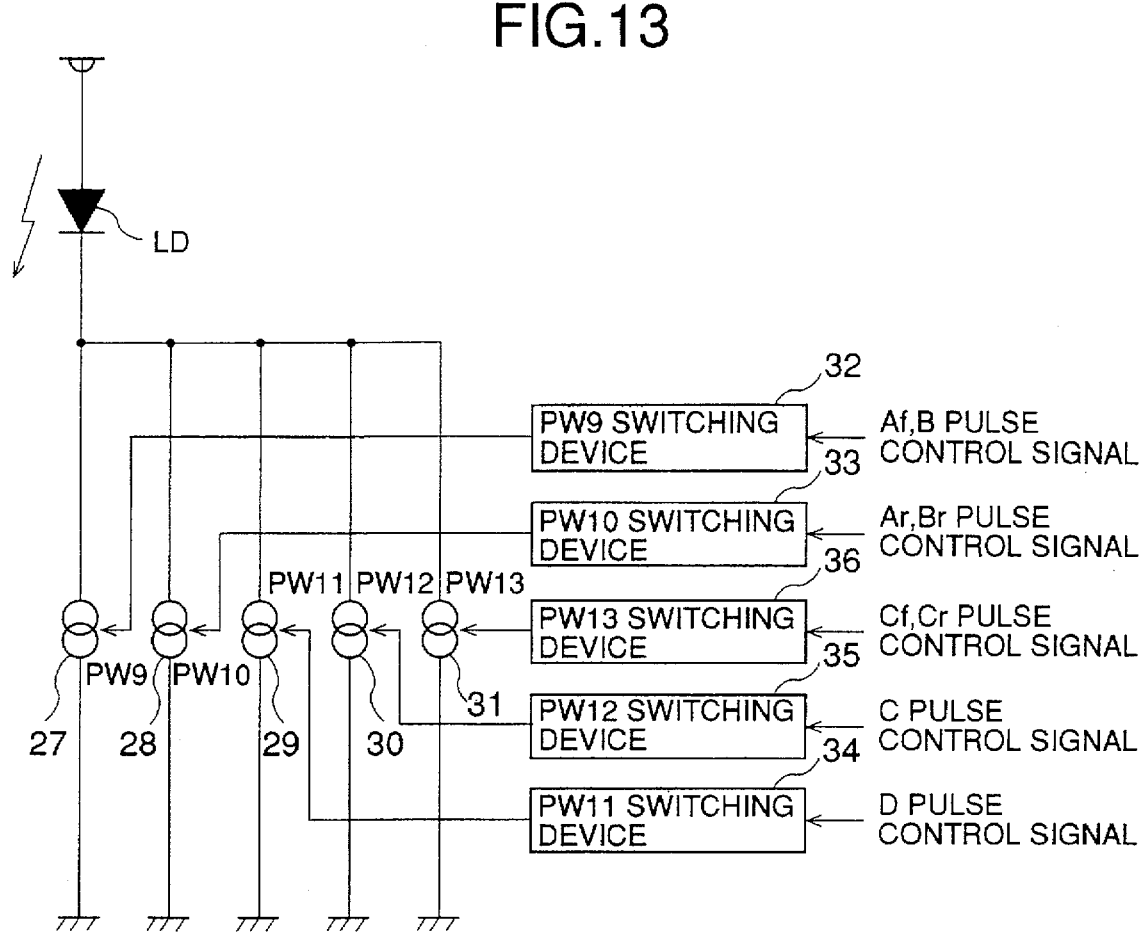
FIG. 13 shows a block diagram of part of an information recording and reproducing apparatus in a third embodiment of the present invention.
Figure 14:
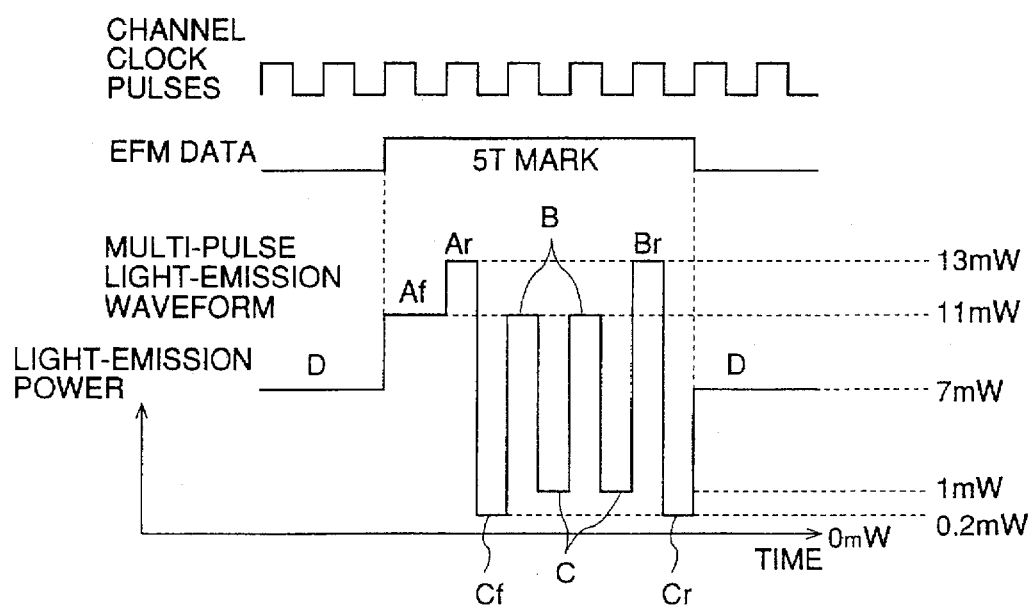
FIG. 14 shows a timing chart illustrating operation timing of the apparatus shown in FIG. 13.
Figure 15:
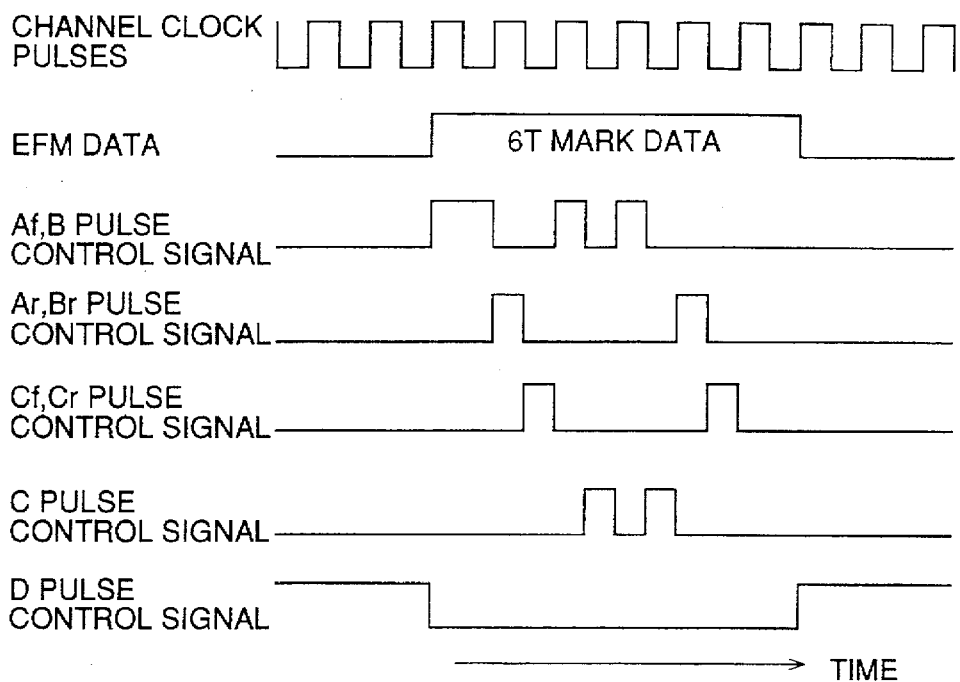
FIG. 15 shows another timing chart illustrating operation timing of the apparatus shown in FIG. 13.

FIG. 13 shows part of an information recording and reproducing apparatus of a third embodiment of the present invention. FIGS. 14 and 15 show timing charts of an operation thereof.

This information recording and reproducing apparatus in the third embodiment is also advantageous because the manner of information recording is improved so that jitter characteristics in a reproduced signal from a recorded information is improved and overwriting performance of recording medium is improved. The basic information recording method and light-emission waveform are similar to the above-described information recording and reproducing apparatus in the first embodiment. Different features of the information recording and reproducing apparatus in the third embodiment will now be described.

In the information recording and reproducing apparatus in the third embodiment, as shown in FIG. 14, a multi-pulse light-emission waveform of light emitted by the semiconductor laser LD includes a head heating pulse divided into a front division Af and a rear division Af, where the light-emission power level of the front division Af is set to be lower than that in the related art. Conversely, the light-emission power level of the rear division Ar is set to be higher than that in the related art. Further, the light-emission power level of the cooling pulse which immediately follows the head heating pulse Af, Ar is set to be lower than that of each of further following cooling pulses. The light-emission power level of the tail heating pulse Br is set to be higher than that in the related art. The light-emission power level of the tail cooling pulse Cr is set lower, similar to that of the head cooling pulse Cf.

The above-described light-emission power set values are as follows:

the light-emission power of the front division Af of the head heating pulse: 11 mW;

the light-emission power of the rear division Ar of the head heating pulse: 13 mW;

the light-emission power of the following intermediate heating pulses B; 11 mW;

the light-emission power of each of the head and tail cooling pulses Cf and Cr; 0.2 mW;

the light-emission power of each of the other intermediate cooling pulses C: 1 mW (approximately equal to a reading power);

the light-emission power of the erasing pulse D (erasing power): 7 mW.

In the information recording and reproducing apparatus of the third embodiment, by using a recording waveform such as that shown in FIG. 14, the difference in light-emission power from the rear division Ar of the head heating pulse to the immediately following head cooling pulse Cf for forming the front edge of a record mark in a phase-change medium is 12.8 mW. Similarly, the difference in light-emission power from the tail heating pulse Br to the immediately following tail cooling pulse Cr for forming the rear edge of a record mark in a phase-change medium is 12.8 mW. For forming the front and rear edges of a record mark in a phase-change medium, a satisfactory sharp cooling condition is obtained in the information recording and reproduction apparatus in the third embodiment of the present invention. As a result, sharper mark edges are obtained. Assuming that each of the differences in light-emission power from the heating pulses to the immediately following cooling pulses for forming the front and rear edges of a record mark, respectively, in the related art is 11 mW, it is possible to reduce jitter σ/Tw by approximately 4% in the third embodiment in comparison to the related art. Further, the average recording power can be reduced from the 7.5 mW in the related art to the 7.0 mW. The maximum number of times for overwriting where the jitter condition σ/Tw is satisfied can be increased approximately 2 times in comparison to the related art. It is noted that the above-mentioned set values of the respective light-emission power are merely typical values. In practice, the values are optimized depending on recording materials, medium layer configurations/arrangements and so forth.

The above-mentioned semiconductor laser LD (which acts an optical information reading and writing head as mentioned above) has constant electric currents supplied thereto by constant-current sources 27, 28, 29, 30, 31, respectively, as shown in FIG. 14. A constant-current source 27 supplies a constant electric current for light-emission power of the head heating pulse front division Af and light-emission power of the rear intermediate heating pulse B of PW9 (11 mW). A constant-current source 28 supplies a constant electric current for light-emission power of the head heating pulse rear division Ar and the light-emission power of the tail heating pulse Br of PW10 (13 mW). A constant-current source 29 supplies a constant electric current for light-emission power of the erasing power D of PW11 (7 mW). A constant-current source 30 supplies a constant electric current for light-emission power of the intermediate cooling pulses C of PW12 (1 mW). A constant-current source 31 supplies a constant electric current for light-emission power of the head and tail cooling pulses Cf and Cr of PW13 (0.2 mW).

The light intensity control means (not shown in the figure as mentioned above), based on given EFM data, produces an Af, B pulse control signal, an Ar, Br pulse control signal, an Cf, Cr pulse control signal, a C pulse control signal and a D pulse control signal. According to the Af, B pulse control signal, Af, Br pulse control signal, Cf and Cr pulse control signal, C pulse control signal and D pulse control signal provided by the light intensity control means, switching devices 32, 33, 34, 35 and 36 turn On and turn Off the constant-current sources 27, 28, 29, 30 and 31, Thus, the semiconductor laser LD emits light with the multi-pulse light-emission waveform shown in FIG. 14.

The information recording and reproducing apparatus of the third embodiment, when recording information through light from the light source LD in a recording layer, which reversibly changes its phase between a amorphous phase and a crystal phase, forms a record mark using multi-pulse light from the light source LD including the head heating pulse Af, Ar, head cooling pulse Cf, and the following plurality of rear heating pulses B, Br and rear cooling pulses C, Cr, tail heating pulse B and tail cooling pulse Cf, as shown in FIG. 11. The information recording and reproducing apparatus is provided with the light intensity control means and switching devices 32, 33, 34, 35 and 36. The head heating pulse is divided into the front division Ar and rear division Ar, and, each of the light-emission power difference from the head heating pulse rear division Af to the immediately following head cooling pulse Cf and the light-emission power difference from the tail heating pulse Br in the rear heating pulses B, Br to the immediately following tail cooling pulse Cr is greater than the light-emission power difference from each of the other heating pulse B to the immediately following cooling power C. For forming the front and rear edges of a record mark in a phase-change medium, a satisfactory sharp cooling condition is obtained in the information recording and reproduction apparatus of the third embodiment of the present invention. Thus, front and rear mark edges can be sharply formed. As a result, jitter in record mark intervals can be reduced.

Further, the information recording and reproducing apparatus of the third embodiment, when recording information through light from the light source LD in a recording layer, which reversibly changes its phase between a amorphous phase and a crystal phase, forms a record mark using multi-pulse light from the light source LD including the head heating pulse Af, Ar, head cooling pulse Cf, and the following plurality of rear heating pulses B, Br and rear cooling pulses C, Cr, tail heating pulse B and tail cooling pulse Cf, as shown in FIG. 11. The information recording and reproducing apparatus is provided with the light intensity control means and switching devices 32, 33, 34, 35 and 36. The head heating pulse is divided into the front division Ar and rear division Ar, the light-emission level of the head heating pulse rear division Ar is greater than that of the rear intermediate heating pulse B, the light-emission power level of the head cooling pulse Cf which immediately follows the head heating pulse Af, Ar is lower than that of the further following intermediate cooling pulses C, the light-emission power level of the tail heating pulse Br in the rear heating pulses B, Br is approximately equal to the head heating pulse rear division Ar, and the light-emission power level of the tail cooling pulse Cr which immediately follows the tail heating pulse Br is lower than that of the intermediate cooling pulses C. For forming the front and rear edges of a record mark in a phase-change medium, a satisfactory sharp cooling condition is obtained in the information recording and reproduction apparatus in the third embodiment of the present invention. Front and rear mark edges can be sharply formed. As a result, jitter in record mark intervals can be reduced. Further, the average recording power can be reduced, and the overwriting performance of a phase-change medium can be improved.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 16:
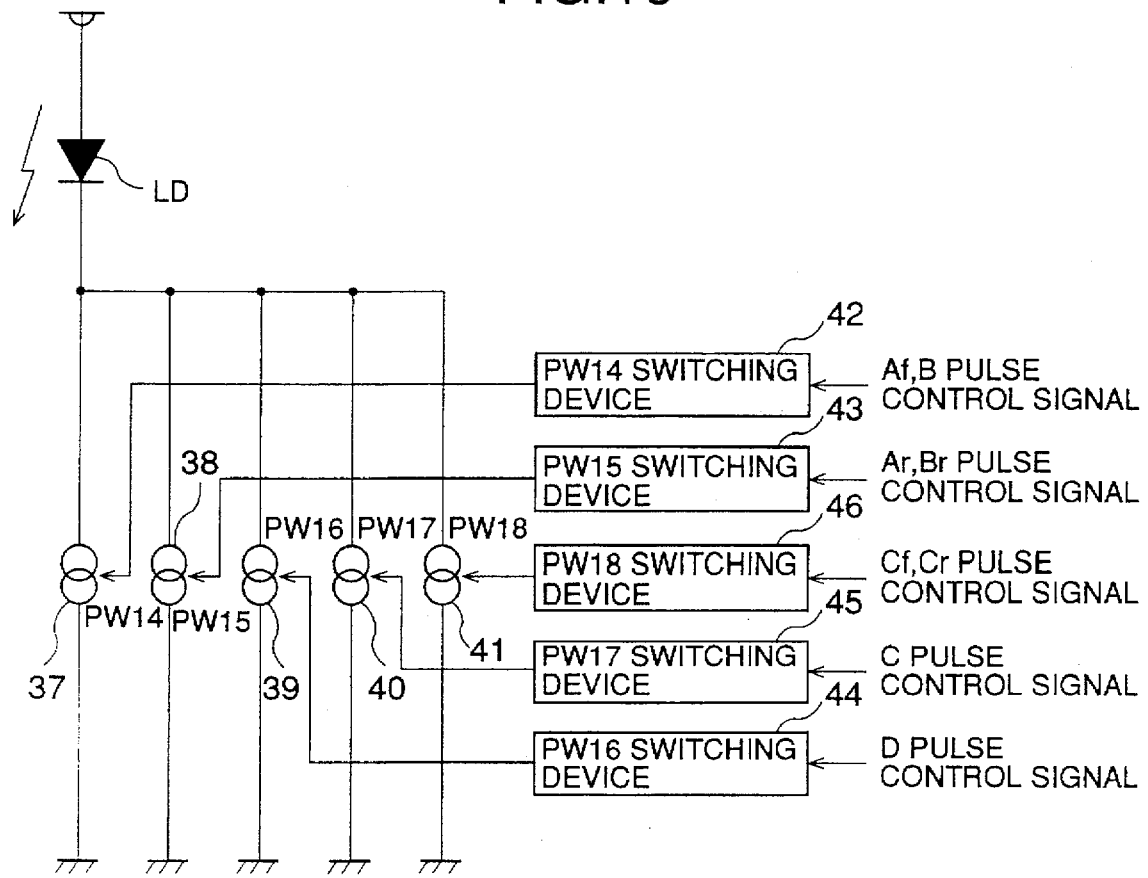
FIG. 16 shows a block diagram of part of an information recording and reproducing apparatus in a fourth embodiment of the present invention.
Figure 17:
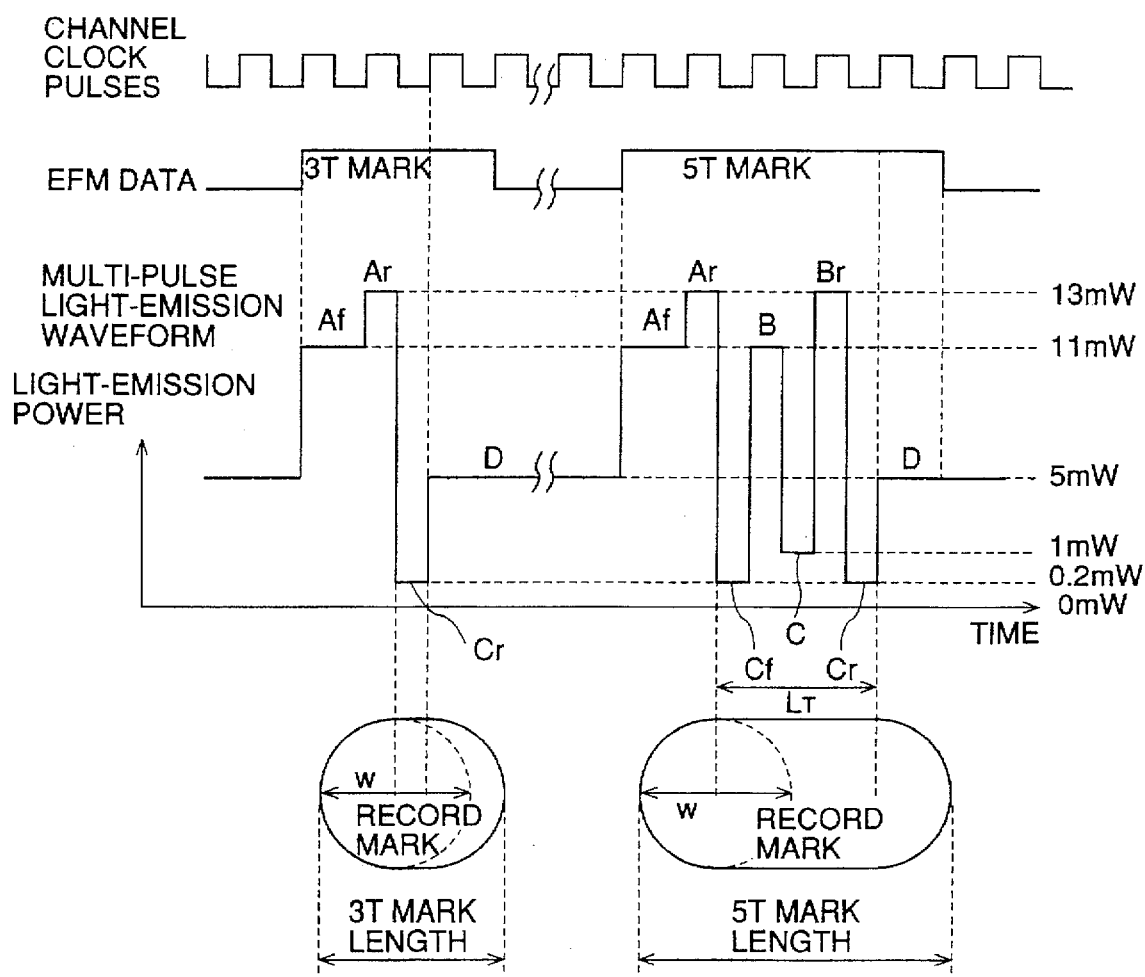
FIG. 17 shows a timing chart illustrating operation timing of the apparatus shown in FIG. 16.
Figure 18:
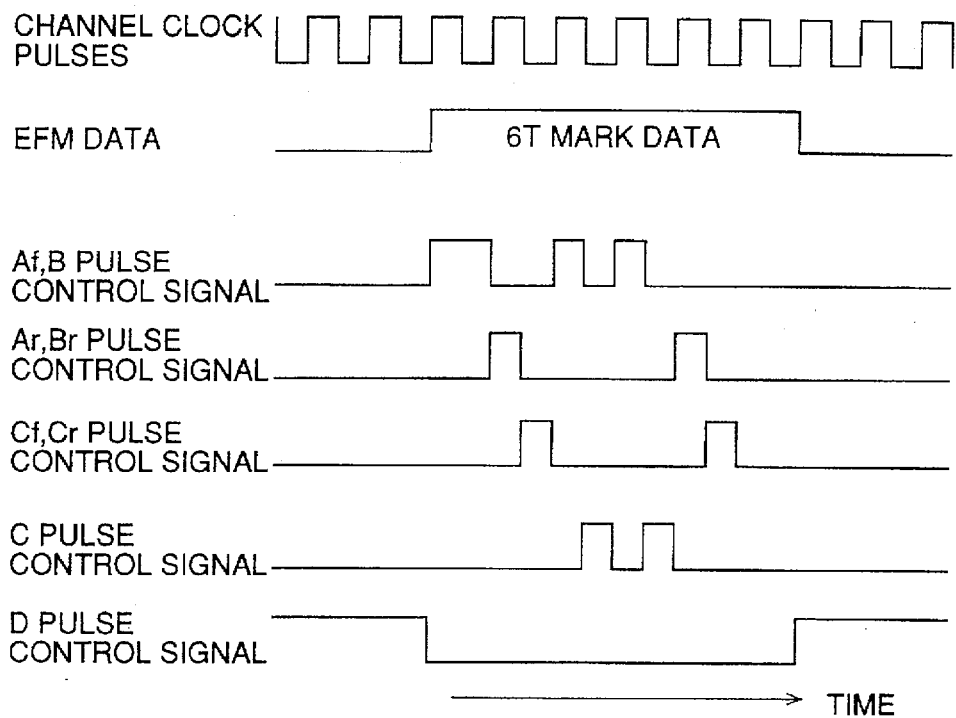
FIG. 18 shows another timing chart illustrating operation timing of the apparatus shown in FIG. 16.

FIG. 16 shows part of an information recording and reproducing apparatus in a fourth embodiment of the present invention. FIGS. 17 and 18 show timing charts of an operation thereof.

A basic information recording method is similar to that of the information recording and reproducing apparatus in the first embodiment. Different features of the information recording and reproducing apparatus in the fourth embodiment will now be described.

EFM code used in this information recording and reproducing apparatus performs PWM recording using marks and spaces, each having a length (in the recording line direction) corresponding to the number of times of the period T in a range between 3T and 11T where 'T' represent each period of channel clock pulses or recording channel clock pulses. The recording method used in this information recording and reproducing apparatus in the fourth embodiment of the present invention is advantageous especially in a case where high-density recording is performed and the recording spot diameter w formed on a recording medium through a semiconductor laser LD approximates the shortest mark length (as a result of the recording spot being relatively large in comparison to the shortest mark length).

Figure 2:
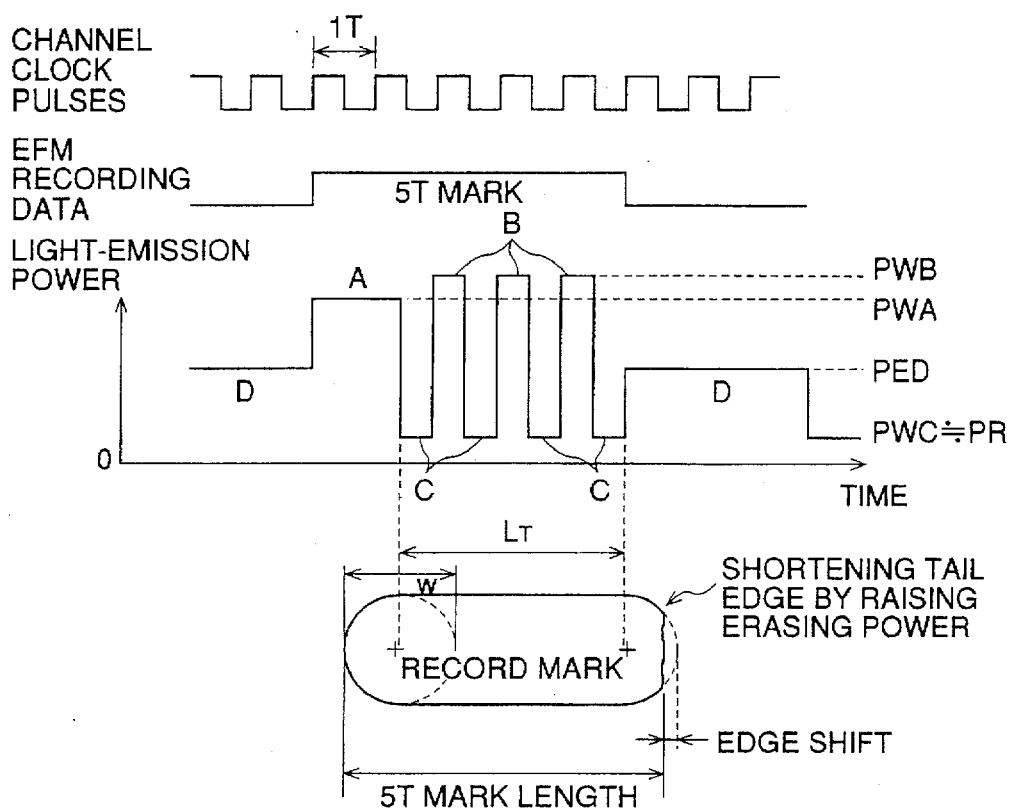
FIG. 2 shows a operation timing chart illustrating operation timing of another information recording system in the related art when forming a record mark.
Figure 3:
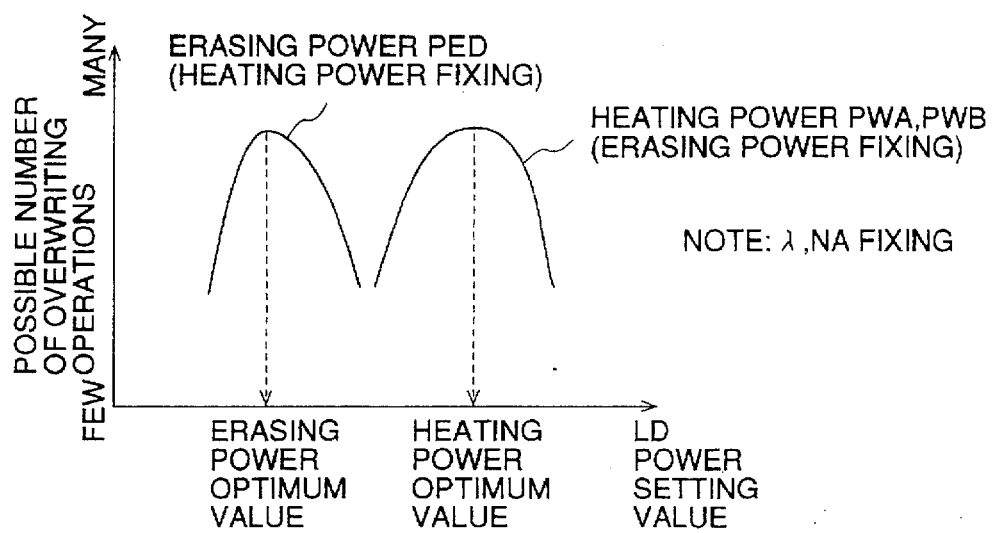
FIG. 3 illustrates how the overwriting performance depends on recording power, and shows a relationship between a semiconductor laser (LD) power and the possible number of times of overwriting.

In the related art, as shown in FIG. 2, a semiconductor laser emits a head heating pulse A, and a cooling pulse C and a heating pulse B alternatively repeated 'n' times (which number 'n' is obtained so that n=y–2). Thus, a sharp cooling condition is maintained. The tail cooling pulse C (between the third heating pulse B and the erasing pulse D) terminates formation of the record mark. In this information recording method in the related art, when the shortest record mark is formed, the sum ($L_T$+w) of the total length $L_T$ from the head cooling pulse to the tail cooling pulse and recording spot diameter w greatly exceeds the shortest mark length which corresponds to 3T or the length which the optical head moves relatively forward with respect to the phase-change medium surface during the time 3T. In order to prevent such a situation, the erasing power of the erasing pulse D is set to a higher level. Accordingly, at the rear edge of the record mark, the temperature of the recording medium is caused to rise rapidly up to a crystallization temperature. The rear edge of the record mark is shortened during the mark formation. As a result, the average or overall recording power to be applied to a phase-change medium increases, and the overwriting performance of the phase-change medium may be degraded.

In the information recording and reproducing apparatus of the fourth embodiment of the present invention, when the 3T (record) mark (which is the shortest mark) is recorded, a multi-pulse light-emission waveform of light emitted from the semiconductor laser LD includes, as shown in FIG. 17, for the left side mark, the head heating pulse which is divided into the front division Af and the rear division Ar, wherein the light-emission power of the rear division Ar is set higher than in the related art, and the light-emission power of the front division Af is set higher than in the related art. The tail cooling pulse Cr is provided immediately subsequent to the rear division Ar, where the light emission power of the tail cooling pulse Cr is lower than a light-emission pulse C provided at other than the head and tail cooling pulses Cf and Cr in a case where another longer length record mark is formed.

For forming of another longer record mark length 'y', rear cooling pulses Cf, C and a rear heating pulse B, Br are alternately repeated 'n' times, where 'n'=y–3, between the head heating pulse Af, Ar and the tail cooling pulse Cr. For the head cooling pulse Cf of the 'n' rear cooling pulses Cf, C, the light-emission power level is set lower similar to be to that of the tail cooling pulse Cr. For the tail heating pulse Br of the 'n' rear heating pulses B, Br, the light-emission power level is set higher to be similar to that of the rear division Ar of the head heating pulse. Thus, the recording waveform for the 5T record mark is that shown in FIG. 17, right side one.

The above-described light-emission power set values are as follows:

the light-emission power of the front division Af of the head heating pulse: 11 mW;

the light-emission power of the rear division Ar of the head heating pulse: 13 mW;

the light-emission power of the tail heating pulse Br: 13 mW;

the light-emission power of each of the other intermediate heating pulses B; 11 mW;

the light-emission power of each of the head and tail cooling pulses Cf and Cr; 0.2 mW;

the light-emission power of each of the other intermediate cooling pulses C: 1 mW (approximately equal to a reading power);

the light-emission power of the erasing pulse D (erasing power): 5 mW.

In the information recording and reproducing apparatus of the fourth embodiment, by using a recording waveform such as that shown in FIG. 17, the difference in light-emission power from the rear division Ar of the head heating pulse to the immediately following head cooling pulse Cf in the multiple pulses for forming the front edge of a record mark in a phase-change medium is 12.8 mW. Similarly, the difference in light-emission power from the tail heating pulse Br to the immediately following tail cooling pulse Cr in the multiple pulses for forming the rear edge of a record mark in a phase-change medium is 12.8 mW. For forming the front and rear edges of a record mark in a phase-change medium, a satisfactory sharp cooling condition is obtained in the information recording and reproduction apparatus of the fourth embodiment of the present invention. As a result, sharper mark edges are obtained. Assuming that each of the differences in light-emission power from the heating pulses to the immediately following cooling pulses for forming the front and rear edges of a record mark, respectively, in the related art is 11 mW, the differences are increased, respectively, in the fourth embodiment of the present invention. As a result, similarly to the case of the above-described third embodiment, the jitter characteristic σ/Tw can be reduced.

Further, in the information recording and reproducing apparatus in the fourth embodiment of the present invention, the shortest mark length can be obtained although the total length $L_T$ from the head cooling pulse Cf to the tail cooling pulse Cr is set substantially shorter than the shortest mark length (corresponding to 3T, in the example shown in FIG. 17, left side) when the shortest mark is formed. This is because the total length of the number of repetitions of heating and cooling is reduced. For example, in the related art shown in FIG. 2, the total number of cooling pulses C is 4 for the 5T mark. In contrast to this, in the fourth embodiment shown in FIG. 17 for example, the total number of cooling pulses Cf, C and Cr is 3 for the same 5T mark. Thus, the sum of the above-mentioned total length $L_T$ and the recording spot diameter w can have an appropriate length. Therefore, it is not necessary to set the erasing power level (D) to be so high as to shorten the rear edge of a record mark. Therefore, the average or overall recording power can be reduced from 7.5 mW in the related art to 6.0 mW in the fourth embodiment of the present invention. Further, the number of times for overwriting where the jitter condition σ/Tw is satisfied is approximately 2 times in comparison to the related art. Thereby, it is possible to increase the life of the semiconductor laser LD. It is noted that the above-mentioned set values of the respective light-emission power are merely typical values. In practice, the values are optimized depending on recording materials, medium layer configurations/arrangements and so forth.

The above-mentioned semiconductor laser LD (which acts an optical information reading and writing head as mentioned above) has constant electric currents supplied thereto by constant-current sources 37, 38, 39, 40 and 41, respectively, as shown in FIG. 16. A constant-current source 37 supplies a constant electric current for light-emission power of the head heating pulse front division Af and light-emission power of the rear intermediate heating pulse B of PW14 (11 mW). A constant-current source 38 supplies a constant electric current for light-emission power of the head heating pulse rear division Ar and the light-emission power of the tail heating pulse Br of PW10 (13 mW). A constant-current source 39 supplies a constant electric current for light-emission power of the erasing power D of PW16 (5 mW). A constant-current source 40 supplies a constant electric current for light-emission power of the intermediate cooling pulses C of PW17 (1 mW). A constant-current source 41 supplies a constant electric current for light-emission power of the head and tail cooling pulses Cf and Cr of PW18 (0.2 mW).

The light intensity control means (not shown in the figure as mentioned above), based on given EFM data, produces an Af, B pulse control signal, an Ar, Br pulse control signal, an Cf, Cr pulse control signal, a C pulse control signal and a D pulse control signal. According to the Af, B pulse control signal, Af, Br pulse control signal, Cf and Cr pulse control signal, C pulse control signal and D pulse control signal provided by the light intensity control means, switching devices 42, 43, 44, 45 and 46 turn On and turn Off the constant-current sources 37, 38, 39, 40 and 41, Thus, the semiconductor laser LD emits light with the multi-pulse light-emission waveform shown in FIG. 17.

In the information recording and reproducing apparatus of the fourth embodiment of the present invention, when recording a record mark having the shortest mark length xT (the multiple of the period T) of various possible mark lengths, the light intensity control means and switching devices 42, 43, 44 and 46 causes the light source LD to emit multiple pulses including the head heating pulse Af, Ar and immediately following tail cooling pulse Cr, as shown in FIG. 17, for the left side mark. In the information recording and reproducing apparatus of the fourth embodiment of the present invention, when recording a record mark having other any length yT of the various possible mark lengths (each being a multiple of the period T) including the maximum length other than the shortest length xT, the light intensity control means and switching devices 42, 43, 44 and 46 causes the light source LD to emit multiple pulses including head heating pulse Af, Ar and tail cooling pulse Cr, and further, rear cooling pulses C and rear heating pulses B are alternately repeated 'n' times (where n=y−x) between the head heating pulse Af, Ar and tail cooling pulse Cr, as shown in FIG. 17, for the right side mark. It is noted that 'x' and 'y' represent natural numbers. In the example for the right side mark, x=3, y=5, and n=5−3=2, and the cooling pulse C and heating pulse B, Br are alternately repeated twice between the head heating pulse Af, Af and tail cooling pulse Cr.

Further, as described above, the sum of the above-mentioned total length and the recording spot diameter can have an appropriate length. Therefore, it is not necessary to set the erasing power level to be so high as to shorten the rear edge of a record mark. Therefore, the average or overall recording power can be reduced. Further, the overwriting performance of a phase-change medium can be improved, that is, the maximum possible times of overwriting which can be performed on a phase-change medium can be increased. It is also possible to elongate the life of the semiconductor laser LD.

The above-described features of the fourth embodiment of the present invention concerning the total number or total duration of heating and cooling pulses with respect to a desired mark length can also be applied to each of the above-described second and third embodiments of the present invention.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Information recording and reproducing apparatus of fifth, sixth, seventh, and eighth embodiments of the present invention will now be described. The information recording and reproducing apparatus in the fifth, sixth, seventh, and eighth embodiments are obtained from the above-described information recording and reproducing apparatus in the first, second, third and fourth embodiments of the present invention, respectively, by applying the recording layer of a phase-change medium which uses compositions of Ag—In—Sb—Te as the recording material. (With regard to the compositions of Ag—In—Sb—Te, see U.S. Pat. No. 5,156,693, issued to Ide et al.)

As representative examples of a material for a recording layer of a phase-change recording medium, materials such as Ge—Sb—Te, Ge—Te—Sb—S, Te—Ge—Sn—Au, Ge—Te—Sn, Sb—Se, Sb—Se—Te, Sn—Se—Te, Ga—Se—Te, Ga—Se—Te—Ge, In—Se, In—Se—Te, Ag—In—Sb—Te, and the like are used in the related art.

In each of the information recording and reproducing apparatus in the fifth, sixth, seventh and eighth embodiments, by applying the recording layer of a phase-change medium which uses compositions of Ag—In—Sb—Te as the recording material, when data is recorded in a phase-change media of the recording material, amorphous phase formation strongly depends on a sharp cooling condition from heating→cooling. Therefore, jitter characteristics depend on a difference in light-emission power level between a heating pulse and an immediately following cooling pulse for each of front and rear edges of a record mark. It is possible to make front and rear edges of a record mark be sharper in recording the record mark in a phase-change medium in the information recording and reproducing apparatus in comparison to the case of each of the first, second, third and fourth embodiments. As a result, by applying the recording layer of a phase-change medium which uses compositions of Ag—In—Sb—Te as the recording material, the above-mentioned jitter reduction remarkably effective in the fifth, sixth, seventh and eighth embodiments.

Figure 19:
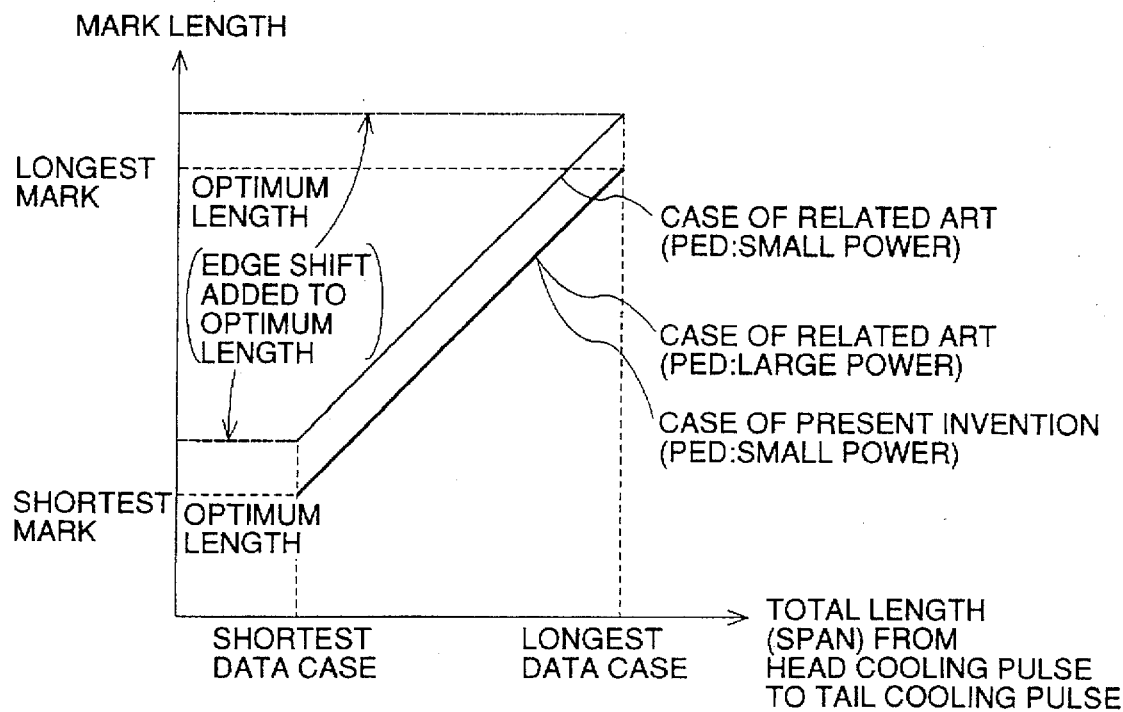
FIG. 19 shows characteristics illustrating a relationship between the total length (span) from the head cooling pulse Cf to the tail cooling pulse Cr and the length of a resulting record mark (comparison between case of using recording material according to fifth, sixth seventh and eighth embodiments of the present invention and cases of using recording material in the related art)

FIG. 19 shows a relationship between the total length $L_T$ of a head cooling pulse to a tail cooling pulse in a multiplies light-emission power waveform and the actual length (in the recording line direction) of a resulting record mark in each of the fifth, sixth, seventh, and eighth embodiments. As shown in the figure, by applying the recording layer of a phase-change medium which uses compositions of Ag—In—Sb—Te as the recording material, the actual length of the resulting record mark tends to be in proportion to the total length, and the relationship tends to appear to be approximately a straight line in the figure. The application of the recording layer of a phase-change medium which uses compositions of Ag—In—Sb—Te as the recording material enables easy control of actual mark lengths even while a basic recording waveform is different as shown in the third embodiment. For example, by using the arrangement in recording light-emission waveform, in particular, the number of repetitions of the intermediate cooling and heating pulses such as the pulses Cf, B, C and Br shown in FIG. 17, together with applying the recording layer of a phase-change medium which uses compositions of Ag—In—Sb—Te as the recording material, the overwriting performance of a phase-change medium can be improved. Further, even if another recording material is used as a recording layer of the phase-change medium, the relationships between semiconductor laser LD light-emission power, jitter characteristics and overwriting performance and the relationships between recording pulse spans and mark lengths are basically the same. Thereby, the advantages of the present invention are still maintained.

Figure 20:
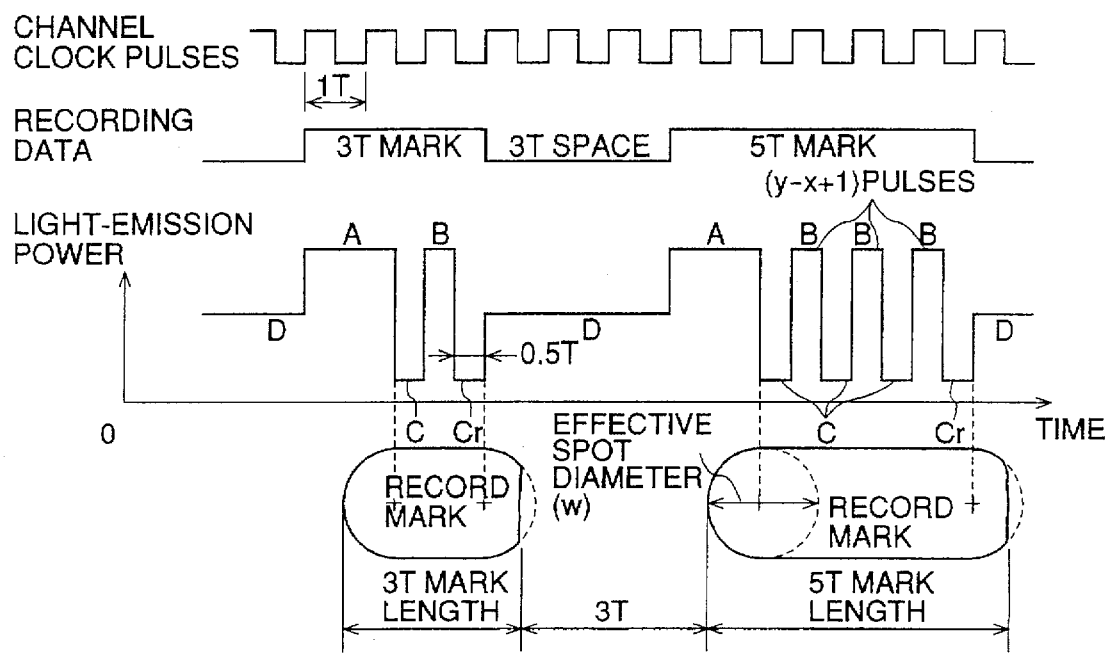
FIG. 20 shows an operation timing of a ninth embodiment of the present invention when a record mark is formed.
Figure 21:
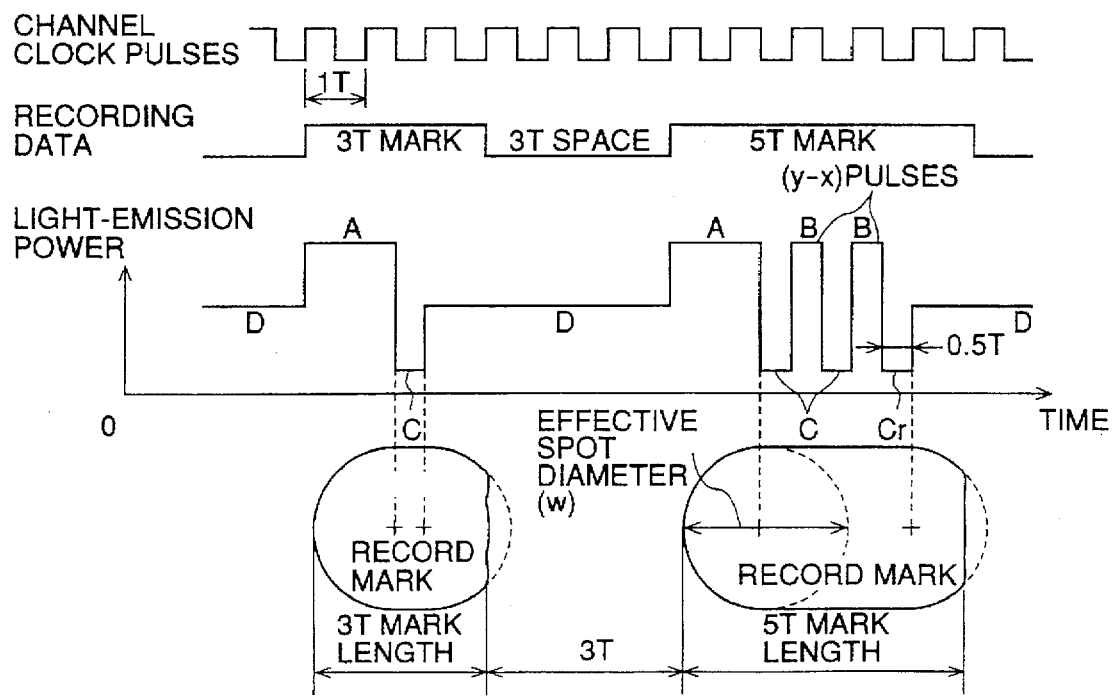
FIG. 21 shows an operation timing of a variant embodiment of the ninth embodiment of the present invention when a record mark is formed.

FIGS. 20 and 21 show mark recording operation timing charts illustrating an information recording system of a ninth embodiment and a variant embodiment of the present invention, respectively.

In the ninth embodiment, CD-ROM format code data is recorded (overwritten) in a recording layer of a phase-change medium such as a phase-change optical disc. The data modulation method applied to this system is a method using EFM (Eight Fourteen Modulation) code, and the above-mentioned mark edge (PWM) recording method is applied to this apparatus. In this information recording system, a semiconductor later LD (Laser Diode) emits multi-pulse light in use of such a recording medium and recording data, record marks are formed in the recording medium, and information is recorded. As shown in FIGS. 20 and 21, for the right side marks, a mark forming portion of the multi-pulse light-emission waveform includes a head heating pulse A for preliminarily heating the recording layer or recording film of a phase-change medium substantially equal to or above its melting point, a following plurality of successive heating pulses B, and successive cooling pulse C, Cr between the successive heating pulses B. Each space is formed between adjacent record marks by an erasing pulse D.

Similar to each of the above-described first, second, third and fourth embodiment, in an information recording and reproducing apparatus including the above-described information recording system, when information is recorded in a phase-change optical disc, light intensity control means (not shown in the figure) produces pulse control signals based on a given EFM data. A semiconductor laser drive circuit drives a light source 1 of the semiconductor laser LD (of an optical head shown in FIG. 30A, for example, described later), through driving electric currents according to the pulse control signals. The semiconductor laser LD emits multi-pulse light such as that shown in FIGS. 20 and 21. The phase-change optical disc (not shown in the figure) is rotated by a spindle motor (not shown in the figure), and, in the optical pickup, the multi-pulse light from the semiconductor laser LD is emitted, through an optical system, the light being incident on the phase-change layer 7a of the phase-change optical disc 7 (shown in FIG. 30A). Record marks are formed in the phase-change optical disc 7 and information is recorded. In this information recording and reproducing apparatus, when recorded information (in the form of record marks and spaces in a phase-change optical disc) is reproduced from such a phase-change optical disc, the semiconductor laser drive circuit drives the semiconductor laser LD, which emits light with reproduction power (reading power). In the optical pickup, the reproduction power light from the semiconductor laser LD is emitted, through the optical system, the reproduction light being incident on the phase-change layer 7a of the phase-change optical disc 7. Light reflected by the phase-change layer 7a is received by light receiving means 10 (shown in FIG. 30A) through the optical system. The light receiving means 10 converts the received light into an electric signal, and a reproduced signal is obtained.

When recording is performed on a phase-change medium such as a phase-change optical disc medium, an effective spot diameter 'w' on the medium surface can be expressed by $$w = k \cdot \lambda / NA,$$

where '$\lambda$' represents the optical pickup LD wavelength, and 'NA' represents the optical pickup Numerical Aperture.

Figure 1:
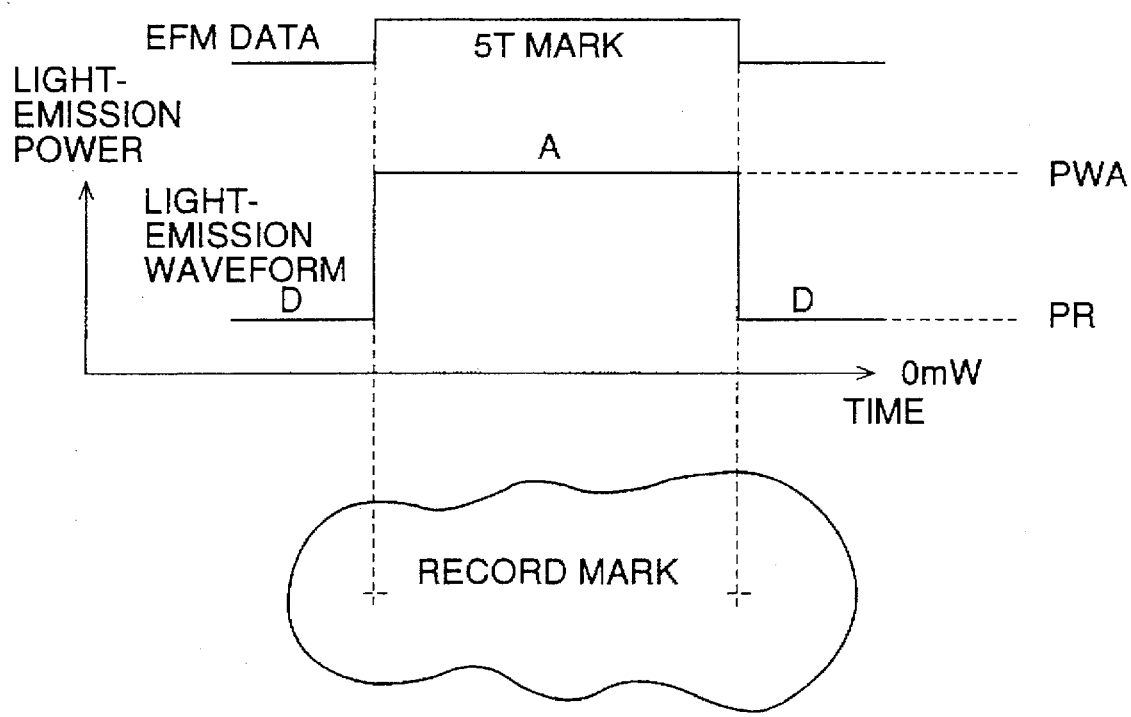
FIG. 1 shows an operation timing chart illustrating operation timing of an information recording system in the related art when forming a record mark.

In the ninth embodiment, using given channel clock pulses having the clock period T, PWM recording is performed using a plurality of record marks and spaces between adjacent marks, the marks having mark lengths, each length being from between the shortest mark length xT and the longest mark length yT, where $y \geq x$ and x and y represent natural numbers. In this condition, where 'ML' represents an optimum shortest mark length for the shortest mark xT, in a case where the effective LD spot diameter w<ML, when recording a yT-length record mark, generation of the rear cooling pulse C and generation of the rear heating pulse B is alternately repeated 'n' times between the head heating pulse A and the tail cooling pulse Cr, where n=y−x+1, as shown in FIG. 20. In the example of FIG. 1, when the 5T record mark is formed where the shortest mark length is 3T, x=3, y=5. Therefore, n=3. Thus, the number of repetitions of the alternate generation of the rear cooling pulse C and rear heating pulse B between the head heating pulse A and the tail cooling pulse Cr is three. In this operation, the power level values of the heating pulses, cooling pulses and erasing pulses should be set so that overwriting performance of phase-change media and jitter characteristics of reproduced signals are satisfactory. Further, the tail cooling pulse Cr span should be set so that undesired rear mark edge shifts are minimized.

However, when the effective LD spot diameter w>ML, when recording a yT-length record mark, the number of repetitions of the alternate generation of the rear cooling pulse C and rear heating pulse B between the head heating pulse A and the tail cooling pulse Cr is 'n' where n=y−x, as shown in FIG. 21. In the example of FIG. 1, when a 5T record mark is formed where the shortest mark length is 3T, x=3, y=5. Therefore, n=2. Thus, the number of repetitions of the alternate generation of the rear cooling pulse C and rear heating pulse B between the head heating pulse A and the tail cooling pulse Cr is two. In this operation, the power level values of the heating pulses, cooling pulses and erasing pulses are set approximately equal to those in the case of the effective LD spot diameter w<ML, respectively, so that overwriting performance of phase-change media and jitter characteristics of reproduced signals are satisfactory. However, if multi-pulse light-emission were performed where n=x−y+1 when the effective LD spot diameter w>ML, the resulting record mark length would be longer than the optimum length. In order to shorten the record mark so as to be equal to the optimum length, it would be necessary to use an erasing power having a level higher than the normal level by an amount of 1 to 2 mW. Thereby, the overwriting performance of the phase-change media might be remarkably degraded. Consequently, the number of repetitions of the alternate generation of the cooling pulse C and heating pulse B between the head heating pulse A and tail cooling pulse Cr is set depending on a size relationship between the effective LD spot diameter w and the optimum shortest mark length ML of the shortest mark xT. Specifically, when the effective LD spot diameter w<ML, multi-pulse light-emission in which n=y−x+1 such as that shown in FIG. 20 is performed. When the effective LD spot diameter w>ML, multi-pulse light-emission in which n=y−x such as that shown in FIG. 21 is performed.

It is assumed that recording is performed where an optical pickup having characteristics of λ=680 nm and k≈0.45 and, one of an objective lens having a NA=0.4 and another objective having a NA=0.6 is selectively used, depending on a recording line density. In this case, when recording is performed where the optical pickup uses the objective lens of NA=0.4 and, the CD density corresponds to ML=0.9 µm, the effective LD spot diameter w≈0.765 µm, and w<ML. Therefore, the recording is performed in the condition where multi-pulse light-emission is such that n=y−x+1, as shown in FIG. 20. In this case, the erasing power level is 6 mW so that the overwriting performance of the phase-change media is satisfactory, and the tail cooling pulse span is 0.5T.

Another example will now be described. In the above-mentioned optical pickup, an objective lens of NA=0.6 is used and high-density recording (corresponding to ML=0.43 µm) is performed. In this case, the effective LD spot diameter w≈0.510 µm, and, thus, w>ML. Therefore, the recording is performed where the multi-pulse light-emission is such that n=y−x, as shown in FIG. 21. In this case, the erasing power level is 5 mW so that the overwriting performance of the phase-change media is satisfactory, and the tail cooling pulse span is 0.5T.

By changing the total length (total span) of a light-emission waveform or changing the total number of repetitions of alternate cooling and heating, recording in a different recording density can be performed without needing an increase of heating power and/or erasing power. Accordingly, degradation of the recording layer (film) can be prevented. As a result, degradation of the overwriting performance of phase-change media can be prevented. A medium heating temperature depends on an effective spot diameter. Therefore, an optimum erasing power cannot be determined as being one fixed value. Further, above-mentioned values of 'k', 'λ', 'NA' and 'ML' are merely typical values. Actually, the values of 'w' and 'ML' should be applied, which have been optimized according to design values of an optical pickup, modulation method, and a shortest length according to a recording line density.

In the ninth embodiment, the number of repetitions of generation of the rear cooling pulse and rear heating pulse is adjusted appropriately for a different effective LD spot diameter w. However, it is also possible that the number of repetitions of generation of the rear cooling pulse and rear heating pulse is adjusted appropriately for a different shortest mark length ML. It is also possible that the number of repetitions of generation of the rear cooling pulse and rear heating pulse is adjusted appropriately for combinations of a different effective LD spot diameters w and different shortest mark lengths ML.

The above-mentioned information recording system can be practiced by using a special-purpose electronic circuit. Further, instead, it is also possible to practice the information recording system using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

With reference to FIGS. 22, 23, 24 and 25, an information recording system of a tenth embodiment, a first variant embodiment thereof, a second variant embodiment thereof and a third variant embodiment thereof of the present invention, respectively, will now be described. FIGS. 22, 23, 24 and 25 illustrate operation timings when record marks are recorded.

A basic recording method such as code data, data modulation method and so forth of this information recording system in the tenth embodiment is the same as that of the above-described ninth embodiment.

In the above-described ninth embodiment, the total recording waveform length (span) is changed by 1T between the case where the effective LD spot diameter w<ML and the case where w>ML. However, in a case where a difference between w and ML is very small or very large, an actual record mark length may deviate from an optimum length.

In the tenth embodiment, such a deviation is eliminated so that an optimum record mark length may be obtained.

Figure 22:
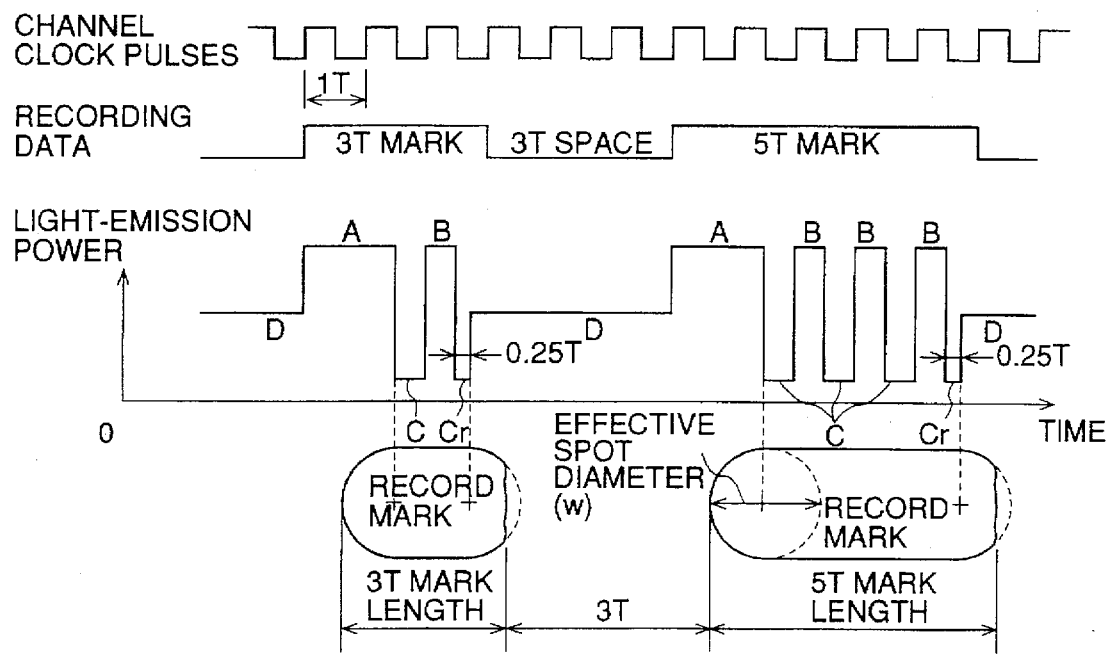
FIG. 22 shows an operation timing of a tenth embodiment of the present invention when a record mark is formed.
Figure 23:
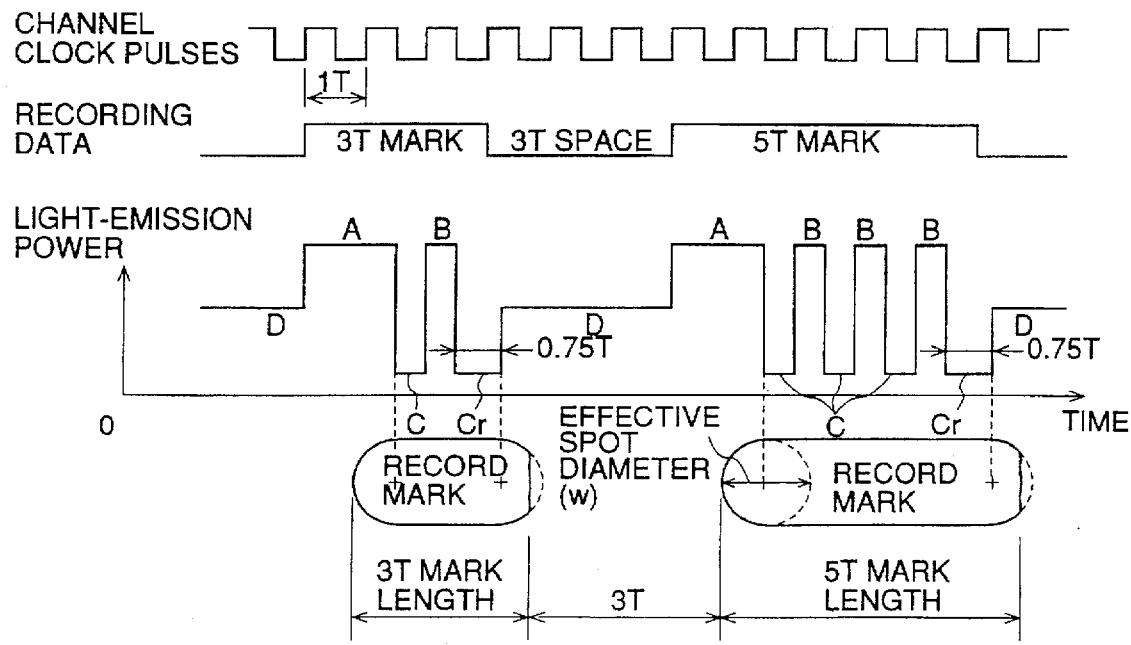
FIG. 23 shows an operation timing of a first variant embodiment of the tenth embodiment of the present invention when a record mark is formed.

In the tenth embodiment, recording is performed where an optical pickup similar to that of the ninth embodiment is used and the NA=0.4. When the effective LD spot diameter w<ML and a record mark of a yT mark length is formed, alternate generation of rear cooling pulses C and rear heating pulses B is repeated 'n' times (where n=y−x+1) between the head heating pulse A and tail cooling pulse Cr in the multi-pulse light-emission waveform. In a case where a difference between w and ML is small as shown in FIG. 22, for example, when the recording density is that of a CD of 74 minutes (corresponding to ML=0.83 μm), the tail cooling pulse span is set to be 0.25T. When a difference between w and ML is large as shown in FIG. 23, for example, when the recording density is that of a CD of 63 minutes (corresponding to ML=0.97 μm), the tail cooling pulse span is set to be 0.75T. The difference in the tail cooling pulse spans between the cases of FIGS. 22 and 23 is 0.5T which is approximately equal to the difference in the shortest mark lengths ML between the two cases. By using such multi-pulse light-emission waveforms, the heating power and cooling power are the same between the two cases for the different recording densities. Therefore, the overwriting performance of the phase-change media is the same between the two cases, and the jitter characteristics of reproduces signals are satisfactory.

Figure 24:
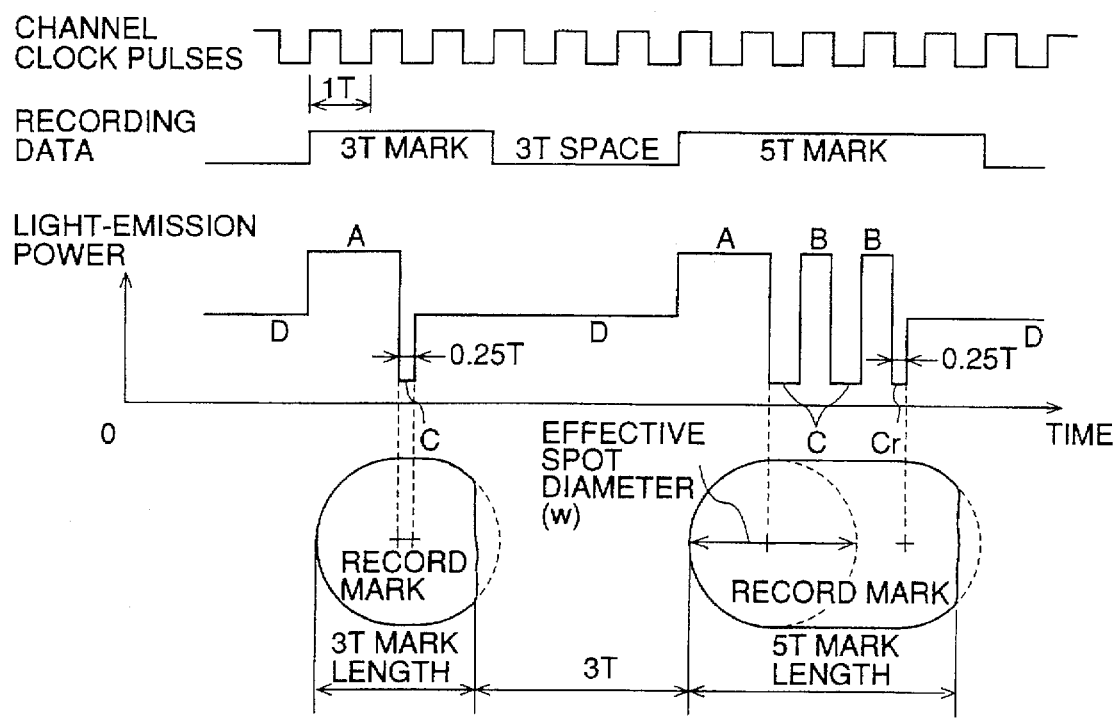
FIG. 24 shows an operation timing of a second variant embodiment of the tenth embodiment of the present invention when a record mark is formed.
Figure 25:
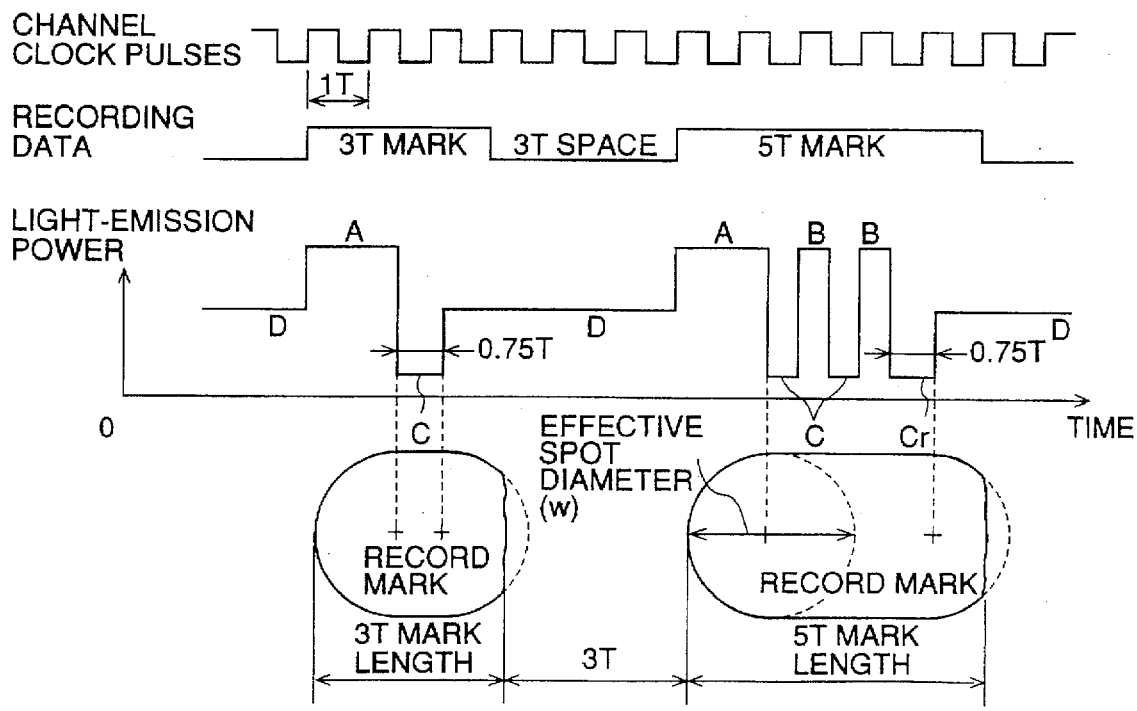
FIG. 25 shows an operation timing of a third variant embodiment of the tenth embodiment of the present invention when a record mark is formed.

In the tenth embodiment, recording is performed where an optical pickup of NA=0.6 is used. In a case where the effective LD spot diameter w>ML and a record mark of a yT mark length is formed, alternate generation of rear cooling pulses C and rear heating pulses B is repeated 'n' times (where n=y−x) between the head heating pulse A and tail cooling pulse Cr in the multi-pulse light-emission waveform. When a difference between w and ML is small, as shown in FIG. 24, for example, in the case where the recording density corresponds to ML=0.4 μm, the tail cooling pulse span is set to be 0.25T. When a difference between w and ML is large, as shown in FIG. 25, for example, in the case where the recording density corresponds to ML=0.47 μm, the tail cooling pulse span is set to be 0.75T. The difference in the tail cooling pulse spans between the cases of FIGS. 24 and 25 is 0.5T which is approximately equal to the difference in the shortest mark lengths ML between those two cases. In these cases, it is possible to set the total recording waveform length (span) to be shorter. Accordingly, the cases are advantageous for high-density recording. It is possible to set the total recording waveform length (span) more finely, than in the above-described case of the ninth embodiment, as a result of adjusting the tail cooling pulse Cr span in the tenth embodiment. By using such multi-pulse light-emission waveforms, the heating power and cooling power are the same between those two cases of FIGS. 24 and 25 for the different recording densities. Therefore, the overwriting performance of the phase-change media is the same between the two cases, and the jitter characteristics of reproduces signals are satisfactory. In the tenth embodiment, the tail cooling pulse Cr span is adjusted. However, it is also possible that the head cooling pulse A span is adjusted, and a similar effect can be obtained.

In the tenth embodiment, it is possible that the number of repetitions of generation of the rear cooling pulse and rear heating pulse and further the tail cooling pulse span are adjusted appropriately for a different effective LD spot diameter w. It is also possible that the number of repetitions of generation of the rear cooling pulse and rear heating pulse and further the tail cooling pulse span are adjusted appropriately for a different shortest mark length ML. It is also possible that the number of repetitions of generation of the rear cooling pulse and rear heating pulse and further the tail cooling pulse span are adjusted appropriately for a combination of a different effective LD spot diameter w and a different shortest-length mark length ML.

In the tenth embodiment of the present invention, the head heating pulse A span and/or the tail cooling pulse Cr span are adjusted so that it is possible to use an optical pickup having a different effective LD spot diameter w and to adequately perform recording in a different recording density, without needing alternation of the heating power and cooling power. It is possible to prevent degradation of the overwriting performance of the phase-change media and jitter characteristics of reproduced signals.

The values of 'w' and 'ML' should be applied, which have been optimized according to design values 'k', 'λ', 'NA' of an optical pickup, a modulation method, and a shortest length calculated according to recording line density.

The above-mentioned information recording system can be practiced by using a special-purpose electronic circuit. It is also possible to practice the information recording system using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 26:
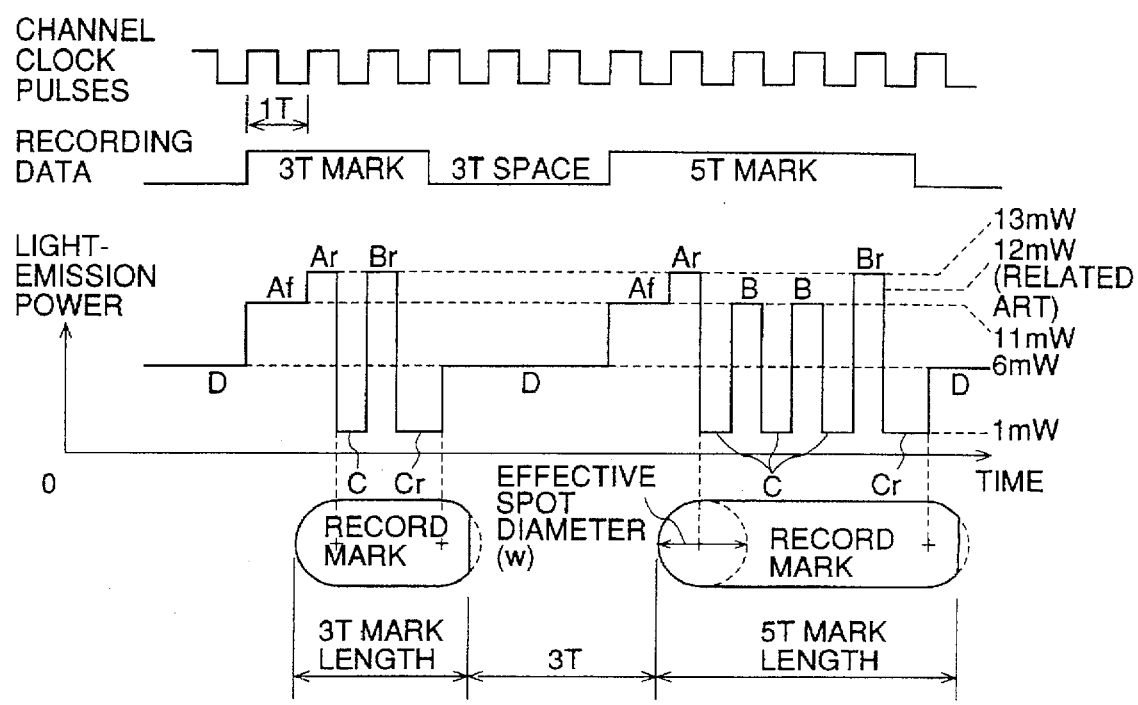
FIG. 26 shows an operation timing of an eleven embodiment of the present invention when a record mark is formed.

FIG. 26 illustrates operation timing when a record mark is recorded in an information recording system of an eleventh embodiment of the present invention.

In the eleventh embodiment, code data and a basic recording system such as a modulation system are the same as those of the above-described ninth and tenth embodiments.

Generally speaking, in a case where PWM recording is performed in a phase-change medium, in order to obtain satisfactory jitter characteristics of a reproduced signal, light-emission power of heating pulses may be set to a high value. However, it is necessary to use a low value of light-emission power in order to improve the overwriting performance of a phase-change medium. Therefore, it is necessary to balancing these two different factors. As a result, in the related art, it is difficult for performing information recording where light-emission power values are optimum concerning these two different factors. The eleventh embodiment is advantageous for improving the overwriting performance of a phase-change media. The information recording system in the eleventh embodiment, which is advantageous especially when a laser light-source recording spot diameter w is smaller than a shortest mark length xT (ML), will now be described.

A multi-pulse light-emission waveform in the eleventh embodiment includes, as shown in FIG. 26, the head-heating pulse which includes a front division Af and a rear division Ar, wherein the light-emission power of the rear division Ar is set higher than that in the related art, and the light-emission power of the front division Af is set lower than that in the related art. Further, the light-emission power of the tail heating pulse Br is set high similar to that of the rear division Ar of the head heating pulse.

Recording is performed using an optical pickup similar to that of the ninth embodiment and a NA=0.4. When the effective LD diameter w<ML and a record mark of a yT mark length is formed, alternate generation of rear cooling pulses C and rear heating pulses B is repeated 'n' times (where n=y−x+1) between the head heating pulses Af, Ar and tail cooling pulse Cr in the multi-pulse light-emission waveform. When a difference between w and ML is large, for example, when the recording density is that of a 63 minute CD (corresponding to ML=0.97 μm), the tail cooling pulse Cr span is set to be 0.75T.

The above-described light-emission power set values are as follows:

the light-emission power of the front division Af of the head heating pulse: 11 mW;

the light-emission power of the rear division Ar of the head heating pulse: 13 mW;

the light-emission power of each of the rear heating pulses B: 11 mW;

the light-emission power of the tail heating pulse Br: 13 mW;

the light-emission power of each of the cooling pulses C, Cr: 1 mW (which is approximately equal to a reading power such as that described above); and the light-emission power of the erasing pulse D (erasing power): 6 mW.

In this information recording system in the eleventh embodiment, by using a recording waveform such as that shown in FIG. 26, the difference in light-emission power from the heating pulse Ar to the following cooling pulse C in the multiple pulses for forming the front edge of a record mark in a phase-change medium is 12 mW. Similarly, the difference in light-emission power from the heating pulse Br to the following cooling pulse Cr in the multiple pulses for forming the rear edge of a record mark in a phase-change medium is 12 mW. As a result, each of the differences in light-emission power from the heating pulses Ar and Br to the following cooling pulses C, Cr, respectively, is larger than that in the related art. For forming the front and rear edges of a record mark in a phase-change medium, a satisfactory sharp cooling condition is obtained in the information recording system in the eleventh embodiment of the present invention. As a result, sharper mark edges are obtained. Assuming that each of the differences in light-emission power from the heating pulses to the following cooling pulses for forming the front and rear edges of a record mark, respectively, in the related art is 11 mW, it is possible to reduce a jitter characteristic σ/Tw (where 'Tw' represent a window span) allowance by approximately 2% in this embodiment in comparison to the related art. Further, the maximum times of overwriting where the jitter characteristic σ/Tw can be satisfied can be approximately 1.5 times greater in comparison to the related art because the average or overall light-emission power in the eleventh embodiment is lower than that in the related art. If the eleven embodiment is applied to a case where the effective LD spot diameter w<ML and a difference between w and ML is small, for example, when the recording density is that of a 74 minute CD (corresponding to ML=0.83 μm), although the jitter reduction effect is reduced as the recording line density increases, the overwriting performance of the phase-change media is improved similar to the case where the difference between w and ML is large.

In the eleventh embodiment, the light-emission power of the two pulses Ar and Br which correspond to front and rear mark edges, respectively, are altered. However, it is also possible to alter the light-emission power of one of the two pulses Ar and Br. By appropriately adjusting the light-emission power of the pulse Ar and/or the pulse Br, the multi-pulse light-emission waveform can be adjusted to the recording characteristics of a particular phase-change medium. The above-mentioned set values of the respective light-emission power are merely typical values. In practice, the values are optimized depending on recording materials, medium layer configurations/arrangements and so forth.

The above-mentioned information recording system can be practiced by using a special-purpose electronic circuit. It is also possible to practice the information recording system using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 27:
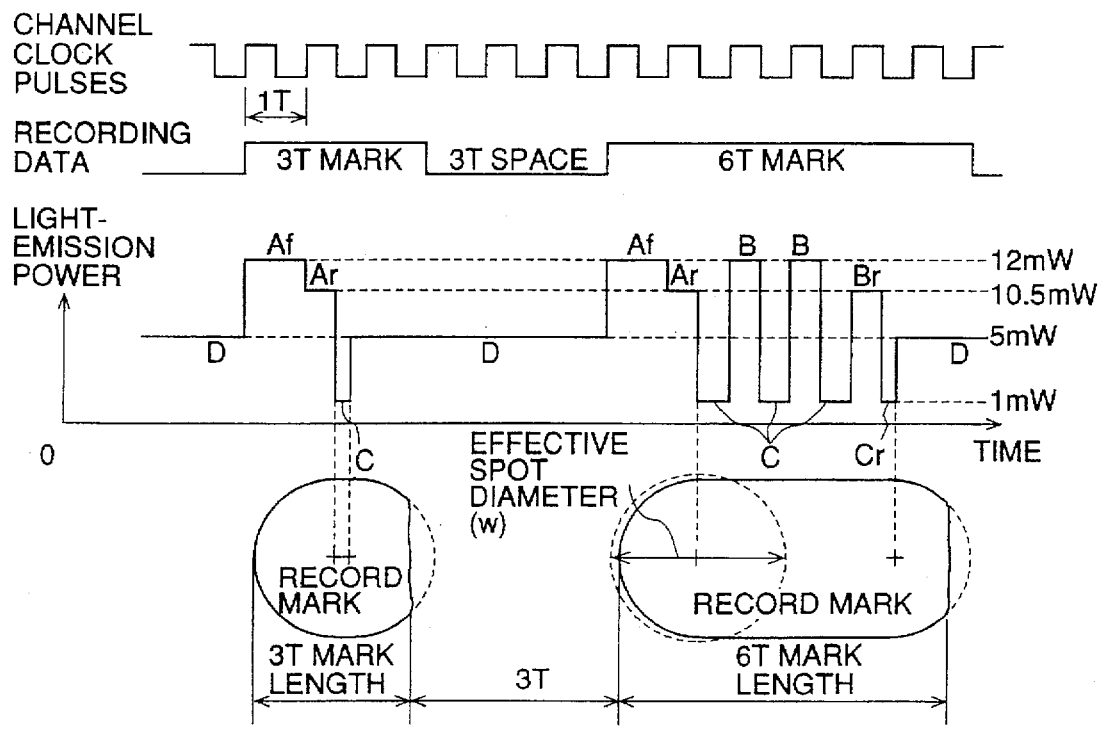
FIG. 27 shows an operation timing of a twelfth embodiment of the present invention when a record mark is formed.

FIG. 27 illustrates operation timing when record mark is recorded in an information recording system a twelfth embodiment of the present invention.

In the twelfth embodiment, code data and a basic recording system such as a modulation system are the same as those of the above-described ninth and tenth embodiments.

In a case where PWM recording is performed in a phase-change medium, as a shortest mark length is smaller with respect to an effective LD spot diameter, it is likely that a resulting mark length is larger than an optimum mark length. In order to eliminate such a problem, erasing power is set higher and the rear edge of a mark is shortened so that the optimum length of the mark is obtained. However, by using high light-emission power as the erasing power, substantial deterioration of a recording layer (film) of a phase-change medium occurs. Thus, the overwriting performance of the phase-change medium is degraded. One way to solve such a problem is to appropriately alter a total recording light-emission waveform length (span) without having a higher erasing power, as in the above-described ninth and tenth embodiments. However, if the head cooling pulse span and/or the tail cooling pulse span is set shorter than 0.25T, it is not possible to provide a sufficient cooling time. As a result, mark edges cannot be sharply formed, and jitter characteristics of a reproduced signal are degraded. The twelfth embodiment is advantageous for preventing jitter characteristics degradation. The information recording system in the twelfth embodiment which is especially advantageous when a laser light-source recording spot diameter is larger than a shortest mark length xT (ML) will now be described.

A multi-pulse light-emission waveform in the twelfth embodiment includes, as shown in FIG. 27, the head-heating pulse which includes a front division Af and a rear division Ar, wherein the light-emission power of the rear division Ar is set lower than that in the related art. Further, the light-emission power of each of the front division Af and the other heating pulses B except the tail heating pulse Br is the same as that in the related art as shown in FIG. 27. Further, the light-emission power of the tail heating pulse Br is set lower similar to the rear division Ar of the head heating pulse.

Recording is performed where an optical pickup similar to that of the ninth embodiment is used and the NA=0.6. When the effective LD spot diameter W>ML and a record mark of a yT mark length is formed, alternate generation of rear cooling pulses C and rear heating pulses B is repeated 'n' times (where n=y−x) between the head heating pulse Af, Ar and tail cooling pulse Cr in the multi-pulse light-emission waveform. When a difference between w and ML is large, for example, in the case of a high density recording (corresponding to ML=0.4 μm), the tail cooling pulse Cr span is set to be 0.25T.

The above-described light-emission power set values are as follows:

the light-emission power of the front division Af of the head heating pulse: 12 mW;

the light-emission power of the rear division Ar of the head heating pulse: 10.5 mW;

the light-emission power of each of the rear heating pulses B: 12 mW;

the light-emission power of the tail heating pulse Br: 10.5 mW;

the light-emission power of each of the cooling pulses C, Cr: 1 mW (which is approximately equal to a reading power such as that described above); and the light-emission power of the erasing pulse D (erasing power): 6 mW.

In this information recording system in the eleventh embodiment, by using a recording waveform such as that shown in FIG. 26, the difference in light-emission power from the heating pulse Ar to the following cooling pulse C in the multiple pulses for forming the front edge of a record mark in a phase-change medium is 9.5 mW. Similarly, the difference in light-emission power from the heating pulse Br to the following cooling pulse C in the multiple pulses for forming the rear edge of a record mark in a phase-change medium is 9.5 mW. As a result, each of the differences in light-emission power from the heating pulses Ar and Br to the following cooling pulses C, Cr, respectively, is smaller than that in the related art. The front and rear edges of a resulting record mark are short, and it is considered that those edges are not sharply formed. However, because a predetermined cooling time can be provided, the overall jitter characteristics of a reproduced signal can be reduced in comparison to the related art. Assuming that each of the differences in light-emission power from the heating pulses to the following cooling pulses for forming the front and rear edges of a record mark, respectively, in the related art is 11 mW, it is possible to reduce the allowable jitter σ/Tw (where 'Tw' represent a window span) by approximately 1.5% in this embodiment in comparison to the related art. Further, the maximum times of overwriting where the jitter σ/Tw is satisfied can be approximately 1.1 times in comparison to the related art. If the eleventh embodiment is applied where w>ML and a difference between w and ML is small, although the jitter reduction effect is reduced as the recording line density decreases, the jitter reduction effect of a reproduced signal as well as the overwriting performance of the phase-change media is improved in comparison to the related art. It is noted that the above-mentioned set values of the respective light-emission power are merely typical values. In practice, those values are optimized depending on recording materials, medium layer configurations/arrangements and so forth.

The above-mentioned information recording system can be practiced by using a special-purpose electronic circuit. It is also possible to practice the information recording system using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Information recording systems in thirteenth, fourteenth, fifteenth and sixteenth embodiments of the present invention will now be described.

As representative examples of a material for a recording layer of a phase-change recording medium, materials such as Ge—Sb—Te, Ge—Te—Sb—S, Te—Ge—Sn—Au, Ge—Te—Sn, Sb—Se, Sb—Se—Te, Sn—Se—Te, Ga—Se—Te, Ga—Se—Te—Ge, In—Se, In—Se—Te, Ag—In—Sb—Te, and the like are used in the related art.

The above-mentioned information recording systems in the thirteenth, fourteenth, fifteenth and sixteenth embodiments are obtained from the above-described information recording systems in the ninth, tenth, eleventh and twelfth embodiments of the present invention, respectively, by applying the recording layer of a phase-change medium which uses compositions of Ag—In—Sb—Te as the recording material.

Figure 28:
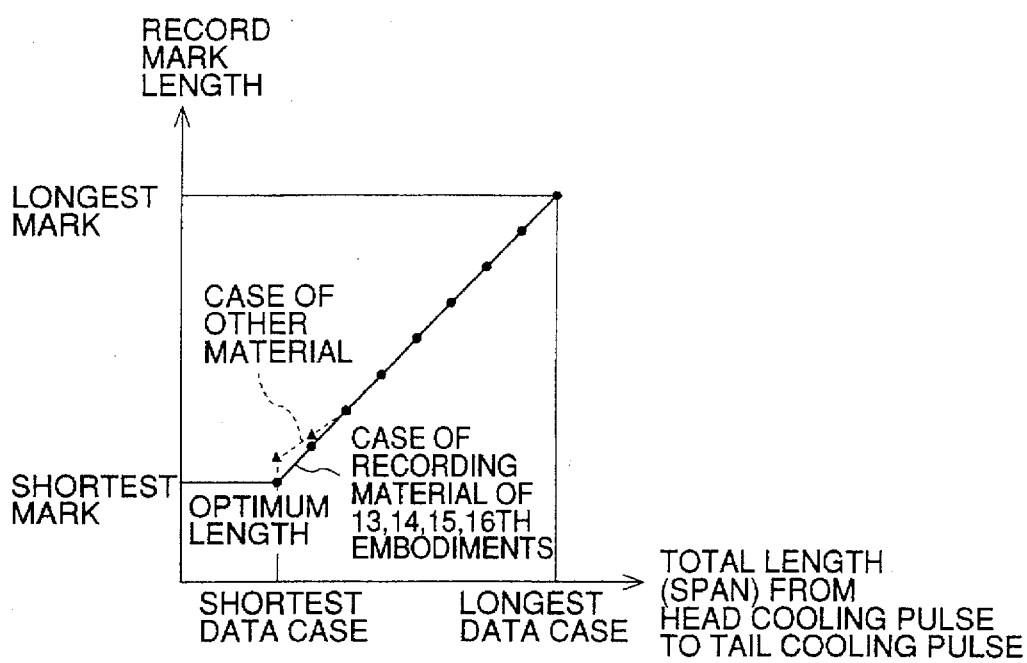
FIG. 28 shows characteristics illustrating a relationship between the total length (span) from the head cooling pulse to the tail cooling pulse and the length of a resulting record mark (comparison between case of using recording material according to thirteenth, fourteenth, fifteenth and sixteenth embodiments of the present invention and cases of using recording material in the related art)
Figure 29:
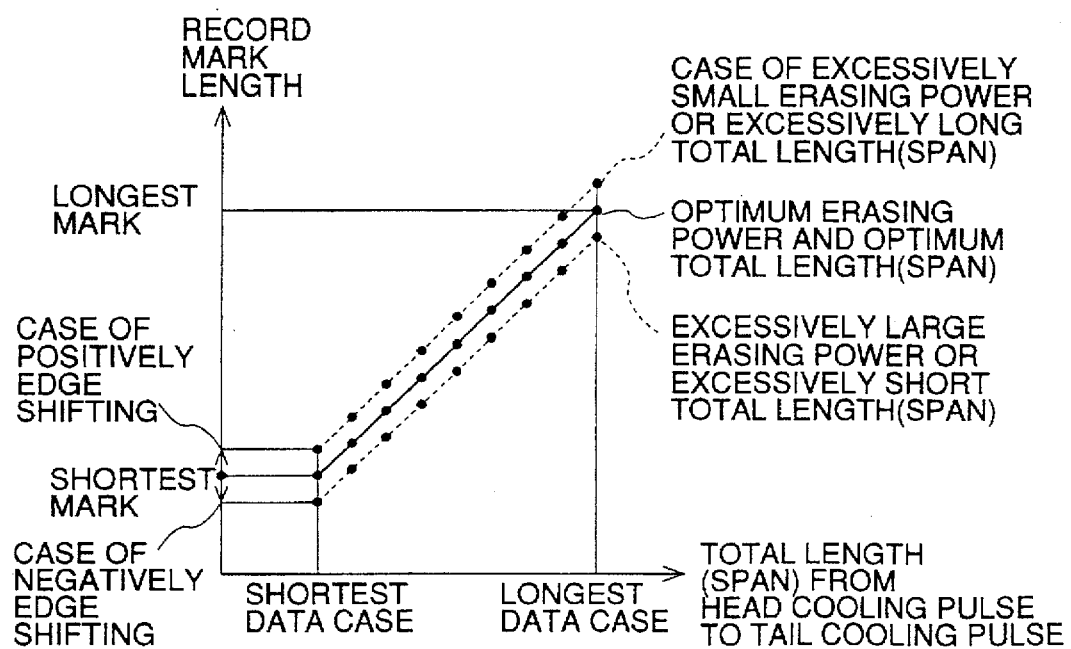
FIG. 29 illustrates advantages of the thirteenth, fourteenth, fifteenth and sixteenth embodiments of the present invention, illustrating a relationship between the total length (span) from the head cooling pulse to the tail cooling pulse and the length of a resulting record mark for cases of different erasing powers and total lengths (spans)

In each of the information recording systems, the thirteenth, fourteenth, fifteenth and sixteenth embodiments, by applying the recording layer of a phase-change medium which uses compositions of Ag—In—Sb—Te as the recording material, when data is recorded in a phase-change media of the recording material, amorphous phase formation strongly depends on a sharp cooling condition from heating→cooling. Therefore, the jitter characteristics depend on a difference in light-emission power levels between a heating pulse and an immediately following cooling pulse for each of the front and rear edges of a record mark. It is easy to control the shapes and sizes of the front and rear edges of a record mark in a phase-change medium in the information recording systems in each of the thirteenth, fourteenth, fifteenth and sixteenth embodiments. FIG. 28 shows a relationship between the total length (span) from a head cooling pulse C to a tail cooling pulse Cr in a multiple light-emission power waveform and the actual length (in the recording line direction) of a resulting record mark in each of the thirteenth, fourteenth, fifteenth and sixteenth embodiments and when using other recording material. As shown in the figure, by applying the recording layer of a phase-change medium which uses compositions of Ag—In—Sb—Te as the recording material, the actual length of the resulting record mark tends to be in proportion to the total length (span), and the relationship tends to appear to be approximately a straight line in the figure. The application of the recording layer of a phase-change medium which uses compositions of Ag—In—Sb—Te as the recording material enables easy control of actual mark lengths by appropriately adjusting the total length (span) of the multi-pulse waveform for a different laser-light effective LD spot diameter w and the shortest-length mark length ML. As shown in FIG. 29, it is possible that, by altering the erasing power and/or total length (span), resulting actual mark lengths are caused to shift (edge shift) evenly over a range of the total lengths (spans). Thus, precise edge shift control can be performed. Even if another recording material is used as a recording layer of phase-change medium, the relationships between semiconductor laser LD light-emission power, jitter characteristics and overwriting performance and the relationships between recording pulse spans and mark lengths are basically the same. Thereby, the advantages of the present invention are still maintained.

An information recording and reproducing apparatus in seventeenth, eighteenth, nineteenth, twentieth, twenty-first, twenty-second, twenty-third and twenty-fourth embodiments will now be described. These six embodiments use information recording systems in the ninth, tenth, eleventh, twelfth, thirteenth, fourteenth, fifteenth and sixteenth embodiments, respectively. FIG. 30A shows, for example, an optical pickup in each of the information recording and reproducing apparatus in the seventeenth to twenty-fourth embodiments. The optical pickup includes a light source 101 of a semiconductor laser (LD), a collimator lens 102, a polarization beam splitter (PBS) 103, a λ/4 plate 104 and aperture 105, an objective lens 106, a phase-change optical disc of a phase-change medium 107, a recording layer 107a of the recording material of the thirteenth to sixteenth embodiment, a detection light-converging lens 108, a cylindrical lens 109 and a light-reception device 110.

In FIG. 30A, the semiconductor laser (LD) light source 101 emits short-wavelength laser light having a wavelength of λ=680 nm. The emitted laser light is used to produce parallel light through the collimator lens 102. The parallel light is reflected by the polarization beam splitter (PBS) 103 toward the phase-change optical disc 107. The reflected light passes through the λ/4 plate 104 and becomes circularly polarized light. The circularly polarized light passes through the aperture 105, is incident on the objective lens 106 and is converged onto the medium surface of the recording layer 107a of the optical disc 107 to form a spot thereon. The light is reflected by the medium surface, passes through the objective lens 106 so as to become parallel light. The parallel light passes through the λ/4 plate 104 and is transmitted by the polarization beam splitter (PBM) 103. The transmitted light is converged by the detection light-converging lens 108, passes through the cylindrical lens 109, and is incident on the light-reception device 110. The light-reception device 110 converts the received light into an electrical signal and a reproduced signal is obtained.

In each information recording and reproducing apparatus of the seventeenth to twenty-fourth embodiments, using the above-described optical pickup, recording in performing in various recording line densities, the aperture 105 is used to alter the diameter of laser light incident on the objective lens 106. When the objective lens has a NA=0.6 and high-density recording is performed, the aperture 105 is removed from the light path and no aperture is present. Thereby, the cross section of laser light is not controlled, and high-density recording is performed. When the same objective lens is used and the NA=0.4, the aperture 105 is inserted into the light path and thus a condition where the aperture 105 is present. Accordingly, the cross-section of laser light is controlled by the aperture 105 so that NA=0.4. The numeric aperture NA is controlled by whether or not the aperture 105 is inserted in the light path. Thereby, an effective LD spot diameter is formed on the medium surface of the phase-change optical disc 107. The LD light source of two different effective LD spot diameters can be provided. For example, in cases where NA=0.6, and recording in line densities ML=0.53 µm and ML=0.47 µM are performed, or cases where NA=0.4, and recording in line densities ML=0.97 µm or ML=0.83 µM are performed, by using the information recording system in any of the ninth to twelfth embodiments, without modification of heating power and/or erasing power, satisfactory jitter characteristics and overwriting performance can be obtained in recording all the various line densities.

In the seventeenth to twenty-fourth embodiments, the aperture 105 is used to switch the numeric aperture NA. As shown in a partial diagram of FIG. 30B, it is also possible to switch the numeric aperture NA by directly switching an actual-use objective lens between an objective lens 106a and an objective lens 106b having different numeric apertures NA, respectively. Furthermore, it is also possible, as shown in a partial diagram of FIG. 30C, two focus objective lens using the objective lens 106 and a hologram (or prism) 111 provides the same effect. It is also possible that the numeric aperture NA is not altered, but two semiconductor lasers having different wavelengths are selectively used. Thereby, a similar effect can be obtained.

It is noted that the shapes and sizes of the record marks and effective spot diameters shown in FIGS. 2, 17, 20 to 27 which illustrate operation timing of the recording systems do not necessarily represent actual shapes and sizes. Those shapes and sizes shown in the figures are used merely for comparison in lengths (spans) with the recording data (pulses).

Figure 31:
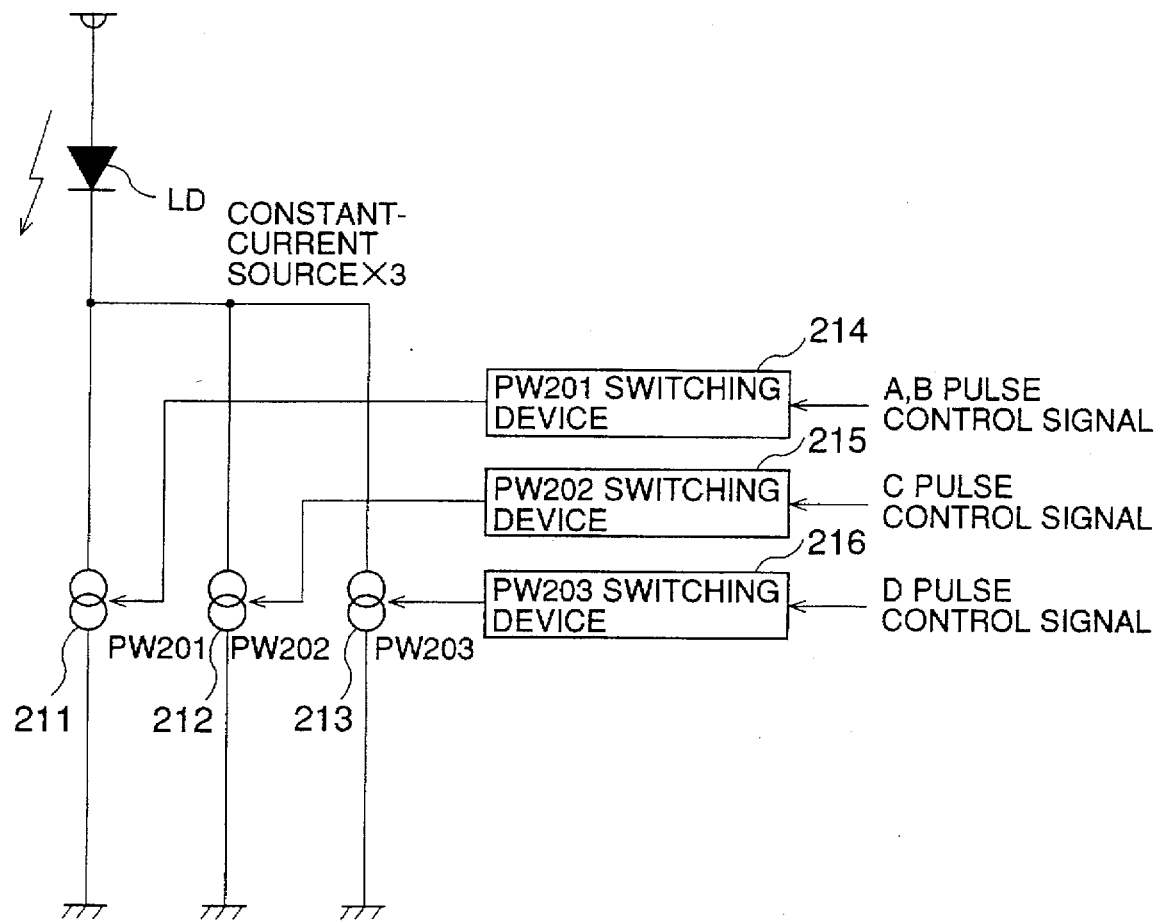
FIG. 31 shows a block diagram of part of an information recording and reproducing apparatus in a twenty-fifth embodiment of the present invention.
Figure 32:
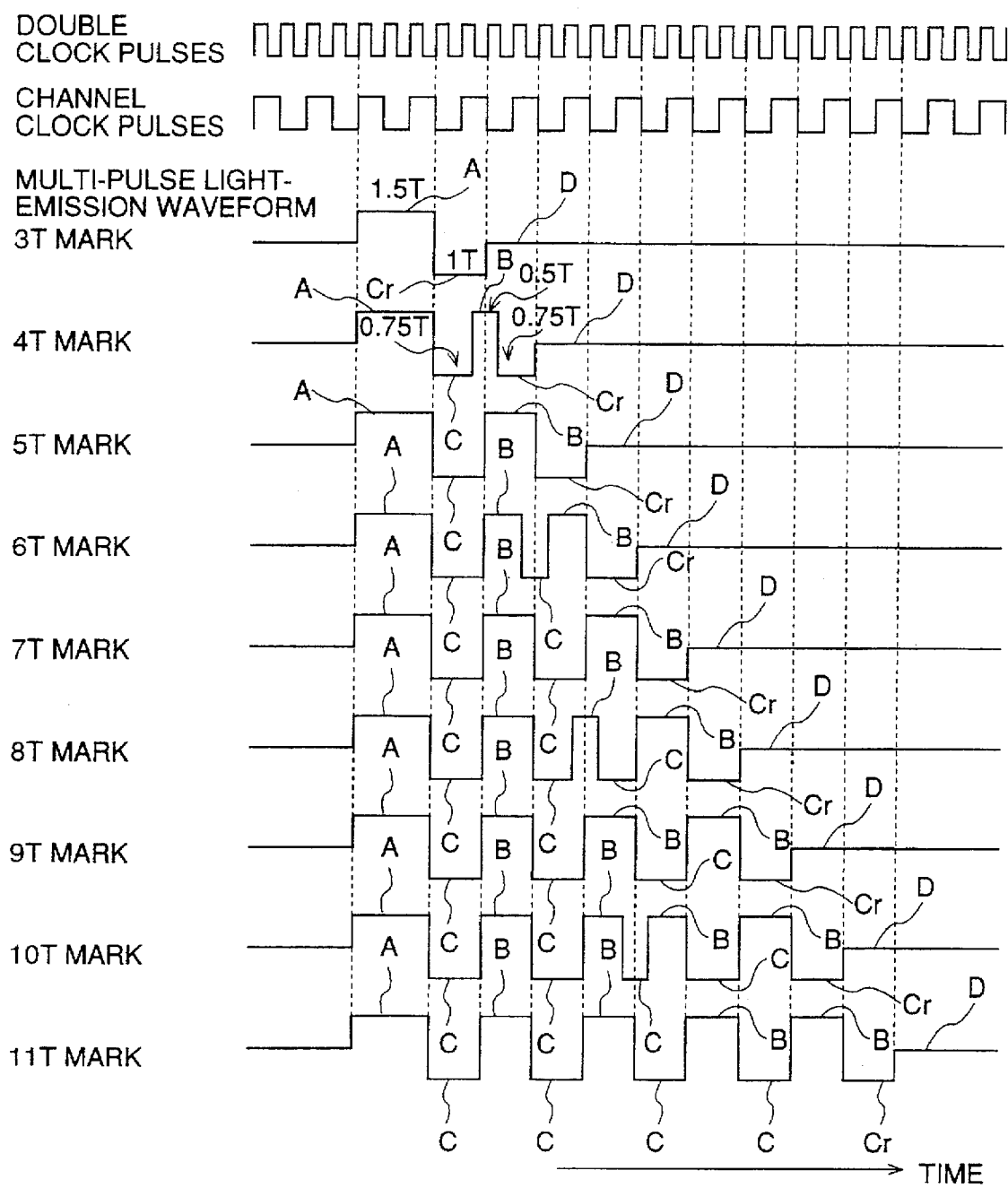
FIG. 32 shows an operating timing chart of the apparatus shown in FIG. 31.

FIG. 31 shows part of an information recording and reproducing apparatus in a twenty-fifth embodiment of the present invention, and FIG. 32 shows an operation timing chart of the information recording and reproducing apparatus.

This information recording and reproducing apparatus is an example of an information recording and reproducing apparatus in which code data in a CD-ROM format is recorded (overwritten) in the phase-change medium of a phase-change optical disc. In this apparatus, the code data of EFM code is recorded and the mark edge (PWM) recording is performed.

In this information recording and reproducing apparatus, when recording, light intensity control means (not shown in the figure) of a digital electronic circuit generates pulse control signals based on EFM data. According to the pulse control signals, a semiconductor laser drive circuit including the components 211, 212, 213, 214, 215 and 216 (shown in FIG. 31) causes a light source of a semiconductor laser LD in an optical head to emit multi-pulse light such as that shown in FIG. 32. A spindle motor rotates a phase-change optical disc and, in the optical head, the multi-pulse light emitted by the semiconductor laser LD irradiates the phase-change medium of the phase-change optical disc. Thus, record marks are formed in the phase-change medium, and information recording is performed.

When reproducing information recorded in a phase-change medium of a phase-change optical disc, the semiconductor laser drive circuit drives the semiconductor laser LD which emits light with reproduction power (reading power). In the optical head, the reproduction power light irradiates the phase-change medium. The light reflected by the phase-change medium is received by a light-reception means via the optical system, and the light-reception means converts the received light into an electric signal. Thus, a reproduced signal is obtained.

Multi-pulse light emitted from the semiconductor laser LD when recording information in a phase-change medium includes a head heating pulse A, and alternate repetitions of rear cooling pulses C and rear heating pulse B. In the twenty-fifth embodiment, the light-emission power of the head heating pulse A is equal to the light-emission power of each of the rear heating pulses B. FIG. 32 shows multi-pulse light-emission waveforms for various mark lengths, for example: 3T mark, 4T mark, 5T mark, 6T mark, 7T mark, 8T mark, 9T mark, 10T mark and 11T mark. Any of these various light-emission waveforms is generated by the semiconductor laser LD in the twenty-fifth embodiment.

As shown in FIG. 31, in the semiconductor laser drive circuit, a constant-current source 211 supplies a constant electric current for the light-emission power of the head heating pulse and each of the rear heating pulses B. Similarly, a constant-current source 212 supplies a constant electric current for the light-emission power of each of the rear cooling pulses C, and a constant-current source 213 supplies a constant electric current for the light-emission power of an erasing pulse D shown in FIG. 32.

The light intensity control means produces, based on EFM data, an A, B pulse control signal, a C pulse control signal, and a D pulse control signal. Switching devices 214, 215, 216, according the A, B pulse control signal, C pulse control signal and D pulse control signal, turn ON and turn OFF the constant-current sources 211, 212 and 213, respectively. Thus, the semiconductor laser LD emits light with the multi-pulse light-emission waveforms such as those shown in FIG. 32.

The information recording and reproducing apparatus in the twenty-fifth embodiment uses recording waveforms such as those shown in FIG. 32 for forming record marks in a phase-change medium. Even when channel clock pulses have a high frequency for high-speed recording, precise mark lengths can be obtained. As shown in FIG. 32, when forming the 3T mark (where 'T' represents each period of the channel clock pulses or recording channel clock pulses) which is the shortest-length mark in a phase-change medium, the pulse span of the head heating pulse A is 1.5T and the pulse span of the tail cooling pulse Cr is 1T. In this case, recording multiple pluses include only one heating pulse A and one cooling pulse Cr. When other odd-number T length (5T, 7T, 9T, 11T) marks are formed, predetermined number of alternate repetitions of a 1T pulse-span cooling pulse C and 1T pulse-span heating pulse B occurs between the 1.5T pulse-span head heating pulse A and 1T pulse-span tail cooling pulse Cr, as shown in FIG. 32. Thus, a total length (span) of each recording waveform can be expressed by n–0.5T where 'n' represents a respective mark length. For example, when a 7T mark is formed, n=7T. Then, the total length (span) of the recording waveform is 7T–0.5T=6.5T.

When the other even-number T (4T, 6T, 8T, 10T) length marks are formed, a rule different from the above described rule for the odd-number T length marks is applied for determining recording waveforms. However, as shown in FIG. 32, in each of the waveforms, the head heating pulse A has a pulse span of 1.5T. When a 4T mark and a 8T mark are formed, the pulse span of the center rear heating pulse B, which occurs at the center of the recording waveform, except for the head heating pulse B is 0.5T. In the example of a 4T mark, the rear heating pulse B is only one pulse and has a pulse span of 0.5T. In the example of an 8T mark, the second rear heating pulse B has a pulse span of 0.5T. The pulse span of each of the two adjacent-side cooling pulses C (and Cr in the case of a 4T mark) which occur immediately before and immediately after the occurrence of the center rear heating pulse B is 0.75T. The pulse span of the other remaining rear heating pulses B and rear cooling pulses C is 1T.

When a 6T mark and a 10T mark are formed, the pulse span of the center rear cooling pulse C which occurs at the center of the recording waveform, except that the head heating pulse B is 0.5T. In the example of a 6T mark, the second rear cooling pulse C is the center rear cooling pulse and has a pulse span of 0.5T. In the example of a 10T mark, the third rear cooling pulse C is the center rear cooling pulse and has a pulse span of 0.5T. The pulse span of each of the two adjacent-side heating pulses B which occur immediately before and immediately after the occurrence of the center rear cooling pulse C is 0.75T. The pulse span of the other remaining rear heating pulses B and rear cooling pulses C is 1T.

Figure 4:
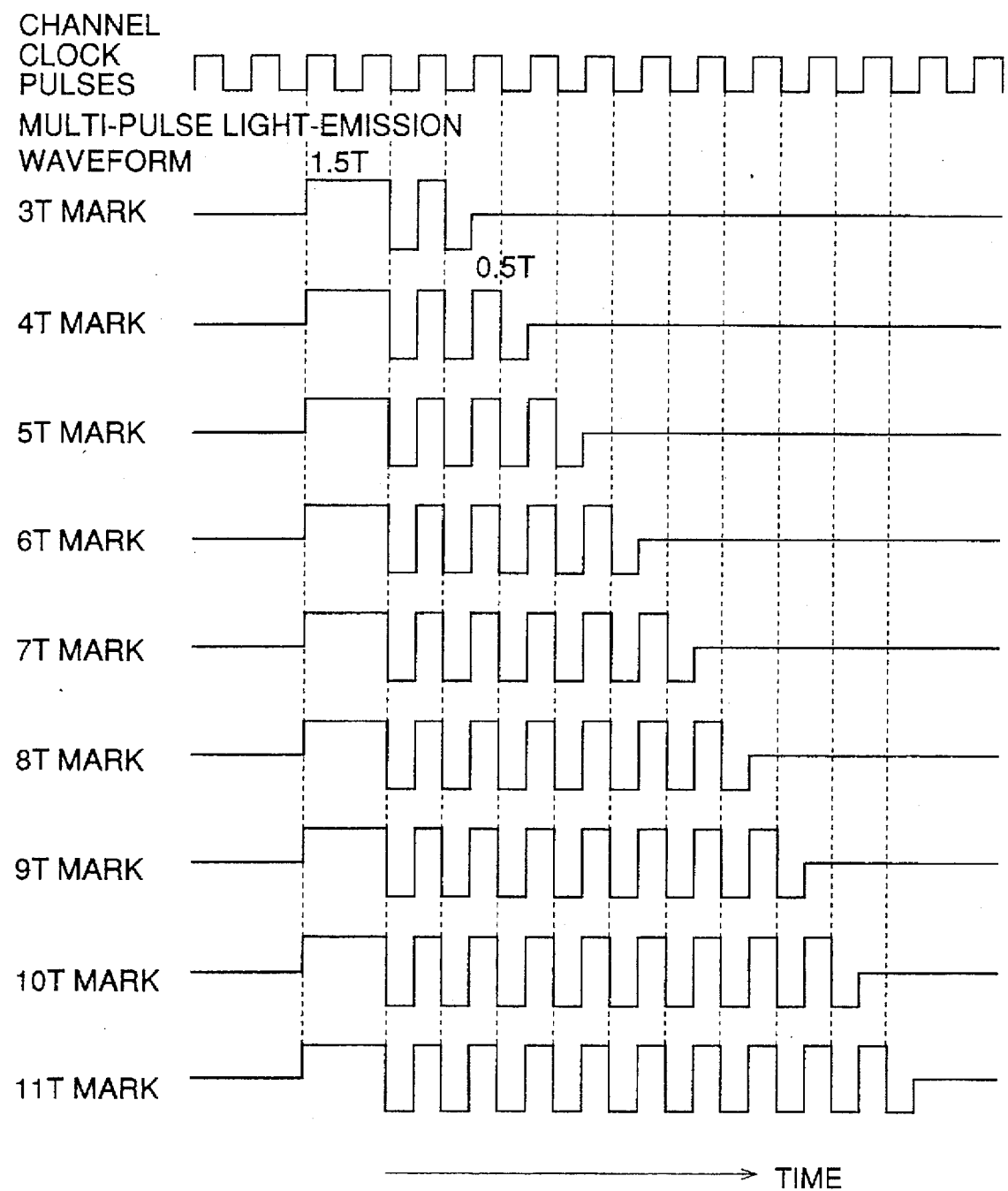
FIG. 4 shows recording waveforms for respective recording data in the related art.
Figure 5A:
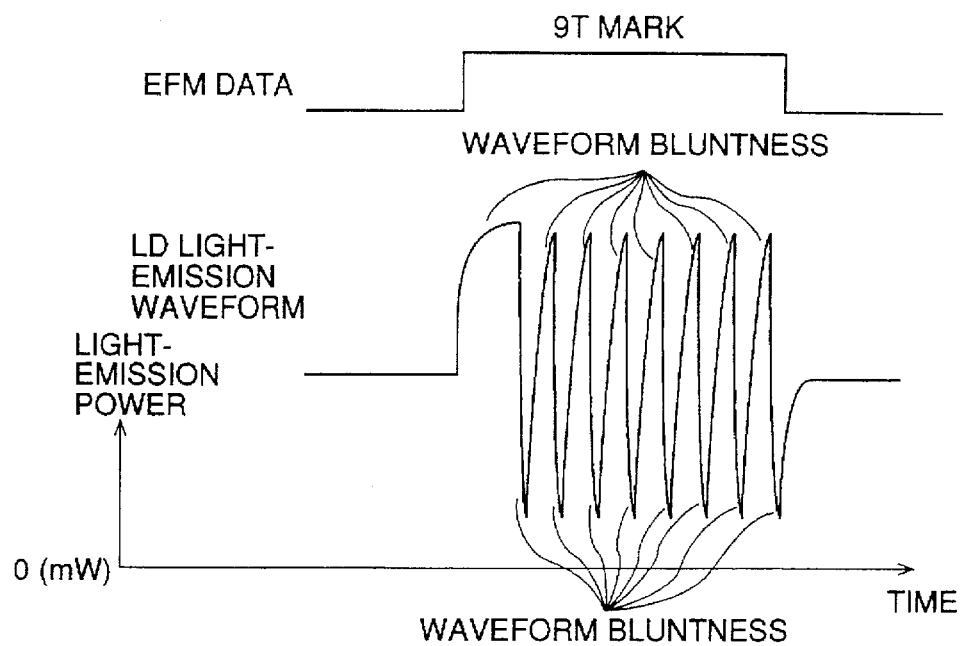
FIG. 5A illustrates a problematic waveform bluntness phenomenon in the related art.
Figure 33A:
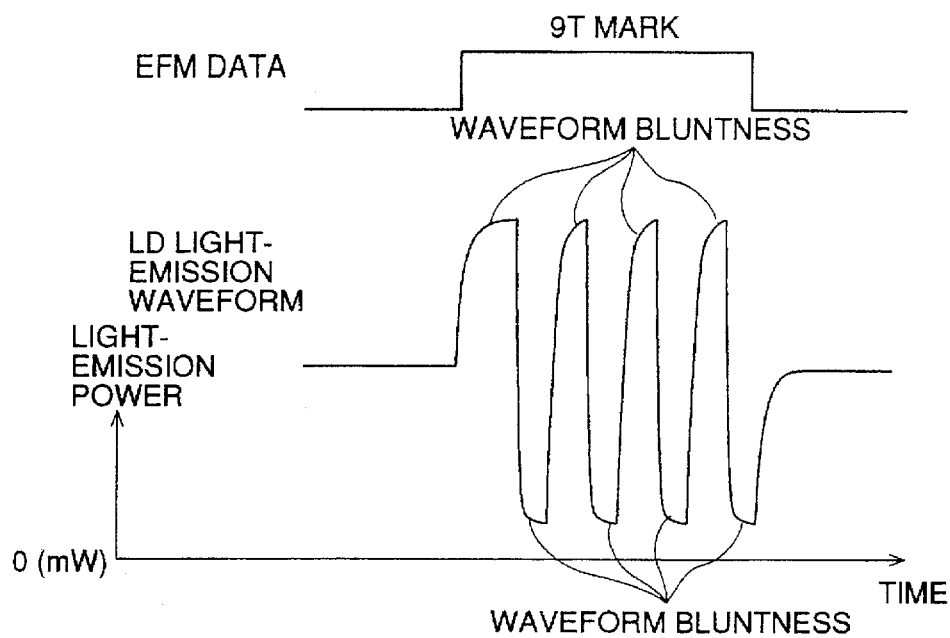
FIGS. 33A and 33B illustrate advantages of the apparatus shown in FIG. 31, (FIG. 33B showing eye pattern of an RF signal obtained from record marks and spaces formed in the apparatus shown in FIG. 31)

By using those recording waveforms, in comparison to the waveforms shown in FIG. 4, each of heating and cooling pulse spans is wider at least at the beginning and ending of each recording waveform (semiconductor laser LD light-emission waveform). It is possible that each of the heating and cooling pulses for forming front and rear edge of a record mark has a satisfactorily wide pulse span. As shown in FIG. 33A, although the waveform bluntness or pulse span narrowing problem, occurring due to a relationship between slower semiconductor laser LD waveform rising and decaying speeds and higher heating and cooling pulse frequencies, occurs in each of heating and cooling pulses, it is possible to provide satisfactory actual heating and cooling pulse spans, in the twenty-fifth embodiment of the present invention, as shown in FIG. 33A. In the related art, as shown in FIG. 5A, the above-mentioned waveform bluntness and pulse span narrowing problem may not provide satisfactory actual heating and cooling pulse spans. In the twenty-fifth embodiment, because satisfactory actual heating and cooling pulse spans are provided, satisfactory record marks can be obtained, and jitter in a reproduced signal can be reduced.

As shown in FIG. 32, each of the total lengths (spans) of the heating pulses and cooling pulses is commonly expressed by 'n–0.5T' whether a mark to be formed has an odd-number T length or an even-number T length. Accordingly, no undesired edge shift from a predetermined mark length occurs between an odd-number T length mark and an even-number T length mark, and, each of the mark lengths is natural-number multiple of 1T. Only a pulse span as short as 0.5T at the center rear cooling or heating pulse in an even-number T length mark occurs in this embodiment, and mark forming may not be satisfactory at this position. However, in the PWM recording, even if the mark forming is not satisfactory and the width of the mark is short in the middle of the mark, in the recording line direction, no substantial adverse affect occurs in a reproduced signal.

As described above, the light intensity control means of a digital electronic circuit produces pulse control signals based on given EFM data to cause the semiconductor laser drive circuit to drive the semiconductor laser LD with driving electric currents according to the pulse control signals, and causes the semiconductor laser LD to emit the multi-pulse waveform light, in the twenty-fifth embodiment. Therefore, the light intensity control means can use a simple circuit configuration, and the semiconductor laser drive circuit can use a low-cost electronic circuit. Further, the light intensity control means of a digital electronic circuit can use a synchronization circuit which operates in synchronization with both the channel clock signals and double clock pulses having the double frequency shown in FIG. 32, and produces the pulse control signals based on the EFM data. Accordingly, it is possible to provide very precise pulse spans.

Figure 33B:
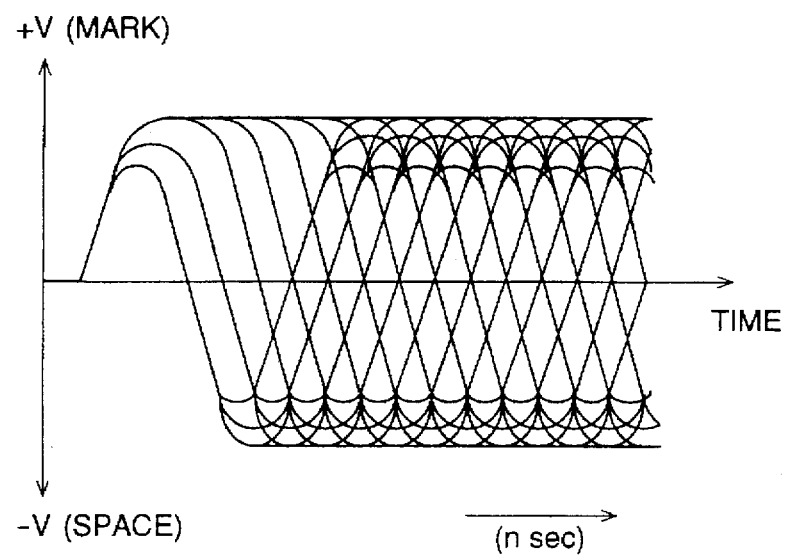

By using the recording waveforms in the twenty-fifth embodiment for forming record marks in a phase-change medium, it is possible to form a proper record mark having a length equal to a given EFM-data data length. Therefore, an eye pattern which represents RF signals of reproduced signals from record marks having various mark lengths is satisfactory, as shown in FIG. 33B, as through low-speed recording was performed, even when high speed recording is performed.

The above-shown set values of the head heating pulse A pulse span, tail cooling pulse Cr pulse span and so forth are merely typical values. In practice, those values are optimized according to recording material, medium layer configuration and so forth. The total length (span) of a recording waveform and the length of a resulting record mark varies depending on recording modulation method, recording density and laser-light spot diameter on a recoding medium. In view of such various factors/conditions, it is also possible that each recording data which uses an even-number T length of waveform for forming a length of a record mark in the manner shown in FIG. 32 will instead use an odd-number T length of waveform for forming the same length record mark, and each recording data which uses an odd-number T length of waveform for forming a record mark length in the manner shown in FIG. 32 will instead use an even-number T length of waveform for forming the same length of record mark.

In summary, in the information recording and reproducing apparatus in the twenty-fifth embodiment of the present invention, information is recorded in a recording medium which uses a recording layer having a phase changeable between a crystal phase and an amorphous phase through light emission from a semiconductor laser LD acting as a light source. The apparatus uses the information recording system in which a record mark is formed in the recording medium using multi-pulse light including a head heating pulse A, alternately repeating rear cooling and heating pulses C, B and tail cooling pulse Cr. As shown in FIG. 32, each of the rear cooling and heating pulses C, Cr, B of each recording waveform is approximately equal to the period of the recording channel clock pulses in this embodiment of the present invention. In the related art, as shown in FIG. 4, each of the rear cooling and heating pulses of each recording waveform is equal to half of the period of the recording channel clock pulses. In this embodiment of the present invention, sufficient heating time and cooling time can be provided. Therefore, without requiring a higher-speed semiconductor laser drive circuit, high-speed recording can be performed where a predetermined length of a record mark can be properly formed.

As shown in FIG. 32, the difference between the total length (span) of all the rear cooling pulses C, Cr and the total length (span) of all the rear heating pulses B is approximately equal between each even-number T length record data and each odd-number T length record data. For example, for the 6T mark record data, the total length (span) of the rear cooling pulse C, Cr is 2.5T while the total length (span) of the rear heating pulse B is 1.5T. The difference therebetween is 1T. For the 7T mark record data, the total length (span) of the rear cooling pulse C, Cr is 3T while the total length (span) of the rear heating pulse B is 2T. The difference therebetween is the same 1T. Undesired edge shift is prevented in a resulting record mark for each even-number T length recording data and for each odd-number T length recording data. Without requiring a higher-speed semiconductor laser drive circuit acting as a light-source drive unit, high-speed recording can be performed where a predetermined length record mark can be properly formed In the twenty-fifth embodiment, for the purpose of providing satisfactory heating and cooling pulse spans in multi-pulse light-emission waveform for front and rear edges of a record mark for each even-number T length recording data and odd-number T length recording data, only the center rear cooling or heating pulse can have a pulse span as small as 0.5T and each of the adjacent-side heating or cooling pulses thereof can accordingly have 0.75T pulse span. Satisfactory heating and cooling pulse spans in multi-pulse light-emission waveforms can be approximately provided for front and rear edges of a record mark. Sharp front and rear edges of a record mark can be formed, and jitter in a reproduced signal can be reduced.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 34:
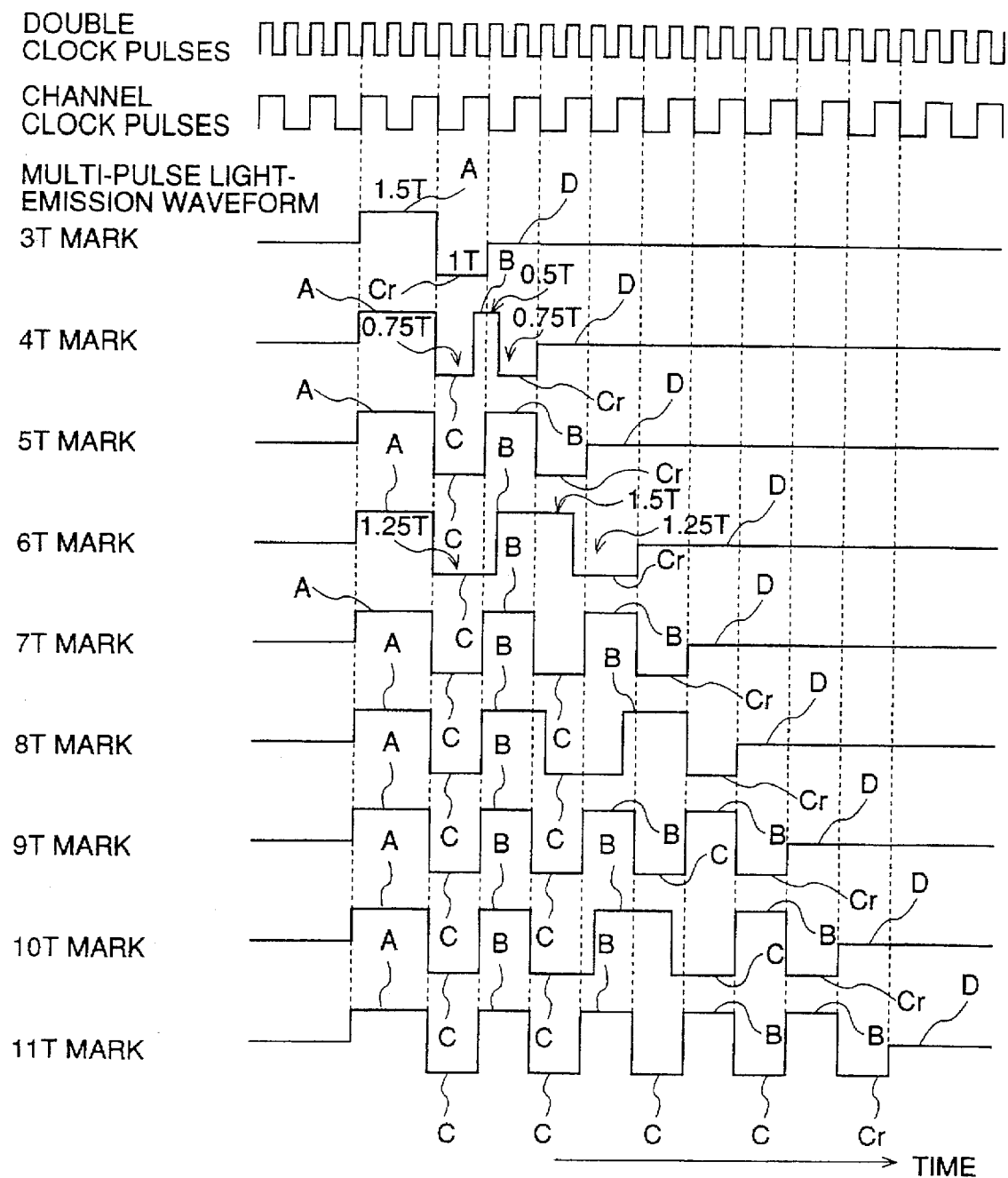
FIG. 34 shows an operating timing chart of an information recording and reproducing apparatus in twenty-sixth embodiment of the present invention.

FIG. 34 shows an operation timing of an information recording and reproducing apparatus in a twenty-sixth embodiment of the present invention.

The information recording and reproducing apparatus produces multi-pulse light-emission waveforms for providing precise record mark lengths, and recording information in a recording medium. Basically, the apparatus in the twenty-sixth embodiment is the same as the apparatus in the twenty-fifth embodiment. Those features different from the twenty-fifth embodiment will now be described.

In this information recording and reproducing apparatus in the twenty-sixth embodiment, the multi-pulse light-emission waveforms are such as those shown in FIG. 34. When odd-number T (3T, 5T, 7T, 9T and 11T) length record marks are formed, waveforms the same those in the twenty-fifth embodiment shown in FIG. 32 are used. Each of the total lengths of those recording waveforms is 'n–0.5T'. The light intensity control means produces, based on EFM data, the A, B pulse control signal, C pulse control signal, D pulse control signal. Switching devices 214, 215, 216, according to the A, B pulse control signal, C pulse control signal and D pulse control signal, turn ON and turn OFF the constant-current sources 211, 212 and 213, respectively. Thus, the semiconductor laser LD emits light with the multi-pulse light-emission waveforms such as those shown in FIG. 34.

When even-number T (4T, 6T, 8T, 10T) length record marks are formed, different recording waveforms are used. When a 4T length record mark is formed, a cooling pulse C, a heating pulse B and another cooling pulse C should occur during the rear duration of 2T. For this purpose, the same as in the twenty-fifth embodiment shown in FIG. 32, 0.75T cooling pulses C occur immediately before and after 0.5T heating pulse B.

However, when each of 6T and 10T length record marks is formed, the pulse span of the center heating pulse B occurring at the center of the rear portion following the head heating pulse A is 1.5T. Each of the two adjacent-side cooling pulses C, Cr occurring immediately before and after the center heating pulse B has a pulse span of 1.25T. Each of the other remaining heating and cooling pulses B, C, Cr if any, has a pulse span of 1T. When an 8T length record mark is formed, the pulse span of the center cooling pulse C occurring at the center of the rear portion following the head heating pulse A is 1.5T. Each of the two adjacent-side heating pulses B occurring immediately before and after the center heating pulse B has a pulse span of 1.25T. Each of the other remaining cooling pulses C, Cr has a pulse span of 1T.

By setting such recording waveforms, satisfactory heating and cooling pulse spans in multi-pulse light-emission waveforms can be provided for each of the front and rear edges of a record mark. Thereby, sharp front and rear edges of a record mark can be formed, and jitter in a reproduced signal can be reduced. As shown in FIG. 34, each of the total lengths (spans) of the heating pulses and cooling pulses is commonly expressed by 'n–0.5T' whether a mark to be formed has an odd-number T length or an even-number T length. Thereby, undesired edge shift from a predetermined mark length do not occur between an odd-number of T length mark and an even-number T length mark, and each of all the mark lengths is a natural-number multiple of 1T. Further, a pulse span not less than 1.25T at the approximately-center rear cooling or heating pulse in an even-number T length mark is mentioned above, and mark forming may be performed satisfactory even at this position due to satisfactory heating and cooling applied to a phase-change medium. Therefore, each of the record marks formed in the twenty-sixth embodiment has a more optimum shape than those in the twenty-fifth embodiment.

The above-shown set values of the head heating pulse A pulse span, tail cooling pulse Cr pulse span and so forth are merely typical values. In practice, those values are optimized according to recording material, medium layer configuration and so forth. Further, the total length (span) of a recording waveform and the length of a resulting record mark varies depending on recording modulation method, recording density and laser-light spot diameter on a recoding medium. In view of such various factors/conditions, it is also possible that each recording data which uses an even-number T length of waveform for forming a record mark length in the manner shown in FIG. 34 will instead use an odd-number T length of waveform for forming the same record mark length, and also each recording data which uses an odd-number T length of waveform for forming a of record mark length in the manner shown in FIG. 34 will instead use an even-number T length of waveform for forming the same record mark length.

Thus, similar to the twenty-fifth embodiment, similar advantages are provided from the information recording and reproducing apparatus in the twenty-sixth embodiment.

As described above, in the twenty-sixth embodiment, an approximately-central three rear heating and cooling pulses B and C may have pulse spans of 1.25T, 1.5T and 1.25T, respectively, in the above-stated order. Even in an approximately central portion, a resulting record mark is obtained as a result of being subject to satisfactory heating and cooling due to satisfactory long pulse spans. Thereby, the record mark is not thin even at such a portion, and jitter in a reproduced signal can be further reduced.

The above-mentioned light intensity control means can be practiced by using a special-purpose electronic circuit. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

Figure 35:
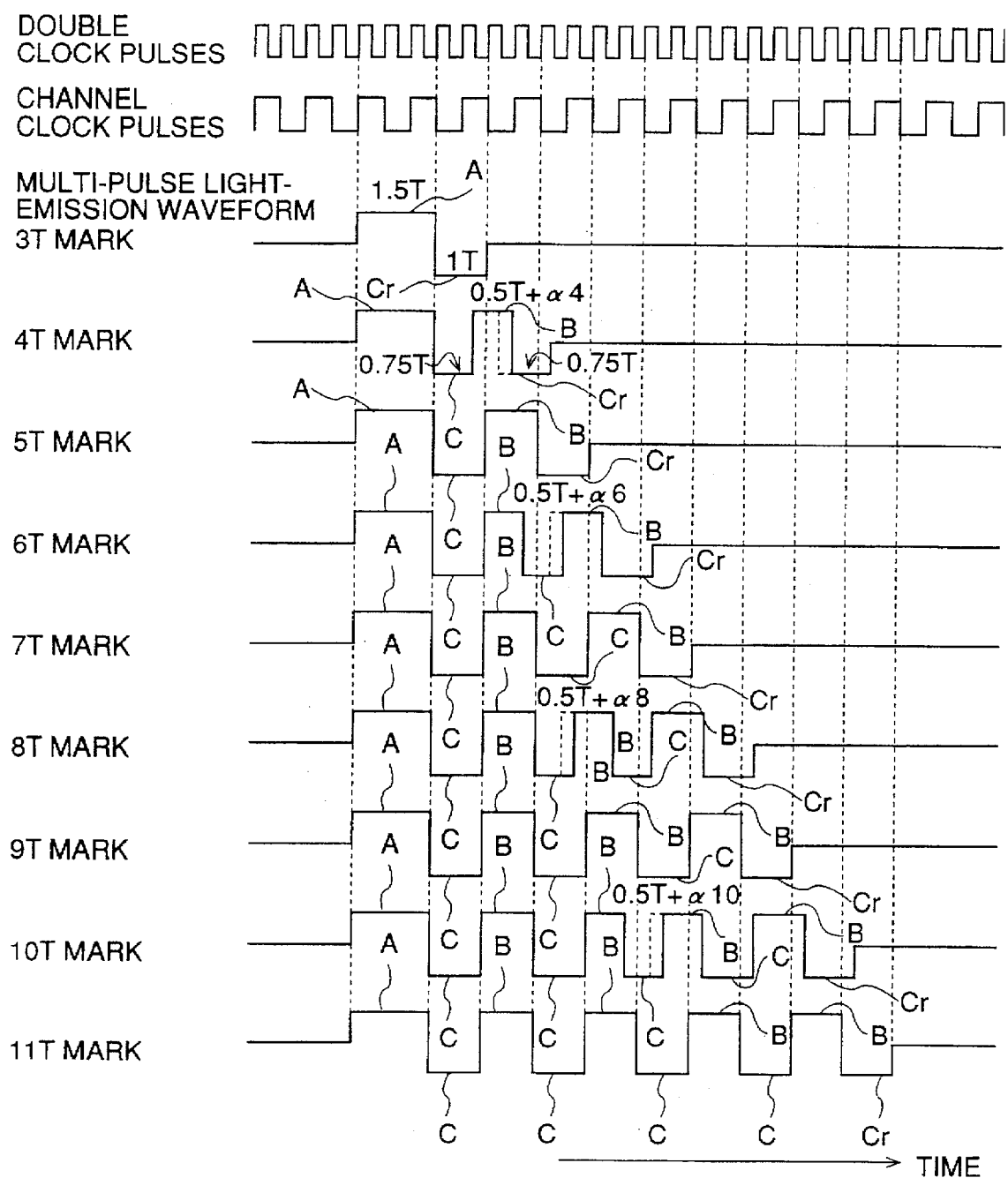
FIG. 35 shows an operating timing chart of an information recording and reproducing apparatus in twenty-seventh embodiment of the present invention.

FIG. 35 shows an operation timing of an information recording and reproducing apparatus in a twenty-seventh embodiment of the present invention.

This information recording and reproducing apparatus produces multi-pulse light-emission waveforms for providing precise record mark lengths, and thus recording information in a recording medium. Basically, the apparatus in the twenty-seventh embodiment is the same as the above-described apparatus in the twenty-fifth embodiment. Those features different from the twenty-fifth embodiment will now be described.

In the above-described information recording and reproducing apparatus in the twenty-five embodiment, patterns of repetitious heating pulses and cooling pulses are different in recording waveforms between odd-number T length record marks and even-number T length record marks. While each of the rear pulse spans is uniformly 1T for odd-number T length record marks, each of the center and adjacent-side rear pulse spans is shorter than 1T for even-number T length record marks. Accordingly, there is a slight difference in recording media heating and cooling conditions between odd-number T length record marks and even-number T length record marks. Undesired edge shifts may occur in odd-number T length record marks with respect to even-number T length record marks. As recording density becomes higher, a detection window width (span) Tw for a reproduced signal becomes shorter. Therefore, the edge shifts may cause data error in the reproduced signal.

The information recording and reproducing apparatus in the twenty-seventh embodiment, in order to prevent such edge shifts from occurring and to reduce data error in a reproduced signal, multi-pulse light-emission waveforms are corrected with respect to those of the twenty-fifth embodiment. In the twenty-seventh embodiment, recording waveforms for odd-number T length record marks are the same as those in the twenty-fifth embodiment. For those record marks, the head heating pulse has a pulse span of 1.5T and each of the other remaining cooling and heating pulses C, B, Cr have a pulse span of 1T. Accordingly, edge shift does not occur between the 3T, 5T, 7T, 9T, 11T marks.

Different from such a regular pattern for the odd-number T length record marks, each of the recording waveforms for the even-number T length record marks has the irregular pattern as described in the twenty-fifth embodiment. Such an irregularity will be corrected in the twenty-seventh embodiment. Correction which will be described now is performed by the light intensity control means of the digital electronic circuit. For each of the 4T, 8T record marks which has the center rear heating pulse B having a pulse span as short as 0.5T, the pulse span of 0.5T may not be satisfactory in a case of high-speed recording, an edge shift may occur so that the rear edge is shorter than a predetermined mark length in comparison to forming odd-number T length record marks.

In order to prevent such an edge shift from occurring, in the twenty-seventh embodiment, the light intensity control means corrects the center rear heating pulses B to have pulse spans as long as '0.5T+α4' and '0.5T+α8', respectively, as shown in FIG. 35, for the recording waveforms for the 4T, 8T marks, where α4 and α8 are equivalent to the edge shift amounts otherwise occurring, respectively. Each of the adjacent-side cooling pulses C(, Cr) has a pulse span of 0.75T similar to the twenty-fifth embodiment.

For each of the 6T, 10T record marks which has the center rear cooling pulse C having a pulse span as short as 0.5T, the pulse span of 0.5T may not be satisfactory in a case of high-speed recording, as an edge shift may occur and the rear edge becomes shorter than a predetermined mark length in comparison to forming odd-number T length record marks.

In order to prevent such an edge shift from occurring, in the twenty-seventh embodiment, the light intensity control means correct the center rear heating pulses B to have a pulse spans as long as '0.5T+α6' and '0.5T+α10', respectively, as shown in FIG. 35, for the recording waveforms for the 6T, 10T marks, where α6 and α10 are equivalent to the edge shift amounts otherwise occurring, respectively. Each of the adjacent-side heating pulses B has a pulse span of 0.75T similar to the twenty-fifth embodiment.

By such pulse span correction, edge shifts otherwise occurring between cases of forming odd-number T length record marks and cases of forming even-number T length record marks can be completely compensated and higher-density recording is possible. In the twenty-seventh embodiment the pulse span of each of the center rear heating and cooling pulses is increased. Thereby, a phenomenon in which a middle portion of a record mark in the recording line direction has a thinner width can be substantially eliminated. Accordingly, a more satisfactory reproduced signal can be provided.

The above-shown set values of the head heating pulse A pulse span, tail cooling pulse Cr pulse span and so forth are merely typical values. In practice, those values are optimized according to recording material, medium layer configuration and so forth. Further, the total length (span) of a recording waveform and the length of a resulting record mark varies depending on recording modulation method, recording density and laser-light spot diameter on a recoding medium. In view of such various factors/conditions, it is also possible that each recording data which uses an even-number T length of waveforms for forming a record mark length in the manner shown in FIG. 35 will instead use an odd-number T length of waveforms for forming the same record mark length, and each recording data which uses an odd-number T length of waveforms for forming record mark length in the manner shown in FIG. 35 will instead use an even-number T length of waveforms for forming the same record mark length.

The length of a resulting record mark depends on the total length (span) of all the heating pulses and cooling pulses. Therefore, it is not necessary to use the center rear heating and cooling pulses each of which occurs at the center of the portion of the recording waveform following the head heating pulse. For example, the tail cooling pulse of a recording waveform can be used for compensating an edge shift otherwise occurring. The above-mentioned light intensity control means of digital electronic circuit which can generate with high accuracy corrected heating pulses and cooling pulses in multiple stages can be easily practiced using a delay electronic circuit such as a multi-tap delay line, a plurality of monostable multivibrators or the like.

The light intensity control means can be practiced by using a special-purpose electronic circuit as mentioned above. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

As described above, by adjusting a pulse span (pulse spans) of certain one(ones) of rear heating pulse B and cooling pulses C, Cr following a head heating pulse A in a multi-pulse light-emission recording waveform, it is possible to completely compensate even slight edge shifts otherwise occurring due to difference in recording medium heating and cooling conditions between cases of forming odd-number of times of T length record marks and cases of forming even-number of times of T length record marks. The concept of edge shift compensation in the twenty-seventh embodiment can also be applied to not only to the twenty-fifth embodiment but also to the twenty-sixth embodiment similarly.

An information recording and reproducing apparatus in twenty-eighth, twenty-ninth and thirtieth embodiments of the present invention will now be described. The information recording and reproducing apparatus in the twenty-eighth, twenty-ninth and thirtieth embodiments is obtained from the information recording and reproducing apparatus in the twenty-fifth, twenty-sixth and twenty-seventh embodiments of the present invention, respectively, by applying the recording layer of a phase-change medium which uses compositions of Ag—In—Sb—Te as the recording material.

As representative examples of a material for a recording layer of a phase-change recording medium, materials such as Ge—Sb—Te, Ge—Te—Sb—S, Te—Ge—Sn—Au, Ge—Te—Sn, Sb—Se, Sb—Se—Te, Sn—Se—Te, Ga—Se—Te, Ga—Se—Te—Ge, In—Se, In—Se—Te, Ag—In—Sb—Te, and the like are used in the related art.

In each of the information recording and reproducing apparatus in the twenty-eighth, twenty-ninth and thirtieth embodiments, by applying the recording layer of a phase-change medium which uses compositions of Ag—In—Sb—Te as the recording material, when data is recorded in a phase-change media of the recording material, amorphous phase formation strongly depends on a sharp mark forming cooling condition from heating→cooling. That is, record mark formation strongly depends on a power difference between a heating pulse and an immediately following cooling pulse. Jitter characteristics depend on a difference in light-emission power level between a heating pulse and an immediately following cooling pulse for each of the front and rear edge of a record mark. It is possible to make front and rear edges of a record mark to be sharper in recording the record mark in a phase-change medium in the information recording and reproducing apparatus in comparison to the twenty-fifth, twenty-sixth and twenty-seventh embodiments. As a result, by applying the recording layer of a phase-change medium which uses compositions of Ag—In—Sb—Te as the recording material, the above-mentioned jitter effect is remarkably reduced in the twenty-eighth, twenty-ninth and thirtieth embodiments.

Figure 36:
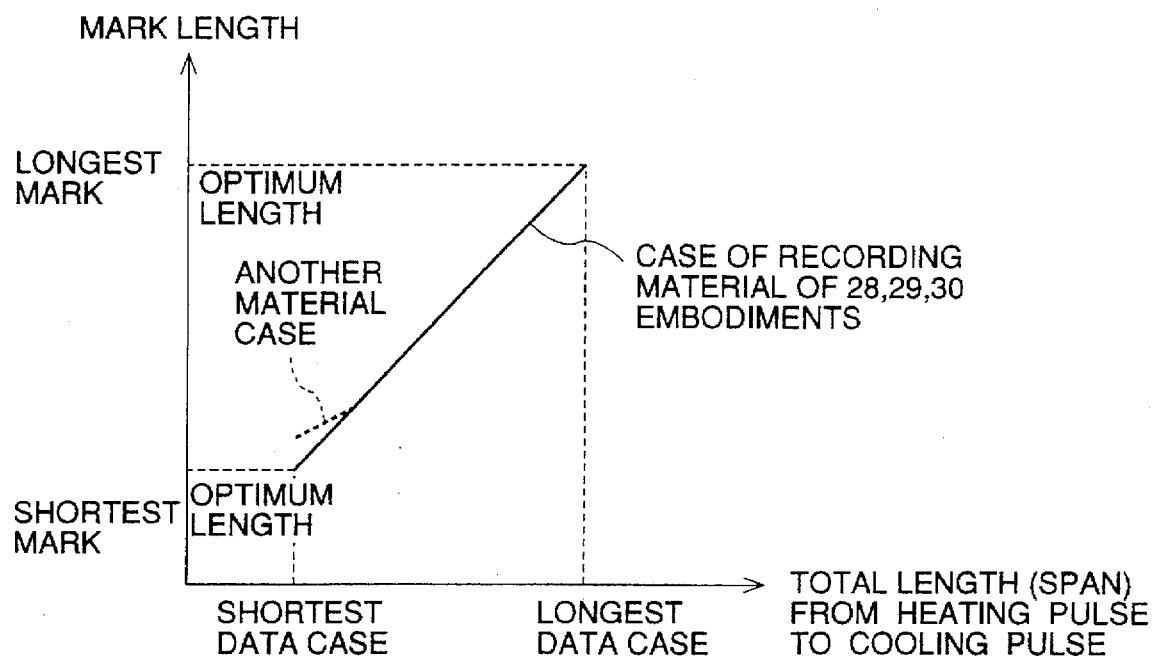
FIG. 36 shows a relationship between a total length (span) of head heating pulses and cooling pulses in a multiplies light-emission power waveform and the actual length (in the recording line direction) of a resulting record mark in each of information recording and reproducing apparatus in the twenty-eighth, twenty-ninth and thirtieth embodiments in the present invention.

FIG. 36 shows a relationship between a total length (span) of head heating pulses and cooling pulses in a multiplies light-emission power waveform and the actual length (in the recording line direction) of a resulting record mark in each of the twenty-eighth, twenty-ninth and thirtieth embodiments. As shown in the figure, by applying the recording layer of a phase-change medium which uses compositions of Ag—In—Sb—Te as the recording material, the actual length of the resulting record mark tends to be in proportion to the total length, and the relationship tends to appear to be approximately a straight line in the figure. By the application of the recording layer of a phase-change medium which uses compositions of Ag—In—Sb—Te as the recording material, the actual length of the resulting record mark tends to be in proportion to the total length of the recording waveform, and the relationship tends to appear to be approximately a straight line in the figure. Thereby, it is possible that the length of a resulting record mark can be precisely equal to a natural number multiple of 1T without causing edge shifts between cases of forming odd-number T length record marks and cases of forming even-number T length record marks. Even a slight edge shift otherwise occurring can be compensated with high accuracy. Even if another recording material is used as a recording layer of the phase-change medium, the relationships between semiconductor laser LD light-emission waveforms and jitter characteristics in a reproduced signal and the relationships between recording pulse spans and mark lengths are basically the same. Thereby, the advantages of the present invention are maintained.

An information recording system and an information recording and reproducing apparatus which practices the information recording system, in a thirty-first embodiment of the present invention, are provided as a result of combining features of various embodiments described and discussed above.

A basic recording system including code data and data modulation method is identical to that of the above-described embodiments.

Figure 37:
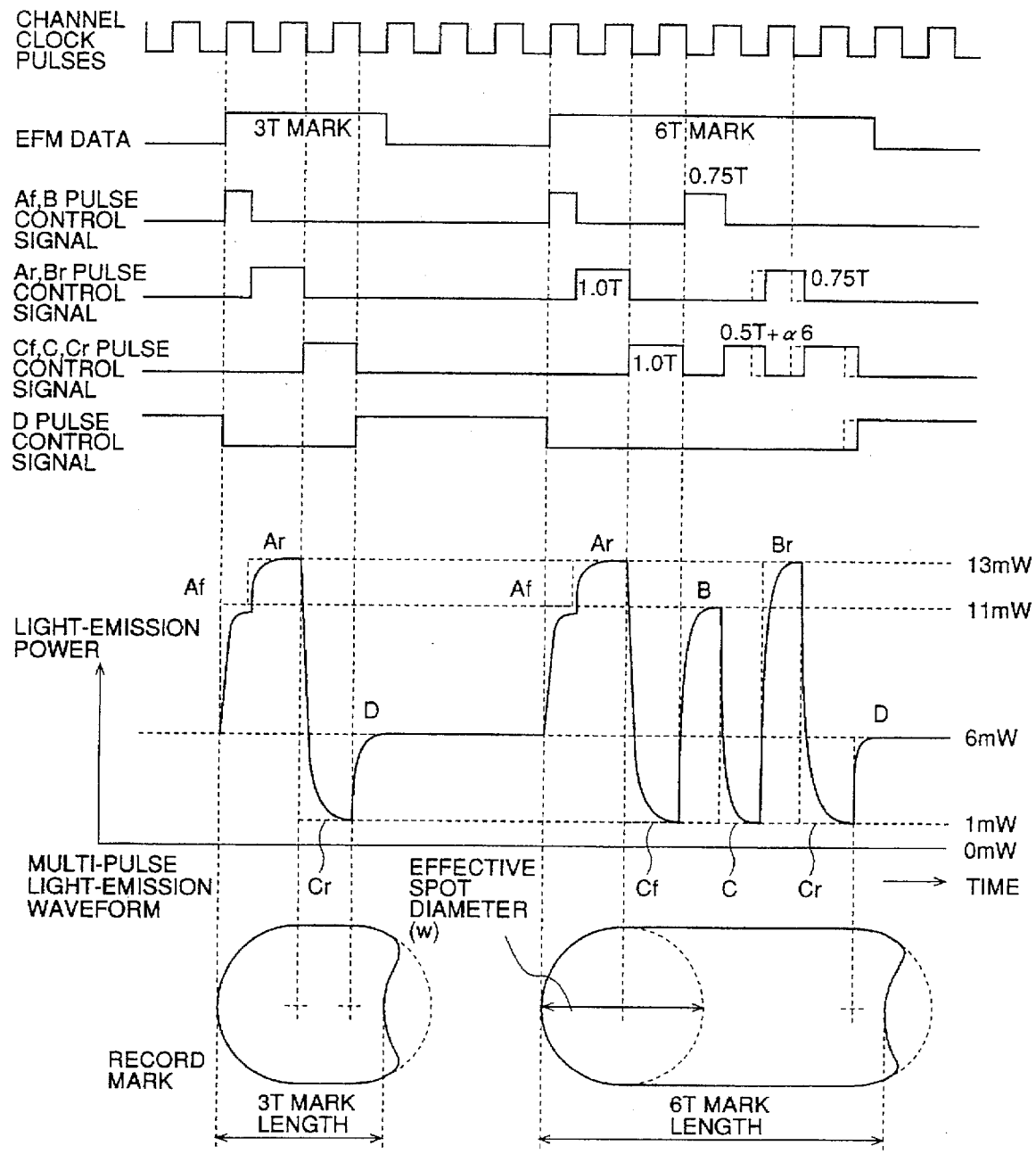
FIGS. 37 and 38 show operation time charts of an information recording and reproducing apparatus in a thirty-first embodiment of the present invention.

As shown in FIG. 37, the thirty-first embodiment is used where the relationship between the effective LD spot diameter 'w' on a recording medium surface and a shortest mark length ML is w>ML. This is similar to the tenth embodiment described with reference to FIG. 25.

In this case, in order to prevent the length of a resulting record mark deviating from an ideal length, a head heating pulse Af, Ar has a pulse span of 1.5T, a tail cooling pulse Cr has a pulse span of 1T, as shown in FIG. 37, and the total length of the recording waveform is approximately 'y–0.5T' for a desired recording mark length 'y'. (For example, for a 6T mark, the total length of the recording waveform is 5.5T in the right-hand side example of FIG. 37.) Thereby, it is possible to provide an ideal record mark length.

It is possible to set recording medium heating power and cooling power appropriately so that jitter characteristics and overwriting performance be satisfactory.

By appropriately adjusting pulse spans of the head heating pulse and tail cooling pulse, even where an optical power unit providing a different effective LD spot diameter, and/or, when recording in a different recording line density is performed, it is not necessary to substantially alter the heating power and cooling power for responding to such different factors/conditions. It is possible to prevent overwriting performance and jitter characteristics from being degraded. In practice, the values of 'w' and 'ML' should be applied, which have been optimized according to design values 'k', 'λ', 'NA' of an optical pickup, a modulation method, and a shortest length calculated according to a recording line density.

As shown in FIG. 37, in the thirty-first embodiment, the head heating pulse includes a front division Af and a rear division Ar, the light-emission power of the rear division Ar is set higher than that in the related art, the light-emission power of the front division Af is lower than that in the related art. Further, the light-emission power of the tail heating pulse Br is set higher similar to the above-mentioned rear division Ar.

The above-described light-emission power set values are as follows:

the light-emission power of the front division Af of the head heating pulse: 11 mW;

the light-emission power of the rear division Ar of the head heating pulse: 13 mW;

the light-emission power of each of the rear heating pulses, excepting the tail heating pulse Br, B: 11 mW;

the light-emission power of the tail heating pulse Br: 13 mW;

the light-emission power of each of the cooling pulses C, Cr: 1 mW (which is approximately equal to a reading power such as that described above); and the light-emission power of the erasing pulse D (erasing power): 6 mW.

In the thirty-first embodiment, by using a recording waveform such as that shown in FIG. 37, the difference in light-emission power from the heating pulse Ar to the following cooling pulse C in the multiple pulses for forming the front edge of a record mark in a phase-change medium is 12 mW. Similarly, the difference in light-emission power from the heating pulse Br to the following cooling pulse Cr in the multiple pulses for forming the rear edge of a record mark in a phase-change medium is 12 mW. As a result, each of the differences in light-emission power from the heating pulses Ar and Br to the following cooling pulses C, Cr, respectively, is larger than that in the related art. For forming the front and rear edges of a record mark in a phase-change medium, a satisfactory sharp cooling condition is obtained in the information recording system in the thirty-first embodiment of the present invention. As a result, sharper mark edges are obtained. Assuming that each of the differences in light-emission power from the heating pulses to the following cooling pulses for forming the front and rear edges of a record mark, respectively, in the related art is 11 mW, by increase from 11 mW to the above-mentioned 12 mW, it is possible to reduce an allowable jitter characteristic σ/Tw (where 'Tw' represent a window span) by approximately 2% in this embodiment in comparison to the related art. The maximum number of times of overwriting when the jitter characteristic σ/Tw is satisfied can be advantageously approximately 1.5 times in comparison to the related art because the average or overall light-emission power in the thirty-first embodiment is lower than that in the related art.

Figure 38:
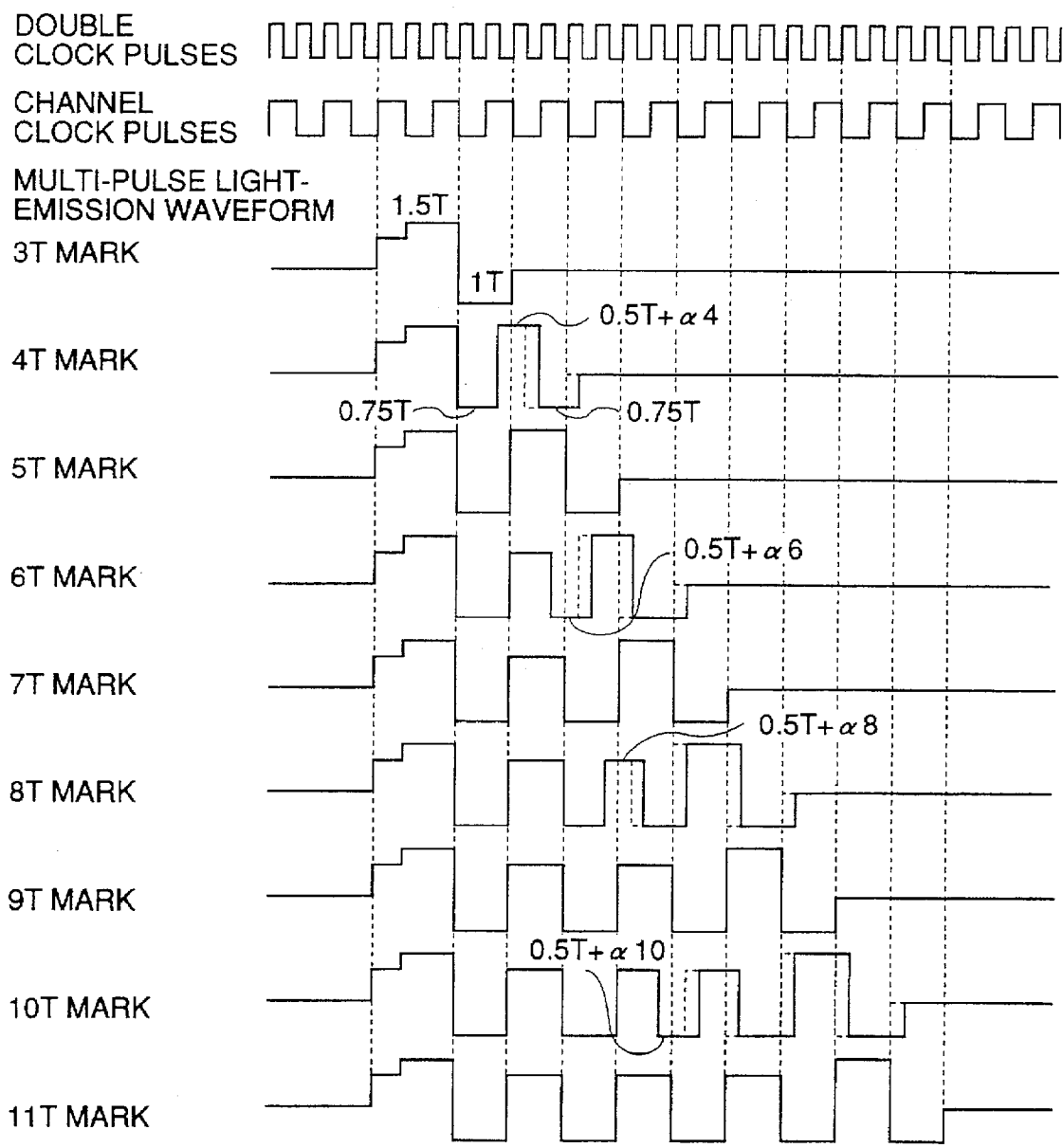

As shown in FIG. 38, recording light-emission multipulse waveforms according to the thirty-first embodiment includes a waveform for forming a 3T mark (which is the shortest mark) in a recording medium. In this waveform, a head heating pulse A (Af, Ar) has a pulse span of 1.5T, a tail cooling pulse has a pulse span of 1T. For each of the other odd-number T length (5T, 7T ,9T and 11T) marks, between the head heating pulse A and tail cooling pulse Cr, light emission is performed according to '(y−1)/2−1' sets of cooling and heating pulses, each set including a 1T cooling pulse and a 1T heating pulse. For example, when a 7T mark is formed, y=7. Then, the number of sets of the cooling and heating pulses is (7−1)/2−1=2. For the even-number T length marks, a different manner is applied for setting recording waveforms. For each of the 4T, 8T record marks which has the center rear heating pulse B having the pulse span as short as 0.5T, the pulse span of 0.5T may not be satisfactory in high-speed recording, an edge shift may occur and the rear edge is shorter than a predetermined mark length in comparison to the case of forming odd-number T length record marks. For each of the 6T, 10T record marks which has the center rear cooling pulse C having a pulse span as short as 0.5T, the pulse span of 0.5T may not be satisfactory in high-speed recording, an edge shift may occur and the rear edge is shorter than a predetermined mark length in comparison to forming odd-number T length record marks. The waveforms for the 4T, 8T, 6T and 10T are shown in the broken lines in FIG. 38.

By the foregoing setting, the pulse spans of each of heating and cooling pulses for forming the front and rear edges of a record mark is very long, in comparison to the waveforms shown in FIG. 4 in the related art. As shown in FIG. 5A, it is not due to the rising and decaying durations of the semiconductor laser (LD) that unsatisfactory heating times and cooling times are provided. Instead, as shown in FIG. 33A, satisfactory heating times and cooling times can be provided even in the presence of similar rising and decaying durations of the semiconductor laser (LD). In the thirty-first embodiment, a predetermined length of record mark can be formed, and degradation of jitter characteristics in a reproduced signal can be prevented. Further, the total length of the cooling and heating pulses is approximately 'y−0.5T' which is the same between the odd-number T length marks and the even-number T length marks. Therefore, no edge shift occurs between the odd-number T length marks and the even-number T length marks. Although each of the even-number T length marks has the center rear pulse of 0.5T and mark formation may not be satisfactory in a middle portion of a record mark, in the PWM recording system, even if a record mark has a thin middle portion, such a fact may not adversely affect a reproduced signal.

Figure 39:
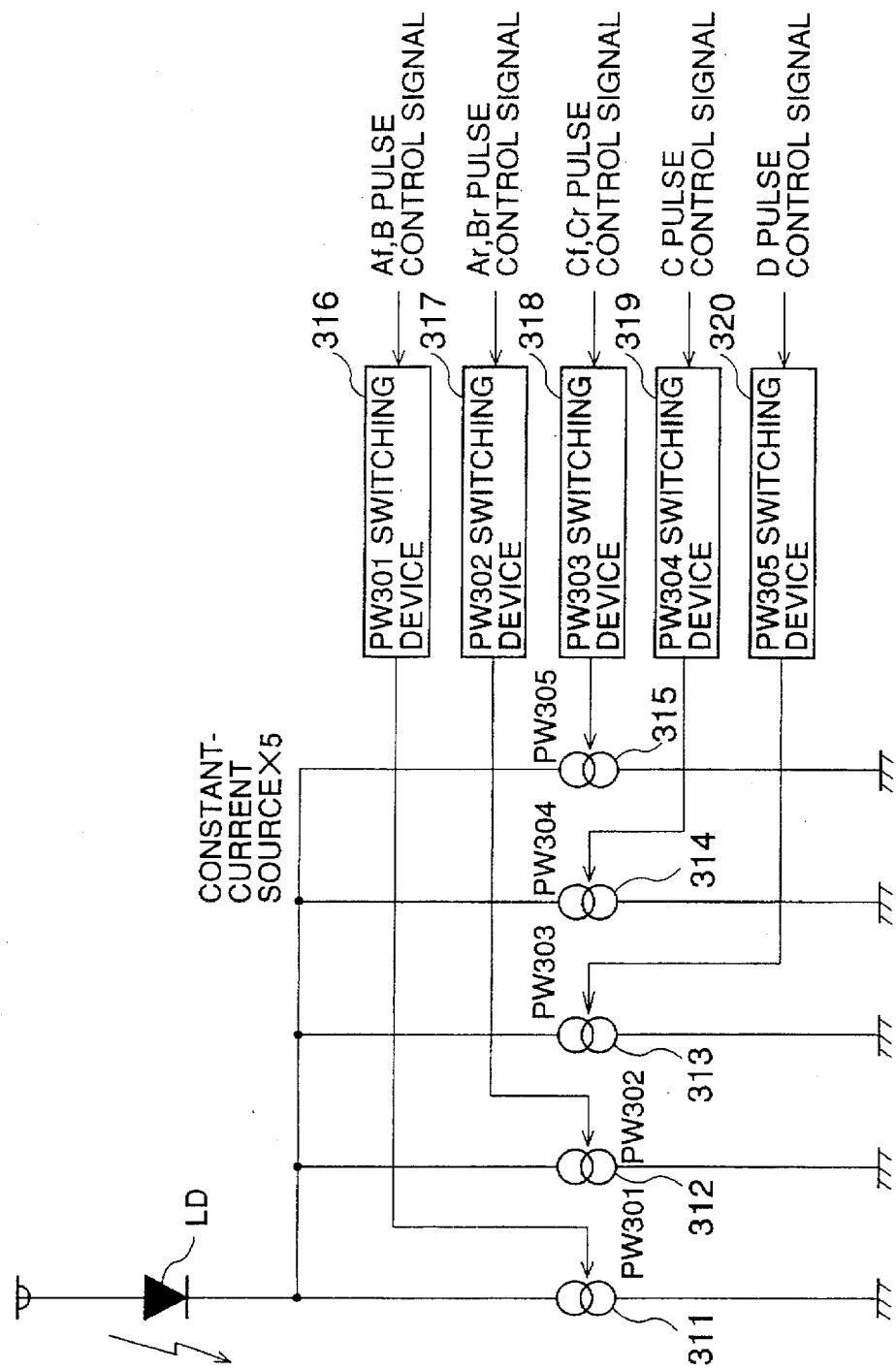
FIG. 39 shows a block diagram of part of the above-mentioned apparatus in the thirty-first embodiment.

As means for generating the multi-pulse waveforms, a digital electronic circuit produces pulse control signals based on EFM data, each signal being for respective heating and cooling pulse power levels. Thereby merely a simple circuit configuration is needed. By using a synchronization circuit using recording channel clock pulses and also double clock pulses with double frequency, it is possible to provide very precise pulse spans. As shown in FIG. 39, the respective pulse signals perform, through the functions of switching devices 316, 317, 318, 319 and 320, switching of constant-current sources 301, 302, 303, 304 and 305 with appropriate timing, and LD multi-pulse light-emission is performed. Thus, an easy and low-cost LD drive circuit can be provided.

Figure 5B:
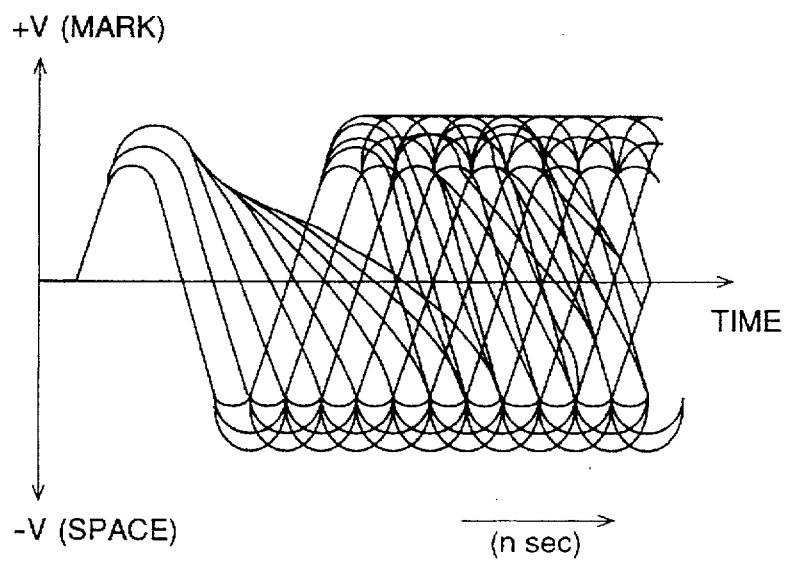
FIG. 5B illustrates a problematic RF signal amplitude decay phenomenon in the related art.

In the thirty-first embodiment, it is possible to form a record mark which has a length precisely equal to an EFM data length. As a result, an eye pattern which represents RF signals of reproduced signals from record marks having various mark lengths is satisfactory, as shown in FIG. 33B, (different from the eye pattern shown in FIG. 5B in the related art in which as a recording data length becomes longer as the overall or average RF magnitude becomes smaller,) as if low-speed recording is performed, even when high speed recording is actually performed.

In the waveforms in the thirty-first embodiment, patterns of repetitious heating pulses and cooling pulses are different in recording waveforms between odd-number T length record marks and even-number T length record marks. Specifically, while each of all the rear pulse spans is uniformly 1T for odd-number T length record marks, each of the center and adjacent-side rear pulse spans is shorter than 1T for even-number T length record marks. There is a slight difference in recording media heating and cooling conditions between odd-number T length record marks and even-number T length record marks. Undesired edge shifts may occur in odd-number T length record marks with respect to even-number T length record marks. As recording density becomes higher, a detection window width (span) Tw for a reproduced signal becomes shorter. Therefore, the edge shifts may cause data error in the reproduced signal.

In the thirty-first embodiment, to prevent such edge shifts from occurring and to reduce data error in a reproduced signal, multi-pulse light-emission waveforms are corrected from the above-described waveforms indicated by the broken lines in FIG. 38. In the thirty-first embodiment, recording waveforms for odd-number T length (3T, 5T, 7T, 9T, 11T) record marks are the same as those described above as shown in FIG. 38. For those record marks, the head heating pulse has a pulse span of 1.5T and each of the other remaining cooling and heating pulses has a pulse span of 1T and edge shift does not occur between the 3T, 5T, 7T, 9T, 11T marks.

Different from such a regular pattern for the odd-number T length record marks, each of the recording waveforms for the even-number T length record marks, indicated by the broken lines in FIG. 38, has the irregular pattern as described above. Such an irregularity will be finally corrected in the thirty-first embodiment. Correction is performed by the light intensity control means of a digital electronic circuit. For each of the 4T, 8T record marks which has the center rear heating pulse having a pulse span as short as 0.5T, the pulse span of 0.5T may not be satisfactory in a case of high-speed recording, an edge shift (not shown in the figure) may occur and the rear edge will be shorter than a predetermined mark length in comparison to forming odd-number T length record marks.

In order to prevent such an edge shift from occurring, in the thirty-first embodiment, the light intensity control means corrects those center rear heating pulses to have pulse spans as long as '0.5T+α4' and '0.5T+α8', respectively, as shown in FIG. 38 indicated by the solid lines, for the recording waveforms for the 4T, 8T marks, where α4 and α8 are equivalent to the edge shift amounts otherwise occurring, respectively. Each of the adjacent-side cooling pulses has a pulse span of 0.75T.

For each of the 6T, 10T record marks which has the center rear cooling pulse C having a pulse span of as short as 0.5T, the pulse span of 0.5T may not be satisfactory in a case of high-speed recording. An edge shift may occur and the rear edge will be shorter than a predetermined mark length in comparison to forming odd-number T length record marks.

In order to prevent such an edge shift from occurring, in the thirty-first embodiment, the light intensity control means corrects those center rear heating pulses B to have pulse spans as long as '0.5T+α6' and '0.5T+α10', respectively, as shown in FIG. 38 in the solid lines, for the recording waveforms for the 6T, 10T marks, where α6 and α10 are equivalent to the edge shift amounts otherwise occurring, respectively. Each of the adjacent-side heating pulses has a pulse span of 0.75T.

By such pulse span correction, edge shifts otherwise occurring between forming odd-number T length record marks and forming even-number T length record marks can be completely compensated. Thereby, a detection margin in a reproduced signal is enlarged and higher-density recording is possible. In the thirty-first embodiment, the pulse span of each of the center rear heating and cooling pulses is increased. A phenomenon that a middle portion of a record mark in the recording line direction has a thinner width can be improved. Thereby, a more satisfactory reproduced signal can be provided.

The above-shown set values of the head heating pulse A pulse span, tail cooling pulse Cr pulse span and so forth are merely typical values. In practice, those values are optimized according to recording material, medium layer configuration and so forth. The length of a resulting record mark depends on the total length (span) of all the heating pulse and cooling pulses. Therefore, it is not necessary to use the center rear heating and cooling pulses each of which occurs at the center of the portion of the recording waveform following the head heating pulse. For example, the tail cooling pulse of a recording waveform can be used for compensating an edge shift otherwise occurring. Further, the light intensity control means of the digital electronic circuit which can generate with high accuracy corrected heating pulses and cooling pulses in multiple stages can be easily practiced using a delay electronic circuit such as a multi-tap delay line, a plurality of monostable multivibrators or the like.

The light intensity control means can be practiced by using a special-purpose electronic circuit as mentioned above. It is also possible to practice the light intensity control means using a general-purpose computer, such as a personal computer shown in FIG. 9, that includes appropriate information storage devices such as a hard disk drive device, a floppy disk drive device, a ROM, a RAM and/or the like, and is specially configured by predetermined software stored in a computer-usable medium such as a floppy disk shown in FIG. 9.

The thirty-first embodiment is merely one example of a combination of the various embodiments of the present invention. It may be possible to practice various variant embodiments by combining features of the embodiments.

The present invention is not limited to the above-described embodiments, and variations and modifications may be made without departing from the scope of the present invention as defined by the claims appended hereto.

What is claimed is:

1. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, and wherein said head heating pulse includes a front division and a rear division, a difference in light-emission power between said head heating pulse and an immediately following cooling pulse being larger than the difference in light-emission power between another heating pulse and an immediately following cooling pulse.

2. The information recording system according to claim 1, wherein when a shortest-length xT mark is formed, where T represents each period of reference clock pulses and x represents a predetermined natural number, said multi-pulse light includes said head heating pulse and an immediately tail cooling pulse, and, when another longer length yT mark is formed, n times of a predetermined light emission is performed between said head heating pulse and said tail cooling pulse, where n=y−x, said predetermined light emission including said rear heating pulse and rear cooling pulse.

3. The information recording system according to claim 1, wherein said recording layer includes recording material comprising $Ag_aIn_bSb_cTe_d$, where subscripts 'a', 'b', 'c', 'd' represent positive real numbers, respectively.

4. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, and wherein light-emission power of the cooling pulse immediately following said head heating pulse is lower than the light-emission power of another following cooling pulse.

5. The information recording system according to claim 4, wherein when the shortest-length xT mark is formed, where T represents each period of reference clock pulses and x represents a predetermined natural number, said multi-pulse light includes said head heating pulse and an immediately tail cooling pulse, and, when another longer length yT mark is formed, n times of a predetermined light emission is performed between said head heating pulse and said tail cooling pulse, where n=y−x, said predetermined light emission including said rear heating pulse and rear cooling pulse.

6. The information recording system according to claim 4, wherein said recording layer includes recording material comprising $Ag_aIn_bSb_cTe_d$, where subscripts 'a', 'b', 'c', 'd' represent positive real numbers, respectively.

7. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, and wherein a difference in light-emission power between a tail heating pulse of said rear heating pulse and an immediately following cooling pulse is larger than a difference in light-emission power between another heating pulse and an immediately following cooling pulse.

8. The information recording system according to claim 7, wherein said recording layer includes recording material comprising $Ag_aIn_bSb_cTe_d$, where subscripts 'a', 'b', 'c', 'd' represent positive real numbers, respectively.

9. The information recording system according to claim 7, wherein when the shortest-length xT mark is formed, where T represents each period of reference clock pulses and x represents a predetermined natural number, said multi-pulse light includes said head heating pulse and the immediately following tail cooling pulse, and, when another longer length yT mark is formed, n times of a predetermined light emission is performed between said head heating pulse and said tail cooling pulse, where n=y−x, said predetermined light emission including said rear heating pulse and rear cooling pulse.

10. The information recording system according to claim 7, wherein the light-emission power of the tail cooling pulse which immediately follows the tail heating pulse of said rear heating pulse is lower than another cooling pulse.

11. The information recording system according to claim 10, wherein when the shortest-length xT mark is formed, where T represents each period of reference clock pulses and x represents a predetermined natural number, said multi-pulse light includes said head heating pulse and the immediately tail cooling pulse, and, when another longer length yT mark is formed, n times of a predetermined light emission is performed between said head heating pulse and said tail cooling pulse, where n=y−x, said predetermined light emission including said rear heating pulse and rear cooling pulse.

12. The information recording system according to claim 10, wherein said recording layer includes recording material comprising $Ag_aIn_bSb_cTe_d$, wherer subscripts 'a', 'b', 'c', 'd' represent positive real numbers, respectively.

13. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, and wherein said head heating pulse includes a front division and a rear division, each difference in light-emission power between said rear division of said head heading pulse and an immediately following cooling pulse and difference between a tail heating pulse of said rear heating pulse and an immediately following cooling pulse is larger than a difference in light-emission power between another heating pulse and the immediately following cooling pulse.

14. The information recording system according to claim 13, wherein when the shortest-length xT mark is formed, where T represents each period of reference clock pulses and x represents a predetermined natural number, said multi-pulse light includes said head heating pulse and an immediately tail cooling pulse, and, when another longer length yT mark is formed, n times of a predetermined light emission is performed between said head heating pulse and said tail cooling pulse, said predetermined light emission including said rear heating pulse and rear cooling pulse, where n=y−x.

15. The information recording system according to claim 13, wherein said recording layer includes recording material comprising $Ag_aIn_bSb_cTe_d$, wherer subscripts 'a', 'b', 'c', 'd' represent positive real numbers, respectively.

16. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, and wherein said head heating pulse includes a front division and a rear division, light-emission power of said rear division of said head heating pulse is higher than another heating pulse, the light-emission power of said head cooling pulse immediately following said head heating pulse is lower than the light-emission power of another cooling pulse, the light-emission power of a tail heating pulse of said rear heating pulse is approximately equal to the light-emission power of said rear division of said head heating pulse, the light-emission power of the tail cooling pulse which immediately follows a tail heating pulse of said rear heating pulse is lower than the light-emission power of another cooling pulse.

17. The information recording system according to claim 16, wherein when the shortest-length xT mark is formed, where T represents each period of reference clock pulses and x represents a predetermined natural number, said multi-pulse light includes said head heating pulse and the immediately tail cooling pulse, and, when another longer length yT mark is formed, n times of a predetermined light emission is performed between said head heating pulse and said tail cooling pulse, where n=y−x, said predetermined light emission including said rear heating pulse and rear cooling pulse.

18. The information recording system according to claim 16, wherein said recording layer includes recording material comprising $Ag_aIn_bSb_cTe_d$, wherer subscripts 'a', 'b', 'c', 'd' represent positive real numbers, respectively.

19. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various lengths of record marks in said recording layer, so that information is recorded in said recording medium, and wherein a total span from said head heating pulse to a tail cooling pulse is changed depending on a shortest-length record mark size and an effective spot diameter of said light on said recording medium.

20. The information recording system according to claim 19, wherein, when said effective spot diameter is approximately smaller than said shortest-length xT record mark for forming a yT length record mark, n sets of said rear cooling and rear heating pulses occur between said head heating pulse and the tail cooling pulse, where n=y−x+1, and when said effective spot diameter is approximately larger than said shortest-length xT record mark for forming a yT length record mark, n sets of said rear cooling pulse and rear heating pulses occur between said head heating pulse and the tail cooling pulse, where n=y−x.

21. An information recording and reproducing apparatus using the information recording system according to claim 20, comprising an optical pickup including at least one optical system, a semiconductor laser light-source providing at least one effective spot diameter, for performing information recording in a plurality of recording line densities.

22. The information recording system according to claim 20, wherein said recording layer includes recording material comprising $Ag_aIn_bSb_cTe_d$, wherer subscripts 'a', 'b', 'c', 'd' represent positive real numbers, respectively.

23. The information recording system according to claim 19, wherein the pulse span of the head cooling pulse of the tail cooling pulse is changed depending on a shortest-length record mark size and an effective spot diameter of said light on said recording medium.

24. The information recording system according to claim 23, wherein said recording layer includes recording material comprising $Ag_aIn_bSb_cTe_d$, wherer subscripts 'a', 'b', 'c', 'd' represent positive real numbers, respectively.

25. An information recording and reproducing apparatus using the information recording system according to claim 23, comprising an optical pickup including at least one optical system, a semiconductor laser light-source providing at least one effective spot diameter, for performing information recording in a plurality of recording line densities.

26. The information recording system according to claim 19, wherein said recording layer includes recording material comprising $Ag_aIn_bSb_cTe_d$, wherer subscripts 'a', 'b', 'c', 'd' represent positive real numbers, respectively.

27. An information recording and reproducing apparatus using the information recording system according to claim 19, comprising an optical pickup including at least one optical system, a semiconductor laser light-source providing at least one effective spot diameter, for performing information recording in a plurality of recording line densities.

28. An information recording system for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various lengths of record marks in said recording layer, so that information is recorded in said recording medium, and wherein said head heating pulse is divided into a front division and a rear division, at least one of a difference in light-emission power between said rear division of said head heating pulse and an immediately following cooling pulse and a difference in light-emission power between a tail heating pulse of said rear heating and an immediately following cooling pulse is changed from a difference between another heating pulse and an immediately following cooling pulse, depending on a shortest-length record mark size and an effective spot diameter of said light on said recording medium.

29. The information recording system according to claim 28, wherein, when said effective spot diameter of said light on said recording medium is approximately smaller than a shortest-length record mark, at least one of the difference in light-emission power between said rear division of said head heating pulse and the immediately following cooling pulse and the difference in light-emission power between the tail heating pulse of said rear heating pulse and the immediately following cooling pulse is larger than the difference between another heating pulse and an immediately following cooling pulse.

30. An information recording and reproducing apparatus using the information recording system according to claim 29, comprising an optical pickup including at least one optical system, a semiconductor laser light-source providing at least one effective spot diameter, for performing information recording in a plurality of recording line densities.

31. The information recording system according to claim 29, wherein said recording layer includes recording material comprising $Ag_aIn_bSb_cTe_d$, wherer subscripts 'a', 'b', 'c', 'd' represent positive real numbers, respectively.

32. The information recording system according to claim 28, wherein, when said effective spot diameter of said light on said recording medium is approximately larger than a shortest-length record mark, at least one of the difference in light-emission pulse between said rear division of said head heating power and the immediately following cooling pulse and the difference in light-emission power between the tail heating pulse of said rear heating pulse and the immediately following cooling pulse is smaller than the difference between another heating pulse and an immediately following cooling pulse.

33. The information recording system according to claim 32, wherein said recording layer includes recording material comprising $Ag_aIn_bSb_cTe_d$, wherer subscripts 'a', 'b', 'c', 'd' represent positive real numbers, respectively.

34. An information recording and reproducing apparatus using the information recording system according to claim 32, comprising an optical pickup including at least one optical system, a semiconductor laser light-source providing at least one effective spot diameter, for performing information recording in a plurality of recording line densities.

35. The information recording system according to claim 28, wherein said recording layer includes recording material comprising $Ag_aIn_bSb_cTe_d$, wherer subscripts 'a', 'b', 'c', 'd' represent positive real numbers, respectively.

36. An information recording and reproducing apparatus using the information recording system according to claim 28, comprising an optical pickup including at least one optical system, a semiconductor laser light-source providing at least one effective spot diameter, for performing information recording in a plurality of recording line densities.

37. An information recording system for recording information in a recording medium by directing light from a light source, said recording medium comprising a recording layer having a phase reversibly changeable between a crystal phase and an amorphous phase,
    said light source emitting multi-pulse light which includes, in order, a head heating pulse, following rear cooling pulse and rear heating pulse and a tail cooling pulse, said multi-pulse light forming a record mark in said recording layer, and
    wherein, when recording data of a mark length is recorded by one of an even-number T and an odd-number T, where T represents each period of reference clock pulses, a pulse span of each of said rear cooling pulse and rear heating pulse is approximately equal to said period T.

38. The information recording system according to claim 37, wherein the pulse spans of said rear cooling pulse and rear heating pulse is set so that the difference between a total span of all the cooling pulses and the total span of all the heating pulses in light-emission of said rear cooling pulse, rear heating g pulse and tail cooling pulse is approximately equal between the even-number T length recording data and the odd-number T length recording data.

39. The information recording system according to claim 38, wherein said recording layer includes recording material comprising $Ag_aIn_bSb_cTe_d$, wherer subscripts 'a', 'b', 'c', 'd' represent positive real numbers, respectively.

40. The information recording system according to claim 38, wherein the pulse span of one of a heating pulse and cooling pulse of one of said rear cooling pulse, rear heating pulse and tail cooling pulse is corrected so as to make heating and cooling conditions equal between forming even-number T length marks and forming an odd-number T length marks.

41. The information recording system according to claim 37, wherein the pulse span of one of a heating pulse and cooling pulse of one of said rear cooling pulse, rear heating pulse and tail cooling pulse is corrected so as to make heating and cooling conditions equal between forming even-number T length marks and forming an odd-number T length marks.

42. The information recording system according to claim 37, wherein at least one of two cases occurs, a first case of said two cases being a case where a center rear heating pulse has a pulse span of 0.5T and each of two cooling pulses occurring immediately before and after said center rear heating pulse has a pulse span of 0.75T, and a second case of said two cases being a case where a center rear cooling pulse has a pulse span of 0.5T and each of two heating pulses occurring immediately before and after said center rear cooling pulse has a pulse span of 0.75T, where light emissions comprise alternate repetition of said rear heating pulse and rear cooling pulse.

43. The information recording system according to claim 42, wherein the pulse span of one of a heating pulse and cooling pulse of one of said rear cooling pulse, rear heating pulse and tail cooling pulse is corrected so as to make heating and cooling conditions equal between forming even-number T length marks and forming an odd-number T length marks.

44. The information recording system according to claim 42, wherein said recording layer includes recording material comprising $Ag_aIn_bSb_cTe_d$, wherer subscripts 'a', 'b', 'c', 'd' represent positive real numbers, respectively.

45. The information recording system according to claim 37, wherein said recording layer includes recording material comprising $Ag_aIn_bSb_cTe_d$, wherer subscripts 'a', 'b', 'c', 'd' represent positive real numbers, respectively.

46. The information recording system according to claim 37, wherein at least one of two cases occurs, a first one of said two case being a case where a center rear heating pulse has a pulse span of 1.5T and each of two cooling pulses occurring immediately before and after said center rear heating pulse has a pulse span of 1.25T, a second one of said two cases being a case where the center rear cooling pulse has a pulse span of 1.5T and each of two heating pulses occurring immediately before and after said center rear cooling pulse has a pulse span of 1.25T, where light emissions comprise alternate repetition of said rear heating pulse and rear cooling pulse.

47. The information recording system according to claim 46, wherein the pulse span of one of a heating pulse and cooling pulse of one of said rear cooling pulse, rear heating pulse and tail cooling pulse is corrected so as to make heating and cooling conditions equal between forming even-number T length marks and forming an odd-number T length marks.

48. The information recording system according to claim 46, wherein said recording layer includes recording material comprising $Ag_aIn_bSb_cTe_d$, wherer subscripts 'a', 'b', 'c', 'd' represent positive real numbers, respectively.

49. An information recording system for recording information in a recording medium by directing light from a light source, said recording medium comprising a recording layer having a phase reversibly changeable between a crystal phase and an amorphous phase,
    said light source emitting multi-pulse light which includes, in order, a head heating pulse, a head cooling pulse, and following rear heating pulse and rear cooling pulse, said multi-pulse light forming a record mark in said recording layer, and
    wherein:
        light-emission power of said multi-pulse light is adjusted;

a number of pulses for alternately heating and cooling said recording layer for forming and defining a record mark is adjusted; and a pulse span of at least one of said pulses for alternately heating and cooling said recording layer for forming and defining a record mark is adjusted.

50. A computer-implemented information recording method, for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising the steps of:
  a) separating said head heating pulse into a front division and a rear division; and
  b) setting difference in light-emission power between said rear division of said head heating pulse and an immediately following cooling pulse to be larger than a difference in light-emission power between another heating pulse and an immediately following cooling pulse.

51. A computer-implemented information recording method, for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising a step of setting light-emission power of the cooling pulse immediately following said head heating pulse to be lower than the light-emission power of another following cooling pulse.

52. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising a step of setting a difference in light-emission power between a tail heating pulse of said rear heating pulse and an immediately following cooling pulse to be larger than a difference in light-emission power between another heating pulse and an immediately following cooling pulse.

53. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising the steps of:
  a) separating said head heating pulse into a front division and a rear division; and
  b) setting each difference in light-emission power between said rear division of said head heating pulse and an immediately following cooling pulse and a difference between a tail heating pulse of said rear heating pulse and an immediately following cooling pulse to be larger than a difference in light-emission power between another heating pulse and an immediately following cooling pulse.

54. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising the steps of:
  a) separating said head heating pulse into a front division and a rear division;
  b) setting a light-emission power of said rear division of said head heating pulse to be higher than another heating pulse;
  c) setting a light-emission power of said head cooling pulse immediately following said head heating pulse to be lower than the light-emission power of another cooling pulse;
  d) setting a light-emission power of the tail heating pulse of said rear heating pulse to be approximately equal to the light-emission power of said rear division of said head heating pulse; and
  e) setting a light-emission power of a tail cooling pulse which immediately follows the tail heating pulse of said rear heating pulse to be lower than the light-emission power of another cooling pulse.

55. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various length of record marks in said recording layer and thus information being recorded in said recording medium, comprising a step of changing a total span from said head heating pulse to said tail cooling pulse depending on a shortest-length record mark size and an effective spot diameter of said light on said recording medium.

56. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various length of record marks in said recording layer and thus information being recorded in said recording medium, comprising the steps of:
  a) separating said head heating pulse into a front division and a rear division; and
  b) changing at least one of a difference in light-emission power between said rear division of said head heating pulse and an immediately following cooling pulse and a difference in light-emission power between a tail heating pulse of said rear heating pulse and an immediately following cooling pulse from a difference between another heating pulse and the immediately following cooling pulse, depending on a shortest-length record mark size and an effective spot diameter of said light on said recording medium.

57. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, following rear cooling pulse and rear heating pulse and a tail cooling pulse, said multi-pulse light forming a record mark in said recording layer, comprising a step of setting, when recording data is recorded of a mark length of one of an even-number of times of T and an odd-number T, where T represents each period of reference clock pulses, the pulse span of each of said rear cooling pulse and rear heating pulse be approximately equal to said period T.

58. A computer-implemented information recording method for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising the steps of:
adjusting light-emission power of said multi-pulse light;
adjusting the number of pulses for alternately heating and cooling said recording layer for forming and defining a record mark; and
adjusting pulse span of at least one of said pulses for alternately heating and cooling said recording layer for forming and defining a record mark.

59. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:
a computer-usable medium having computer readable program code means embodied in said medium, said computer readable program code means comprising:
program code means for separating said head heating pulse into a front division and a rear division; and
program code means for setting a difference in light-emission power between said rear division of said heat heating pulse and an immediately following cooling pulse be larger than the difference in light-emission power between another heating pulse and an immediately following cooling pulse.

60. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:

a computer-usable medium having computer readable program code means embodied in said medium, said computer readable program code means comprising:
program code means for setting light-emission power of the cooling pulse immediately following said head heating pulse be lower than the light-emission power of another following cooling pulse.

61. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:
a computer-usable medium having computer readable program code means embodied in said medium, said computer readable program code means comprising:
program code means for setting a difference in light-emission power between a tail heating pulse of said rear heating pulse and an immediately following cooling pulse be larger than a difference in light-emission power between another heating pulse and an immediately following cooling pulse.

62. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:
a computer-usable medium having computer readable program code means embodied in said medium, said computer readable program code means comprising:
program code means for separating said head heating pulse into a front division and a rear division; and
program code means for setting a difference in light-emission power between said rear division of said head heading pulse and an immediately following cooling pulse and the difference between a tail heating pulse of said rear heating pulse and an immediately following cooling pulse be larger than a difference in light-emission power between another heating pulse and an immediately following cooling pulse.

63. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:
- a computer-usable medium having computer readable program code means embodied in said medium, said computer readable program code means comprising:
  - program code means for separating said head heating pulse into a front division and a rear division;
  - program code means for setting a light-emission power of said rear division of said head heating pulse be higher than another heating pulse;
  - program code means for setting a light-emission power of said head cooling pulse immediately following said head heating pulse be lower than a light-emission power of another cooling pulse;
  - program code means for setting a light-emission power of a tail heating pulse of said rear heating pulse be approximately equal to the light-emission power of said rear division of said head heating pulse; and
  - program code means for setting a light-emission power of the tail cooling pulse which immediately follows the tail heating pulse of said rear heating pulse be lower than the light-emission power of another cooling pulse.

64. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various length of record marks in said recording layer and thus information being recorded in said recording medium, comprising:
- a computer-usable medium having computer readable program code means embodied in said medium, said computer readable program code means comprising:
  - program code means for changing a total span from said head heating pulse to a tail cooling pulse depending on a shortest-length record mark size and an effective spot diameter of said light on said recording medium.

65. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming various length of record marks in said recording layer and thus information being recorded in said recording medium, comprising:
- a computer-usable medium having computer readable program code means embodied in said medium, said computer readable program code means comprising:
  - program code means for separating said head heating pulse into a front division and a rear division; and
  - program code means for changing at least one of a difference in light-emission power between said rear division of said head heating power and an immediately following cooling pulse and a difference in light-emission power between a tail heating pulse of said rear heating pulse and an immediately following cooling pulse from a difference between another heating pulse and an immediately following cooling pulse, depending on a shortest-length record mark size and an effective spot diameter of said light on said recording medium.

66. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, following rear cooling pulse and rear heating pulse and a tail cooling pulse, said multi-pulse light forming a record mark in said recording layer, comprising:
- a computer-usable medium having computer readable program code means embodied in said medium, said computer readable program code means comprising:
  - program code means for setting, when recording data is provided of a mark length of one of an even-number T and an odd-number T, where T represents each period of reference clock pulses, the pulse span of each of said rear cooling pulse and rear heating pulse be approximately equal to said period T.

67. A computer program product for recording information in a recording medium by directing light from a light source, said recording medium comprising a recording layer having a phase reversibly changeable between a crystal phase and an amorphous phase, said light source emitting multi-pulse light which includes, in order, a head heating pulse, a head cooling pulse, and following rear heating pulse and rear cooling pulse, said multi-pulse light forming a record mark in said recording layer, comprising:
- a computer-usable medium having computer readable program code means embodied in said medium, said computer readable program code means comprising:
  - program code means for adjusting light-emission power of said multi-pulse light;
  - program code means for adjusting the number of pulses for alternately heating and cooling said recording layer for forming and defining a record mark; and
  - program code means for adjusting a pulse span of at least one of the pulses for alternately heating and cooling said recording layer for forming and defining a record mark.

* * * * *